(12) United States Patent
Maloney et al.

(10) Patent No.: US 12,056,425 B2
(45) Date of Patent: Aug. 6, 2024

(54) SYSTEMS AND METHODS FOR RESCALING EXECUTABLE SIMULATION MODELS

(71) Applicant: The MathWorks, Inc., Natick, MA (US)

(72) Inventors: Peter J. Maloney, Northville, MI (US); Dakai Hu, Howell, MI (US); Darshankumar M. Pandit, Surat (IN)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 17/670,997

(22) Filed: Feb. 14, 2022

(65) Prior Publication Data

US 2023/0090083 A1  Mar. 23, 2023

Related U.S. Application Data

(63) Continuation-in-part of application No. 15/612,765, filed on Jun. 2, 2017, now Pat. No. 11,454,188.
(Continued)

(51) Int. Cl.
 *G06F 30/20* (2020.01)

(52) U.S. Cl.
 CPC .................................. *G06F 30/20* (2020.01)

(58) Field of Classification Search
 CPC .................... F02D 2041/1437; G06F 2111/10
 See application file for complete search history.

(56) References Cited

U.S. PATENT DOCUMENTS

| 2,771,243 A | 11/1956 | Wolin et al. |
| 5,845,627 A | 12/1998 | Olin et al. |

(Continued)

FOREIGN PATENT DOCUMENTS

| CN | 103631152 A | 3/2014 |
| CN | 105201639 A | 12/2015 |

(Continued)

OTHER PUBLICATIONS

Altera Corporation, "Hardware in the Loop from the MATLAB/Simulink Environment," <https://www.intel.com/content/dam/www/programmable/us/en/pdfs/literature/wp/wp-01208-hardware-in-the-loop.pdf>, Accessed Jun. 10, 2019, (Year: 2013), Sep. 2013, pp. 1-9.

(Continued)

*Primary Examiner* — Logan M Kraft
*Assistant Examiner* — Joshua Campbell
(74) *Attorney, Agent, or Firm* — Cesari and McKenna, LLP; Michael R. Reinemann

(57) ABSTRACT

Systems and methods automatically rescale an original electric motor model so that it models an electric motor of a different size. The original electric motor model may be coupled to a motor controller model, and the systems and methods may also rescale the original motor controller model to produce a rescaled motor controller model matched to the rescaled electric motor model. The original electric motor model may include motor parameters and motor lookup tables, and the original motor controller model may include controller parameters and controller lookup tables. Rescaling factors indicating the size of the new electric motor being modeled may be received, and ratios may be computed as a function of the rescaling factors. Original motor parameters and controller parameters may be rescaled based on the ratios. Original motor lookup tables and controller lookup tables may be reshaped based on the ratios.

29 Claims, 44 Drawing Sheets

Related U.S. Application Data

(60) Provisional application No. 63/285,670, filed on Dec. 3, 2021.

(56) References Cited

U.S. PATENT DOCUMENTS

| | | | |
|---|---|---|---|
| 6,196,188 | B1 | 3/2001 | Janic et al. |
| 6,199,030 | B1 | 3/2001 | Stone |
| 6,304,835 | B1 | 10/2001 | Hiramatsu et al. |
| 6,321,142 | B1 | 11/2001 | Shutty |
| 7,930,153 | B2 | 4/2011 | Eryilmaz et al. |
| 8,532,961 | B2 | 9/2013 | Guo |
| 9,075,939 | B2 | 7/2015 | Phatak et al. |
| 2008/0294419 | A1* | 11/2008 | Backstrom .............. G06F 30/20 703/22 |
| 2010/0305912 | A1 | 12/2010 | Viassolo et al. |
| 2015/0142405 | A1 | 5/2015 | Malischewski |
| 2015/0234953 | A1* | 8/2015 | Speetzen ................. G06F 17/10 703/2 |
| 2016/0084180 | A1 | 3/2016 | Zhu et al. |
| 2016/0138487 | A1 | 5/2016 | Sitzler et al. |
| 2018/0347498 | A1 | 12/2018 | Maloney |

FOREIGN PATENT DOCUMENTS

| | | |
|---|---|---|
| CN | 205003469 U | 1/2016 |
| CN | 105308296 A | 2/2016 |
| CN | 106200668 A | 12/2016 |
| CN | 111594322 A | 8/2020 |
| DE | 102006059829 A1 | 6/2008 |
| EP | 0869417 B1 | 3/2003 |
| JP | 2016-019374 A | 2/2016 |
| JP | 2020-099141 A | 6/2020 |
| JP | 2021-129389 A | 9/2021 |
| WO | WO-2008/078097 | 7/2008 |

OTHER PUBLICATIONS

"Automotive Simulation Models," dSPACE GmbH, Jan. 2017, pp. 1-36.
"English Translation of First Office Action," National Intellectual Property Administration, P. R. China, CN Patent Application No. 201810555203.5, Dec. 11, 2020, pp. 1-16.
"Field Oriented Control of Permanent Magnet Synchronous Motors: User's Guide," Microsemi, Jun. 2012, pp. 1-43.
Hu, Dakai, "Calibrating Optimal PMSM Torque Control with Field-Weakening Using Model-Based Calibration," The MathWorks, Inc., retrieved from the Internet: < https://www.mathworks.com/company/newsletters/articles/calibrating-optimal-pmsm-torque-control-with-field-weakening-using-model-based-calibration.html>, retrieved on: Feb. 11, 2022, published 2020, pp. 1-4.
Maloney, Peter J., "Objective Determination of Minimum Engine Mapping Requirements for Optimal SI DIVCP Engine Calibration," The MathWorks, Inc., SAE International, Apr. 20, 2009, pp. 1-29.
"Mean-Value Internal Combustion Engine Model: Simulink® S-Function Generation from MapleSim™" MapleSim™, Maplesoft, 2011, pp. 1-8.
Morel, Thomas, "Simulation Assists Vehicle and Powertrain Optimization and Component Selection," SAE 2011 Electronic Systems for Vehicle Propulsion Symposium, Nov. 8-9, 2011, Tory, MI, USA, pp. 1-47.
"Powertrain Blockset™ User's Guide: R2016b," The MathWorks, Inc., Oct. 2016, pp. 1-144.
"Powertrain Blockset™ User's Guide: R2017a," The MathWorks, Inc., Mar. 2017, pp. 1-184.
"Simulink® User's Guide: R2017a," The MathWorks, Inc., Mar. 2017, pp. 1-3856.
Stipetic, Stjepan, et al., "Scaling Laws for Synchronous Permanent Magnet Machines," IEEE, 2015 Tenth International Conference on Ecological Vehicles and Renewable Energies (EVER), Monte Carlo, Monaco, Mar. 31-Apr. 2, 2015, pp. 1-7.
Stipetic, Stjepan, et al., "Ultra-fast Axial and Radial Scaling of Synchronous Permanent Magnet Machines," The Institution of Engineering and Technology, IET Electric Power Applications, IET Journals, vol. 10, Issue 7, Apr. 4, 2016, pp. 658-666.
Strobl, Simon, "Field Oriented Control (FOC) of Permanent Magnet Synchronous Machine (PMSM)," imperix power electronics, <https://imperix.com/doc/implementation/field-oriented-control-of-pmsm> Mar. 23, 2021, pp. 1-9.
Aroua, Ayoub, et al., "Inversion-based Control of Scaled PMSM for Battery Electric Vehicles," IEEE, 2021 IEEE Vehicle Power and Propulsion Conference (VPPC), Oct. 25, 2021, pp. 1-6.
"European Search Report and Written Opinion," European Application No. 22210892.0-1224, dated May 8, 2023, pp. 1-14.
"Hardware-in-the-loop Simulation," Wikipedia, Retrieved from the Internet: URL: <https://en.wikipedia.org/w/index.php?title=Hardware-in-the-loop_simulation&oldid=1017726613>, Apr. 14, 2021, Retrieved from the Internet on Jan. 31, 2023, pp. 1-5.
Stipetic, Stjepan, et al., "Ultra-fast Axial and Radial Scaling of Synchronous Permanent Magnet Machines," The Institution of Engineering and Technology, IET Journals, IET Electric Power Applications, vol. 10, Issue 7, Aug. 1, 2016, pp. 658-666.
English Translation of Japanese Office Action, from Japanese Patent Office for Japanese Patent Application No. JP 2022-193,218, dated Jan. 9, 2024, pp. 1-2.
Japanese Office Action, from Japanese Patent Office for Japanese Patent Application No. JP 2022-193,218, dated Jan. 9, 2024, pp. 1-3.

* cited by examiner

SYSTEMS AND METHODS FOR RESCALING EXECUTABLE SIMULATION MODELS

CROSS-REFERENCE TO RELATED APPLICATIONS

This application is a continuation-in-part of application Ser. No. 15/612,765 filed Jun. 2, 2017 and claims the benefit of Provisional Patent Application Ser. No. 63/285,670, filed Dec. 3, 2021, for Systems and Methods for Rescaling Executable Simulation Models, which applications are hereby incorporated by reference in their entireties.

BRIEF DESCRIPTION OF THE DRAWINGS

The description below refers to the accompanying drawings, of which.

DETAILED DESCRIPTION OF ILLUSTRATIVE EMBODIMENTS

Background

Figure 1:
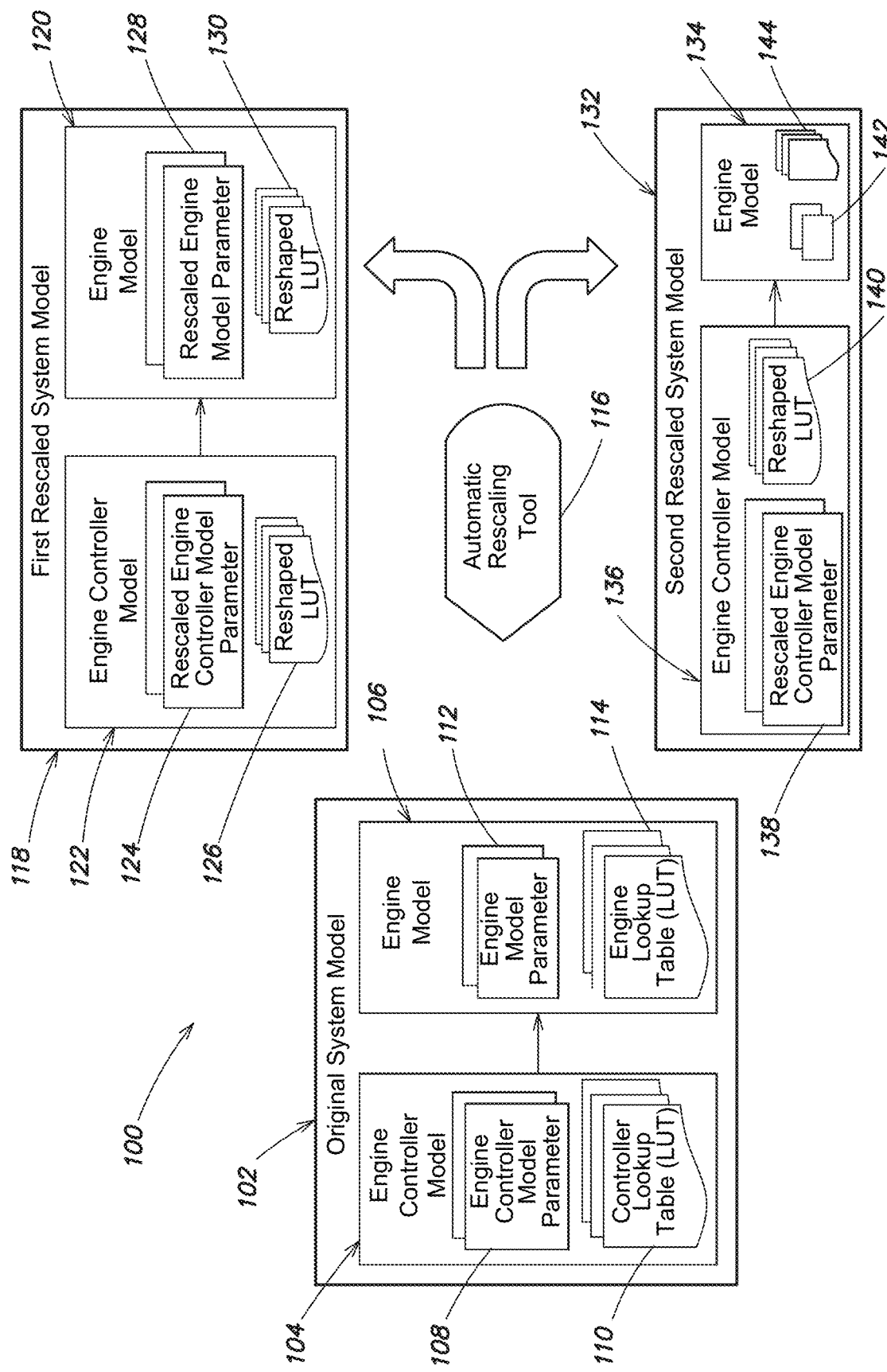
FIG. 1 is a schematic illustration of an example rescaling environment in accordance with an embodiment.

Computer-based modeling environments are often used in the design and development of systems, such as cars, appliances, airplanes, and other systems. For example, modeling environments may be used to design electronic control unit (ECU) embedded software for use in controlling an engine, such as an internal combustion, electric, or hybrid automobile powertrain. A developer may create an executable model of the ECU software within the modeling environment and pair it with the engine to reflect the behavior of the assembled engine/plant system. To develop and evaluate the ECU control software model, the developer may also create a model of the engine being controlled by the ECU, and may couple the ECU model to the engine model. The ECU and engine models may be executed, during which the ECU model may receive an input, such as a driver torque request, and may generate one or more engine commands, such as throttle position, fuel injector pulsewidth, spark advance, intake and exhaust cam phaser angles, etc. The engine model may receive the engine commands and produce engine output data, such as such as brake torque, manifold pressure, fuel flow, air mass flow, emissions, etc., in response to the engine commands from the ECU model. The ECU model may be evaluated and refined until it meets specifications established for the ECU and/or produces satisfactory control characteristics for the engine model, usually related to fuel economy, performance, and emission targets desired for a given vehicle application. When the ECU model and its associated calibration parameter set is developed to meet performance, fuel economy, and emission control specifications, code may be generated for the ECU model for final development in a Hardware-in-the-Loop (HIL) simulation and vehicle hardware application, at which point the control parameters will be fine-tuned in light of errors between the model of the engine plant and the real engine system before production release. For example, a code generator which may be part of the modeling environment may generate code, such as source code that implements the behavior of the ECU model. The generated code and calibration parameter set may be compiled and deployed onto a hardware platform, such as an embedded system, thereby realizing a physical ECU.

The engine model may be implemented as a lumped parameter model in which the behavior of the engine being modeled is represented by a network topology of model elements that collectively approximate the behavior of the engine under one or more assumptions. The model elements may model various engine components, such as a throttle, an intake manifold, an engine core, an exhaust manifold, an exhaust system, a turbocharger, etc. The model elements may be arranged and interconnected so as to define an engine architecture. The model elements may include settable parameters that govern the behavior of the model elements, such as throttle diameter for the throttle element, intake system area and volume for the intake manifold, exhaust system area and volume for the exhaust manifold, etc. In addition, an engine model may include engine lookup tables that are accessed during execution of the engine model to compute operating characteristics or other attributes. The lookup tables may incorporate nonlinear data of the engine being modeled. The controller model similarly may include settable controller parameters that govern its behavior during execution. The controller model also may include controller lookup tables containing nonlinear data that are accessed during execution of the controller model to obtain values used in calculating engine commands. The engine controller itself may also include a model of engine behavior used for virtual sensors as a replacement or diagnostic check on actual physical sensors with the same or lower detail as that used in the plant model.

An engine model may be highly sophisticated and capable of producing many engine outputs. An engine model may be the result of many months or even years of design work. Typically, an engine model models a physical engine of a particular architecture. The parameters of the engine model for a given architecture affect the size of the engine. For example, a given engine model may model a four cylinder, four stroke, spark ignition, 1.5 liter (L) turbocharged, dual cam-phased engine architecture. To create a model of an engine of a different size, e.g., a six cylinder, 9.8 L engine, a developer must create a completely new model that models the behavior of an engine of the new size. As noted, the creation of such a new engine model is a time-consuming process. This may delay development of a new controller design for the differently sized engine. To save development time, a developer may reuse a controller model whose parameters were created for one engine model with a different engine model for a different size engine. The use of such a mismatched engine/controller model parameters can result in unusable simulation results, halting further control development until the controller parameters are harmonized with the new engine design.

Overview

Briefly, the present disclosure relates to systems and methods for automatically rescaling an original engine model to create an engine model for an engine of a different size. The original engine model may be coupled to a model of an engine controller, and the systems and methods may also rescale the original controller model to produce a rescaled controller model matched to the rescaled engine model. The original engine model may include engine parameters and engine lookup tables, and the original controller model may include controller parameters and controller lookup tables. The systems and methods may receive one or more rescaling factors indicating the size of the new engine to be modeled, and may compute one or more rescaling ratios as a function of the one or more rescaling factors. For example, the systems and methods may compute power, torque, speed, and displaced volume ratios for the existing engine model and the rescaled engine model. The systems and methods may use the rescaling ratios to modify at least some of the engine parameters and controller parameters. For example, the systems and methods may use the engine torque ratio to rescale volume-based parameters and the engine power ratio to rescale area-based parameters. The systems and methods also may use one or more of the rescaling ratios to reshape at least some of the engine lookup tables and controller lookup tables. In addition to creating the rescaled engine model, the systems and methods may produce a rescaled controller model matched to the rescaled engine model, for example by utilizing the same rescaling ratios to modify the engine controller model's parameters and lookup tables.

The systems and methods may preserve the design and architecture of the original engine and controller models during the rescaling process. For example, the modified engine and controller parameters and the reshaped engine and controller lookup tables may be stored in one or more data structures, such as a configuration set or block parameters, and the original engine and controller models may utilize the modified engine and controller parameters and the reshaped engine and controller lookup tables stored in the configuration set during an execution.

In some embodiments, the systems and methods may additionally rescale a model of a dynamometer and the testing parameter range of the dynamometer model created for the original engine controller and engine models. The rescaled dynamometer model may be connected to the engine controller and engine models, and the engine controller parameters may be re-adjusted iteratively by the dynamometer software to remove stack-up errors between a controller command and an engine output result due to the rescale operation or pre-existing errors prior to the rescale operation. The engine controller and engine plant models may be re-tested after re-scale and stack-up error retune over a range of test points. Output data generated during the testing of the engine controller and engine models may be captured and stored. The systems and methods may utilize the captured output data to generate a plurality of static engine performance maps. The systems and methods may construct a mapped engine model that includes the static engine performance maps for example to act as a surrogate for the more computationally intensive dynamic engine model used in the re-size operation provided the dynamics of the engine can be neglected for a given powertrain development application of the static model.

FIG. 1 is a schematic illustration of an example rescaling environment 100. The rescaling environment 100 may include an original system model 102 that may include an original engine controller model 104 and an original engine model 106. The original engine controller model 104 may include one or more engine controller model parameters indicated at 108. In some implementations, the engine controller model 104 may include its own model in the form of an observer, a state estimator, or a virtual sensor of the engine that is being modeled by the engine model 106. In some implementations, the engine controller model 104 may include physical inverse state estimators, such as a barometric pressure estimator, throttle position estimator diagnostic function, EGR flow estimator for a CI engine, etc. The engine controller model 104 may utilize this engine model to generate engine commands, thus operating as a feedforward controller. For example, the engine controller model 104 may include one or more controller lookup tables (LUTs) indicated at 110. At least some of the LUTs 110, typically many of the LUTs 110, may model the engine being modeled by the engine model 106. The original engine model 106 may include one or more engine model parameters indicated at 112 and one or more engine LUTs indicated at 114. The original system model 102 may be executed. During execution, the engine controller model 104 may generate one or more engine commands, which may be received by the engine model 106. The engine model 106 may produce engine output data. The engine model 106 may model a physical engine of a particular size, for example an engine having a particular number of cylinders and a particular displacement.

An automatic rescaling tool 116 may rescale the original engine controller model 104 and the original engine model 106. For example, the automatic rescaling tool 116 may produce one rescaled system model 118 that includes a rescaled engine model 120 that models an engine larger in size than the engine modeled by the original engine model 106 and a rescaled engine controller model 122 that matches the rescaled engine model 120. In some embodiments, the automatic rescaling tool 116 may produce the rescaled engine controller model 122 by generating rescaled engine controller model parameters 124 and reshaped controller LUTs 126. The automatic rescaling tool 116 may produce the rescaled engine model 120 by generating rescaled engine model parameters 128 and reshaped engine LUTs 130. The automatic rescaling tool 116 may produce another rescaled system model 132 having another rescaled engine model 134 that models an engine smaller in size than the engine modeled by the original engine model 106 and another rescaled engine controller model 136 matched to the rescaled engine model 134. The automatic rescaling tool 116 may produce the rescaled engine controller model 136 by generating rescaled engine controller model parameters 138 and reshaped controller LUTs 140, and the rescaled engine model 134 by generating rescaled engine model parameters 142 and reshaped engine LUTs 144.

The automatic rescaling tool 116 may produce the rescaled models 120 and 122 for the larger size engine and/or the rescaled models 134 and 136 for the smaller sized engine quickly, e.g., in a matter of minutes, even for complex and/or sophisticated engine and controller models. Accordingly, developers can obtain and evaluate alternative engine/controller designs quickly and easily, as compared to the prior approach of laboriously creating entirely new engine and/or controller models.

Figure 2:
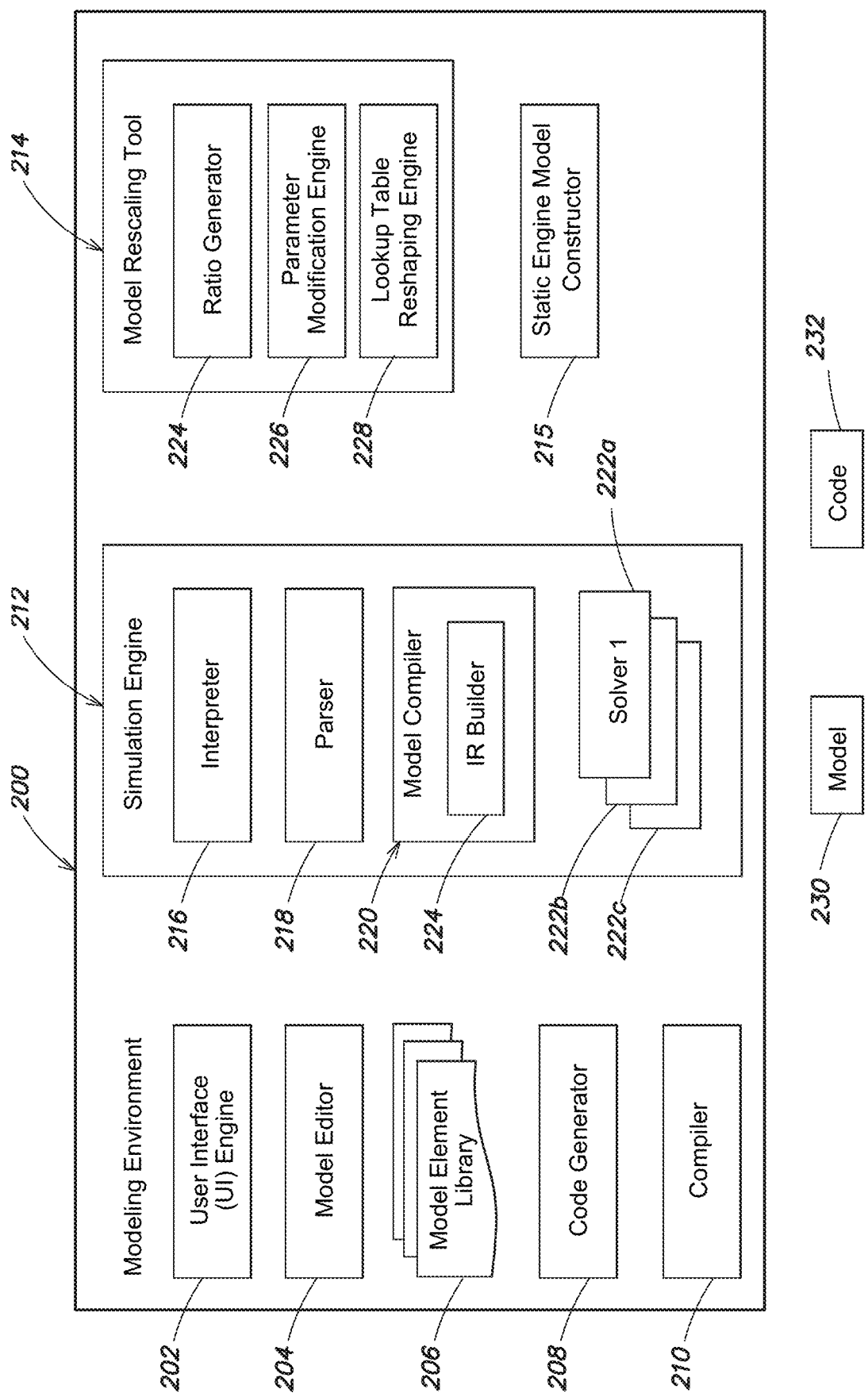
FIG. 2 is a partial, schematic illustration of a modeling environment in accordance with an embodiment.

FIG. 2 is a partial, schematic illustration of an example of a modeling environment 200 in accordance with an embodiment. The modeling environment 200 may include a User Interface (UI) engine 202, a model editor 204, one or more model element libraries indicated at 206, a code generator 208, a compiler 210, a simulation engine 212, a model rescaling tool 214, and a static engine model constructor 215. The UI engine 202 may create and present one or more User Interfaces (UIs), such as Graphical User Interfaces (GUIs) and/or Command Line Interfaces (CLIs), on a display of a data processing device, such as a workstation, laptop, tablet, etc. The GUIs and CLIs may provide a user interface to the modeling environment 200, such as a model editing window. The model editor 204 may perform selected operations on a model, such as open, create, edit, and save, in response to the user inputs or programmatically.

The simulation engine 212 may include an interpreter 216, a parser 218, a model compiler 220, and one or more solvers, such as solvers 222a-c. The model compiler 220 may include one or more Intermediate Representation (IR) builders, such as IR builder 224. In some implementations, one or more IR builders may be included or associated with the solvers 222. The simulation engine 212 may execute, e.g., compile and run or interpret, computer-generated, executable models using one or more of the solvers 222a-c. For example, the solvers 222 may generate a set of equations for a model, and may solve the set of equations. The solvers 222 may also generate a solution for an in-memory, intermediate representation (IR) of a model that represents a set of equations. The solvers 222 may generate the solution for the IR using numerical techniques. Exemplary solvers include one or more fixed-step continuous time solvers, which may utilize numerical integration techniques, and one or more variable-step solvers, which may for example be based on the Runge-Kutta and Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the *Simulink User's Guide* from The MathWorks, Inc. (March 2017 ed.)

The model rescaling tool 214 may include a ratio generator 224, a parameter modification engine 226, and a lookup table reshaping engine 228.

The code generator 208 may access a model, such as model 230, and may generate code, such as code 232, for the model 230. In some embodiments, the generated code may be source code, which may be compiled by the compiler 210, and executed by one or more processors outside of the modeling environment 200. The generated code may thus be standalone code relative to the modeling environment 200. Examples of generated code include Ada, Basic, C, C++, C#, FORTRAN, assembly code, and Hardware Description Language (HDL) code, such as VHDL, Verilog, or SystemC, among others, which may be used to synthesize a programmable logic device.

Exemplary modeling environments include the MATLAB® technical computing environment (TCE) and the Simulink® model-based design environment both from The MathWorks, Inc. of Natick, Massachusetts, as well as the Simscape™ physical modeling system, the SimEvent® discrete-event modeling tool, and the Stateflow® state chart tool also from The MathWorks, Inc., the MapleSim physical modeling and simulation tool from Waterloo Maple Inc. of Waterloo, Ontario, Canada, the GTSUITE modeling and simulation environment from Gamma Technologies, LLC of Chicago, Illinois, the Ricardo WAVE and WAVE RT modeling and simulation tools of Ricardo Software of Chicago, Illinois, a subsidiary of Ricardo plc, the AVL Boost modeling and simulation tool of AVL Gmbh of Graz, Austria, the LabVIEW virtual instrument programming system and the NI MatrixX model-based design product both from National Instruments Corp. of Austin, Texas, the Visual Engineering Environment (VEE) product from Keysight Technologies Inc. of Santa Rosa, California, the System Studio model-based signal processing algorithm design and analysis tool and the SPW signal processing algorithm tool from Synopsys, Inc. of Mountain View, California, a Unified Modeling Language (UML) system, a Systems Modeling Language (SysML) system, the System Generator system from Xilinx, Inc. of San Jose, California, and the Rational Rhapsody Design Manager software from IBM Corp. of Somers, New York Models created in the high-level modeling environment may contain less implementation detail, and thus operate at a higher level than certain programming languages, such as the C, C++, C #, and SystemC programming languages.

A given model may simulate, e.g., approximate the operation of, a system. Exemplary systems include physical systems, such as plants and controllers. A model may be executed in order to simulate the system being modeled, and the execution of a model may also be referred to as simulating the model. Models constructed within the modeling environment 200 may include textual models, graphical models, such as block diagrams, state-based models, discrete-event models, physical models, and combinations thereof. A graphical model may include icons or blocks that represent computations, functions or operations, and interconnecting lines or arrows among the blocks may represent data, signals, or relationships among those computations, functions, or operations. The icons or blocks, moreover, may be selected by the user from one or more of the libraries or palettes 206 that contain icons or blocks for the blocks supported by the modeling environment 200. A model editor GUI may include a Run button that may be selected by the user. The modeling environment 200 may also be configured to receive a run command entered by the user, e.g., in the GUI or in a Command Line Interface (CLI). In response to the user selecting the Run button or entering the run command, the simulation engine 212 may execute the model, and may present the results of the model's execution to a user. Exemplary graphical models include Simulink models, Simscape physical models, SimEvent models, Stateflow charts, LabVIEW block diagrams, MatrixX models, Scade models, and VEE diagrams, among others. Other forms of the source program include Modelica models from the Modelica Association, Uniform Modeling Language (UML) models, and Systems Modeling Language (SysML) models, among others.

The MATLAB® TCE is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, the modeling environment 200 may implement a declarative language. A declarative language is a language that expresses the logic of a computation without describing its control flow. A declarative language may describe what a program must accomplish in terms of the problem domain, rather than describe how to accomplish it as a sequence of the programming language primitives. In some cases, a declarative language may implement single assignment in which variables are assigned once and only once. Examples of declarative languages include the Simulink® model-based design environment, which is a time-based language, the Modelica modeling language, and the LabVIEW graphical programming system, Hardware Description Language (HDL), the Prolog language, and the Haskell language, among others. Behaviors of at least some of the model elements and connection elements of a model may include computational implementations that are implicitly defined by a declarative language.

It should be understood that the modeling environment 200 is intended for illustrative purposes and that the present disclosure may be used with other modeling environments. For example in some implementations, the code generator 208 and/or the compiler 210 may be separate from the modeling environment 200.

One or more of the user interface engine 202, the model editor 204, the code generator 208, the compiler 210, the simulation engine 212, and the model rescaling tool 214 may be implemented through one or more software modules or libraries containing program instructions that perform the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In some embodiments, one or more of the user interface engine 202, the model editor 204, the code generator 208, the compiler 210, the simulation engine 212, and the model rescaling tool 214 may comprise hardware registers and combinational logic configured and arranged to produce sequential logic circuits. In some embodiments, various combinations of software and hardware, including firmware, may be utilized to implement the described methods.

Suitable code generators for use with the present disclosure include, but are not limited to, the Simulink Coder, the Embedded Coder, and the Simulink HDL Coder products from The MathWorks, Inc. of Natick, MA, and the TargetLink product from dSpace GmbH of Paderborn Germany. Suitable target language compilers include the xPC Target™ tool from The MathWorks, Inc., and a C language compiler. However, other code generation systems and other compilers may be used.

Figure 3:
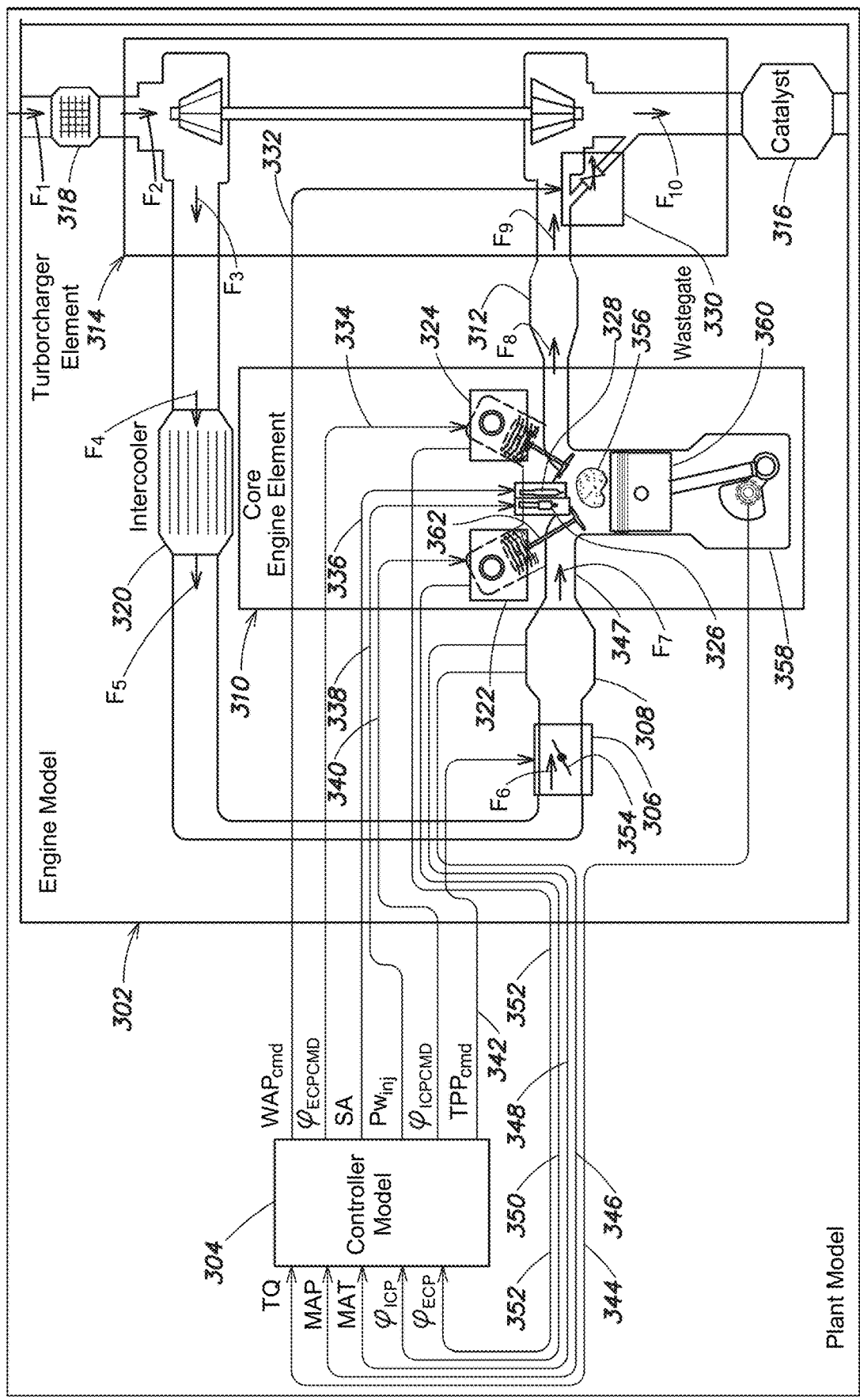
FIG. 3 is a schematic illustration of an example of a system model in accordance with an embodiment.

FIG. 3 is a schematic illustration of an example of a system model 300. The system model 300 may include an engine plant model 302 and a controller model 304. The engine plant model 302 may model the operation of a spark ignition or compression ignition, internal combustion engine, and the controller model 304 may model the operation of an electronic control unit (ECU) for the engine represented by the engine model 302. The engine plant model 302 may include a throttle element 306, an intake manifold element 308, a core engine element 310, an exhaust manifold element 312, a turbocharger element 314, an exhaust aftertreatment system element 316, an air intake element 318, and an intercooler element 320. The core engine block element 310 may include an intake cam phaser element 322, an exhaust cam phaser element 324, a spark plug element 328, and a fuel injector element 326. The turbocharger element 314 may include a wastegate or variable geometry turbine element 330, for bypassing the turbocharger element 314 and allowing exhaust gases to flow directly to the exhaust element 316. Additional engine breathing-related actuators may also include variable intake runner length, variable intake manifold flap open/close, variable compression ratio actuation, variable intake valve lift actuation, two-step valve intake valve lift actuation, high pressure exhaust gas recirculation (EGR) valve actuation, low-pressure EGR actuation, and fuel vapor canister purge actuation, among others.

During execution of the system model 300, the controller model 304 may receive an input, such as a torque request, and may generate a plurality of engine commands that are provided to the engine model 302 to achieve that torque request when the relationship between the torque request and the resulting torque is established via calibration parameters and LUT tables. The engine model 302 may generate a plurality of engine outputs and some of the engine outputs may be provided as feedback to the controller model 304 via sensor models. For example, the controller model 304 may generate a wastegate area command ($WAP_{cmd}$) 332 for controlling the wastegate element 330, an exhaust cam phaser angle command ($\varphi_{ECPCMD}$) 334 for controlling the exhaust cam element 324, a spark advance command (SA) 336, for controlling the spark plug element 328, vectorized multiple injection timing parameters (SOI), vectorized fuel injector pulsewidth commands ($PW_{inj}$) 338 or vectorized multiple fuel mass per inject command (Fmass) for controlling the fuel injector element 326, an intake cam phaser angle command ($\varphi$ICPCMD) 340 for controlling the intake cam element 322, and a throttle position percent command (TPPcmd) 342 for controlling the throttle element 306. The engine model 302 may generate an engine torque response signal (TQ) 344, an intake manifold pressure signal (MAP) 346, an intake manifold temperature signal (MAT) 348, an intake cam phaser angle signal ($\varphi_{ICP}$) 350, and an exhaust cam phaser angle signal ($\varphi_{ECP}$) 352 that are provided to the controller model 304.

In some embodiments, the engine model 300 may be implemented as a lumped parameter model in which the behavior of the engine being modeled is represented by discrete entities that approximate the behavior of the engine under one or more assumptions arranged in a network topology.

The engine model 302 may represent the spark ignition engine and/or compression ignition engine as an interdependent network of gas mass flows designated by arrows labeled as $F_1$ to $F_{10}$ between a network of pneumatic volume elements or nodes. For example, inlet air at atmospheric pressure may pass through the air intake element 318, which may include an air cleaner, and into a compressor portion of the turbocharger element 314. The inlet air may then flow through the intercooler element 320. Compressed and cooled inlet air may be drawn through the throttle element 306 in which is rotatably disposed an inlet air valve in the form of a throttle plate 354 the position of which may be electronically controlled by the TPPcmd 342 to vary restriction to inlet air passing through the throttle element 306 and into the intake manifold element 308. A pressure transducer may measure gas pressure in the intake manifold element 308, and provide the MAP output signal 346.

Individual cylinder intake runners, one of which is illustrated in FIG. 3 at 347, may open into a combustion chamber of a respective engine cylinder via fixed or variable intake valve restrictions affected by intake cam phasing actuators and lift actuators. One combustion chamber of one respective cylinder is shown in FIG. 3. Each cylinder may include intake and exhaust valves, combustion chamber 356 and a crankcase 358, separated by a piston 360, which may sealingly engage the wall of the cylinder. A quantity of fuel may be injected to the intake port upstream of the intake valve or directly into the cylinder, via the fuel injector element 326, in response to one or more $PW_{inj}$ signals 338 for mixing with the inlet air. The resulting mixture may be drawn into the combustion chamber 356 during a cylinder intake event, in which an intake valve 362 is driven to an open position and a low pressure condition is present in the combustion chamber. The air-fuel mixture may be ignited in the combustion chamber 356 during a combustion event as the mixture is later compressed, and initiated by a timed ignition arc at the spark plug element 328, which extends into the combustion chamber 356. Alternatively, for compression ignition engines, one or more precisely timed fuel injector deliveries of fuel to the cylinder may be used to initiate combustion. The piston 360 within the cylinder may be reciprocally driven under the effective pressure of the combustion event. The generated power may be used to drive vehicle wheels, accessory loads, etc. Gasses produced in the combustion process within the combustion chamber may be exhausted from the combustion chamber 356 during a cylinder exhaust event. The exhaust gases may pass through exhaust runners to the exhaust manifold element 312. The exhaust gasses may flow through the exhaust manifold 312 to a turbine portion of the turbocharger element 314. In some cases, an exhaust throttle valve element may be used to increase back-pressure to increase combustion temperature during start-up. After passing through the exhaust throttle, exhaust gases may then flow to the exhaust aftertreatment system element 316, which may include a catalytic treatment device, diesel oxidation catalyst, diesel particulate filter, gasoline particulate filter, lean NOx trap, and a muffler, and from there to the atmosphere.

Parameters specifying values for volume, area, and mass flow may be associated with at least some of the elements of the engine model 302 to represent the flow of intake air and exhaust gases through the engine model 300.

Figure 4:
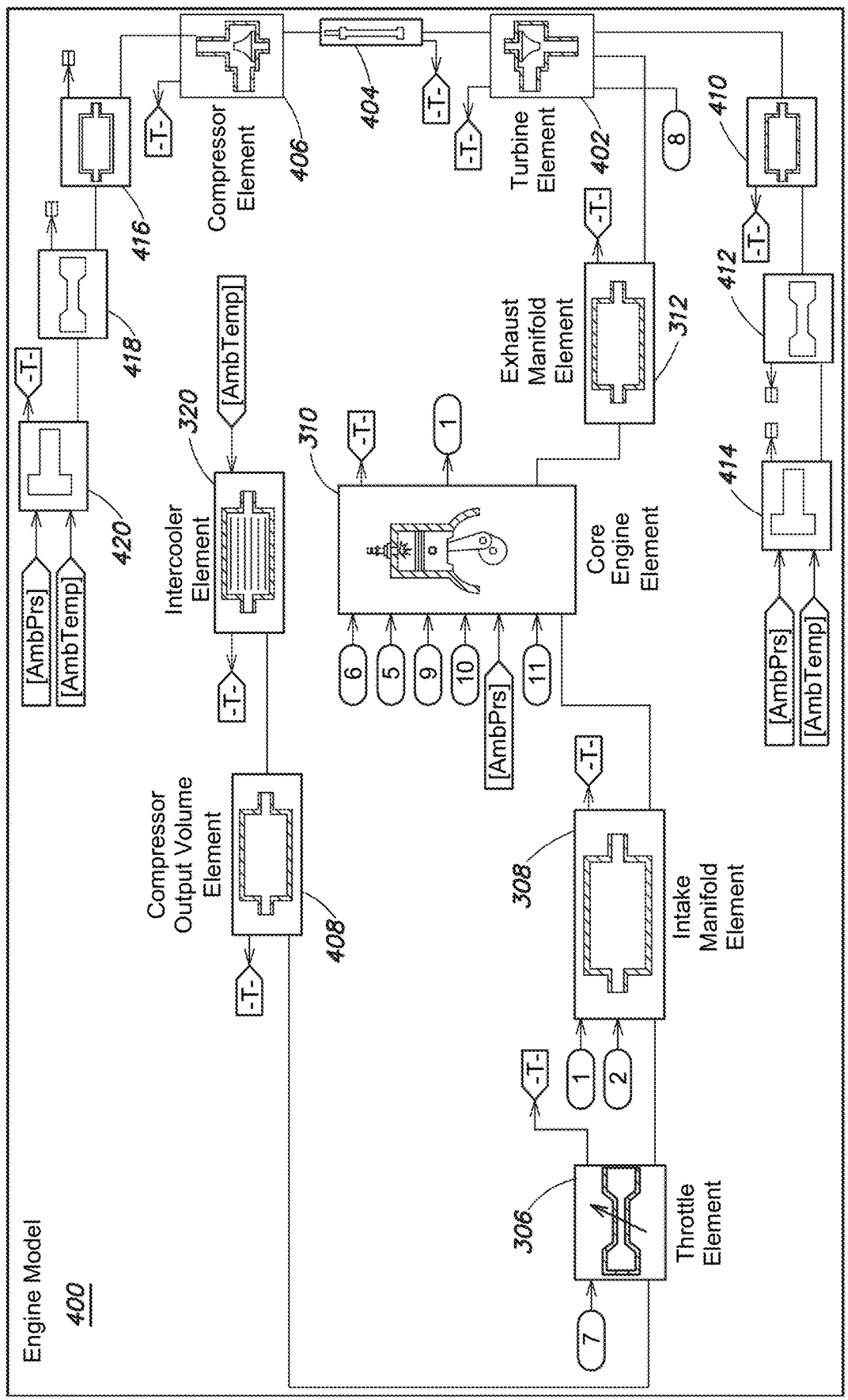
FIG. 4 is a schematic illustration of an example of an engine model in accordance with an embodiment.

FIG. 4 is a schematic illustration of another example of an engine model 400. The engine model 400 includes the throttle element 306, the intake manifold element 308, the core engine element 310, the exhaust manifold element 312, and the intercooler element 320. The engine model 400 further includes a turbine element 402, a turbine shaft element 404, a compressor element 406, and a compressor output volume element 408. To model an engine's exhaust system, the engine model 400 may include an exhaust system volume element 410, an exhaust back pressure element 412, and an environmental exhaust element 414. To model an engine's air intake system, the engine model 400 may include an air intake system element 416, an air filter element 418, and an environmental intake element 420.

Suitable engine controller and engine models include the engine controller model and the engine model provided in the Spark Ignition (SI) Engine Dynamometer Reference Application, the Compression Ignition (CI) Engine Dynamometer Reference Application, the SI Controller block, the SI Core Engine block, the CI Controller block, and the CI Core Engine block all from The MathWorks, Inc. The SI and CI Controller blocks include engine models in the form of lookup tables and dynamic elements, and operate as feed-forward controllers. It should be understood that the present disclosure may be utilized with other controller designs such as those used for full ECU software emulation, and may also be used to re-scale dynamic feedback parameters such as controller and estimator gains.

Elements of an engine model, such as the engine models 302 and 400, may include one or more parameters. Values assigned to the parameters may control and/or affect the behavior of the respective elements. For example, some elements of an engine model through which intake air or exhaust gases flow may include parameters defining flow area and/or volume. The throttle element 306 may include a throttle diameter parameter (ThrDiam) in $m^2$. The intake manifold element 308 may include an intake manifold chamber volume parameter (Vint) in $m^3$. The core engine element 310 may include a number of cylinders parameter (NumCyl), a displaced engine volume parameter (Vd) in $m^3$, and an injector slope parameter (InjS1p) in mg/ms. The exhaust manifold element 312 may include an exhaust manifold chamber volume (Vexh) in $m^3$. The turbine shaft element 404 may include a shaft inertia parameter (TurboInertia) in $kg*m^2$. In some embodiments, turbines and compressors may be grouped in stages. The air intake system element 416 may include an air intake chamber volume parameter (AirIntakeVol) in $m^3$. The turbine element 402 may include a wastegate area parameter (WgArea) in $m^2$. Alternatively, the turbocharger flow can be controlled by a variable geometry turbine (VGT) rack position actuator. The exhaust system volume element 410 may include an exhaust chamber volume parameter (ExhSysVol) in $m^3$. The compressor output volume element 408 may include a compressor chamber volume parameter (VolCompOut) in $m^3$.

It should be understood that an engine model, such as engine models 300 and/or 400, may include additional and/or other parameters.

A controller model, such as the controller model 304, may include one or more parameters. For example, the controller model 304 may include a number of cylinders parameter (NumCyl) and an engine displaced volume parameter (Vd) in $m^3$, among others.

In some embodiments, the modeling environment 200 may create a workspace for a model, such as the system model 300, when the model is opened and/or loaded from memory. The workspace may be a region of memory for storing variables used by the system model 300. The variables may be assigned to one or more of the model's parameters. For example, the variable Vd may be assigned to the engine displayed volume parameter. To obtain the value of the engine displayed volume parameter, the controller model 304 and/or the engine model 302 may look up the value assigned to this variable in the workspace. The UI engine 202 may create a workspace pane as part of an editor window that may present and provide access to variables. For example, variables in the workspace may be accessed from a command line of the editor window by a user of the modeling environment 200. Variables in the workspace may be named and may be associated with meta information, such as the variables' dimensions, when the variables were created, the variables' data type, etc. The workspace or a portion thereof may be saved to one or more data structures, such as a MAT file, an HDF5 file, etc.

In some embodiments, one or more workspaces may be created for a model, and the one or more workspaces may have different scopes or contexts. For example, one workspace may be created for a sub-model included within a parent model, and the variables of this workspace may be accessible only by the sub-model. Workspaces also may be created for other hierarchical model structures, such as a subsystem, which may represent a plurality of model elements as a single model element, e.g., a subsystem block. Variables included in a workspace for a subsystem may only be accessible by the model elements included in the subsystem.

In some embodiments, the controller model 304 and/or one or more elements of the engine model 302 may include and/or access one or more lookup tables, which may also be referred to as performance tables and/or calibration maps, during execution. Lookup tables utilized by an engine model may store nonlinear engine behavior data that may be used to determine the engine model's response to control inputs. Lookup tables utilized by an engine controller model may store optimal control commands for given engine operating points.

In general, a lookup table may relate controller command input values to controller output values that will yield a desired response in the engine plant under quasi-steady and dynamic engine operating conditions. A lookup table may include one or more input breakpoint data sets and output table data. Each input breakpoint data set may be an index of input values for a particular dimension of the lookup table. The input breakpoint data sets relate a lookup table's input values to the output values that the table returns. The individual input values included in an input breakpoint data set may be referred to as breakpoints. The breakpoints may define intervals at which the input values may fall, and may be non-repeating, monotonically increasing values. An input breakpoint data set may also be referred to as an input breakpoint data grid. For given input data, the breakpoints in input breakpoint data sets corresponding to the input data may be used to locate an output data value. The breakpoints of a lookup table may serve to partition the table input space into regions, which may be called "cells". Each cell, which can be multi-dimensional, may be delimited by two breakpoints for each indexing variable. If a lookup table does not define a particular input value, it may estimate the output value based on nearby table values using interpolation or extrapolation techniques.

The output data of a lookup table may be obtained experimentally by running a physical engine in a lab and collecting test data or by running a simulation of an engine model and collecting simulation results. Lookup tables utilized by the engine controller and the engine models often include non-linear data in order to reflect the deliberate design of engine hardware, which exhibits such nonlinear behavior.

Figure 5:
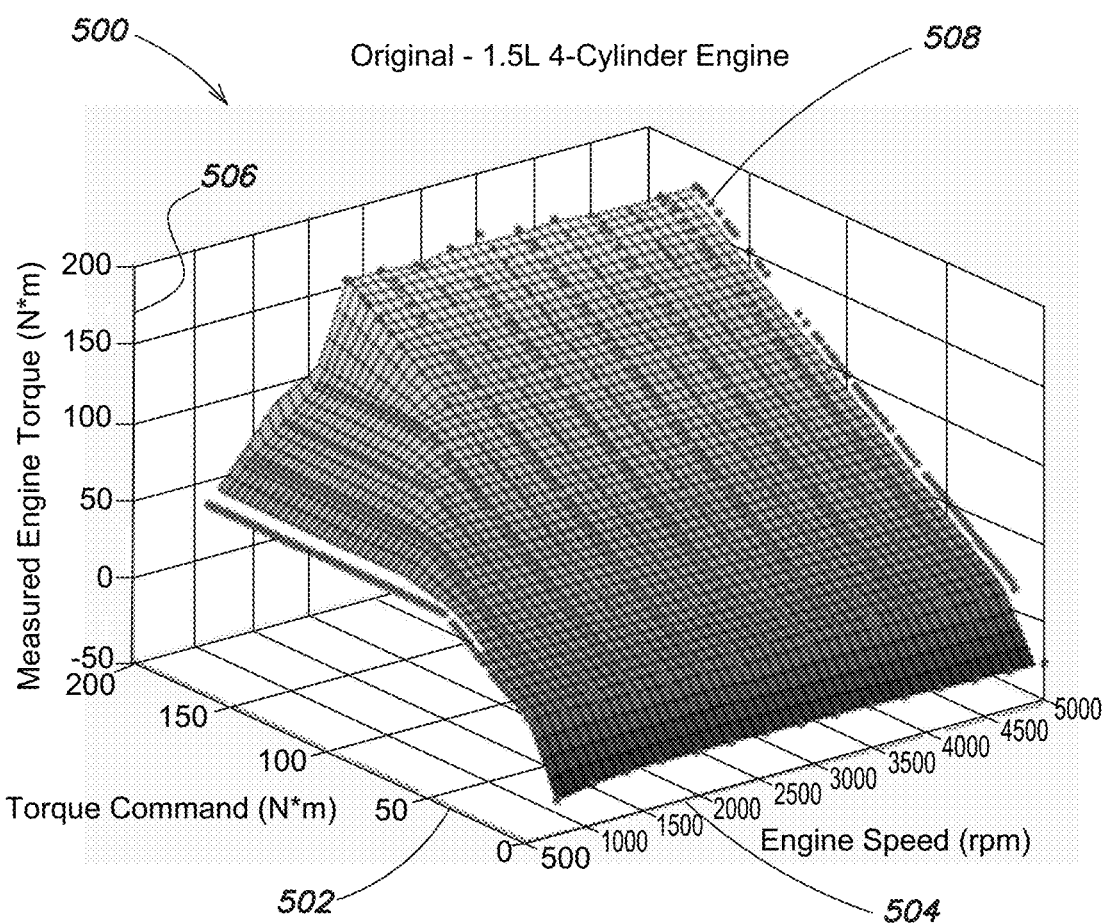
FIG. 5 is a schematic illustration of an example lookup table for use by an original engine model in accordance with an embodiment.

FIG. 5 is a schematic illustration of a lookup table 500 that may be utilized by an engine model to obtain engine brake torque as a function of engine speed and a torque command or fuel mass per injection command. The table 500 includes a torque command axis 502, an engine speed axis 504, and a measured engine torque, e.g., engine brake torque, axis 506. The table 500 further includes output data 508.

Figure 6:
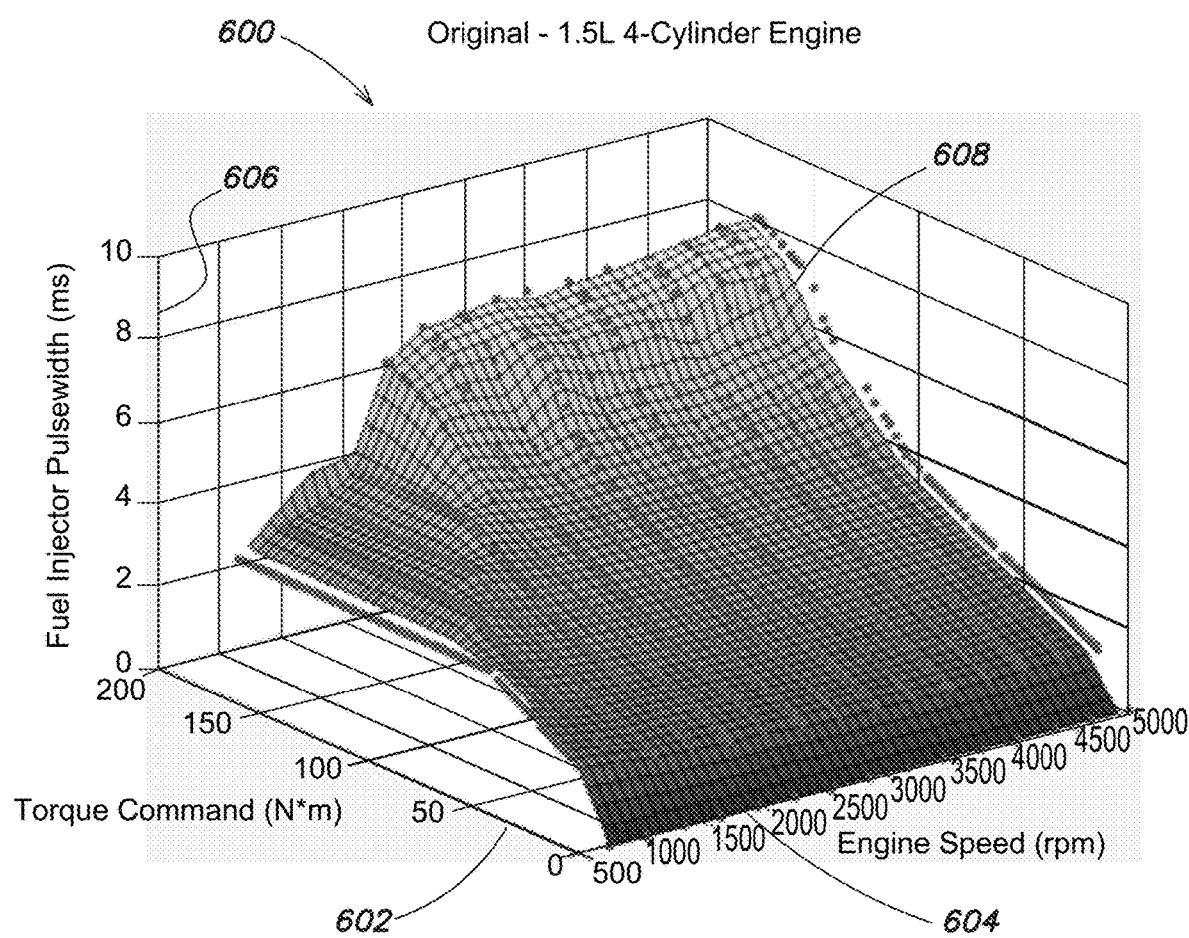
FIG. 6 is a schematic illustration of an example lookup table for use by an original engine controller model in accordance with an embodiment.

FIG. 6 is a schematic illustration of a lookup table 600 that may be utilized by an engine controller model to obtain an injector pulsewidth command or fuel mass per injection per cylinder command for a fuel injector as a function of a torque command and engine speed. The table 600 includes a torque command axis 602, an engine speed axis 604, and a fuel injector pulsewidth axis 606. The table 600 further includes output data 608.

Tables 500 and 600 may correspond to a 1.5 L four cylinder spark ignition turbocharged dual cam-phased engine and matching controller.

FIGS. 7A-E are partial views of a flow diagram of an example method in accordance with an embodiment. The flow diagram of FIGS. 7A-E is intended for illustrative purposes only. In some embodiments, one or more steps may be omitted, additional steps may be added, the order of steps may be changed, and/or one or more sequences as indicated by the arrows of FIGS. 7A-E may be omitted.

The model rescaling tool 214 may receive one or more linear and/or nonlinear rescaling factors, as indicated at step 702. The one or more rescaling factors may indicate the new size of an engine to be modeled. Exemplary rescaling factors include maximum engine power number of cylinders of the resized engine. The one or more rescaling factors may be user specified or they may be automatically derived from criteria that may be user specified, for example through one or more GUIs created by the UI engine 202, as described herein.

The ratio generator 224 may compute one or more ratios, as indicated at step 704. The computed ratios may provide relationships between the engine size represented by the original model and the engine size to be represented by the rescaled engine model. The determination of the ratios may be based upon one or more assumptions for the engines. One assumption may be that the original engine and the rescaled engine have constant engine geometry proportions, for example in terms of bore, which is the cylinder internal diameter, to stroke ratio. Another assumption may be that the ratio of swept volumes, e.g., engine displacements, of the original and the rescaled engines is known, for example it is specified by the user. Yet another assumption may be that engine torque is proportional to total engine displacement with a power level increase from the original engine to the rescaled engine. Based on these assumptions, the ratio generator 224 may compute the following ratios:

$$\text{Engine Power Ratio}(EngPwrRatio) = \frac{\text{maximum power of rescaled engine}}{\text{maximum power of original engine}} \quad 1)$$

$$\text{Engine Cylinder Number Ratio}(EngCylNumRatio) = \frac{\text{number of cylinders of rescaled engine}}{\text{number of cylinders of original engine}} \quad 2)$$

$$\text{Engine Speed Ratio}(EngSpdRatio) = \sqrt{\frac{EngCylNumRatio}{EngPwrRatio}} \quad 3)$$

$$\text{Engine Torque Ratio}(EngTrqRatio) = \frac{EngPwrRatio}{EngSpdRatio} \quad 4)$$

$$\text{Engine Displacement Ratio}(EngDispRatio) = \frac{EngCylNumRatio}{EngSpdRatio^3} = EngTrqRatio \quad 5)$$

$$\text{Engine Cylinder Volume Ratio}(EngCylVolRatio) = \frac{(\text{Total Displaced Volume of original engine}) * EngTrqRatio/\text{number of cylinders of rescaled engine}}{\text{Total Displaced Volume of original engine/number of cylinders of original engine}} \quad 6)$$

The model rescaling tool 214 may preserve the structural design of the original controller model and the original engine model during the rescaling process, as indicated at step 706. For example, the rescaling tool 214 may not add any new model elements, remove any existing model elements, or change any connections among existing model elements in the original engine model and the original engine controller model. In some embodiments, the model rescaling tool 214 may preserve the structural design of the original models by reusing the original engine controller and engine models. For example, the model rescaling tool 214 may accomplish the rescaling process by directing the original engine and engine controller models to utilize new, rescaled parameter values computed by the model rescaling tool 214 and new, reshaped lookup tables created by the model rescaling tool 214 in place of the original parameters and original lookup tables. Reshaping operations can include not only rescaling of breakpoint parameters, but also nonlinear breakpoint spacing rearrangements to focus the lookup tables in specific regions of high nonlinearity. The model rescaling tool 214 may store new, rescaled parameter values and reshaped lookup tables in a data structure, such as a file, a container object, a workspace variable, etc., and direct the engine and engine controller models to utilize the information in that data structure during execution. In other embodiments, the model rescaling tool 214 may create a new, rescaled engine model and/or a new, rescaled engine controller model that are separate from the original engine model and/or the engine controller model. For example the model rescaling tool 214 may create copies of the original engine model and the original controller model, and may assign the new, rescaled parameter values and the new, reshaped lookup tables to the new, rescaled engine and engine controller models.

The parameter modification engine 226 may assign one or more of the received rescaling factors, such as the number of cylinders and the maximum engine power, to the rescaled engine model and the rescaled controller model, as indicated at step 708. The parameter modification engine 226 may compute new values for volume-based parameters associated with one or more of the rescaled engine model elements as a function of one or more of the determined ratios, such as the EngTrqRatio, among others, as indicated at step 710. For example, the parameter modification engine 226 may compute a rescaled total displaced volume (Vd) parameter, a compressor volume (VolCompOut) parameter, an intake manifold chamber volume (Vint), a cylinder volume at intake valve close volume (f_vivc) parameter vector computed as a function of intake cam phasing, and an exhaust manifold chamber volume (Vexh) parameter, for the rescaled engine model as follows:

Vd of rescaled engine model=Vd of original engine model*EngTrqRatio

VolCompOut of rescaled engine model=VolCompOut of original engine model*EngDispRatio Vint of rescaled engine model=Vint of original engine model*EngDispRatio f_vivc of rescaled engine model=f_vivc of original engine model*EngCylVolRatio Vexh of rescaled engine model=Vexh of original engine model*EngDispRatio.

The parameter modification engine 226 may compute new values for volume-based parameters associated with the rescaled engine controller model as a function of one or more of the determined ratios, as indicated at step 712. For example, the rescaled engine controller model may utilize a total displaced volume (Vd) and a cylinder volume at intake valve close volume (f_vivc) parameter vector during execution, among others. The parameter modification engine 226 may compute rescaled volume-based parameters for the rescaled engine controller model as follows:

Vd of rescaled engine controller model=rescaled Vd computed for rescaled engine model f_vivc of rescaled engine controller model=f_vivc of original engine controller model*EngCylVolRatio The parameter modification engine 226 may compute new values for area-based parameters associated with one or more of the elements of the rescaled engine model as function of one or more of the determined ratios, such as the EngPwrRatio, among others, as indicated at step 714. For example, the parameter modification engine 226 may compute a rescaled intake system area (AirFilterArea), a rescaled throttle bore diameter (ThrDiam), a rescaled exhaust system area (ExhSysArea), and a rescaled wastegate area parameter (WgArea), for the rescaled engine model as follows:

AirFilterArea of rescaled engine model=AirFilterArea of original engine model*EngPwrRatio ThrDiam of rescaled engine model=(ThrDiam of original engine model)$^2$*EngPwrRatio ExhSysArea of rescaled engine model=ExhSysArea of original engine model*EngPwrRatio WgArea of rescaled engine model=WgArea of original engine model*EngPwrRatio The parameter modification engine 226 may compute new values for area-based parameters of the rescaled engine controller model as a function of one or more of the determined ratios, for example the power ratio, as indicated at step 716.

The parameter modification engine 226 may compute new values for parameters associated with the fuel injector element of the rescaled engine model as a function of one or more of the determined ratios, as indicated at step 718. The parameter modification engine 226 also may compute new values for parameters associated with the fuel injector element of the rescaled engine controller model as a function of one or more of the determined ratios, as indicated at step 720. For example, the parameter modification engine 226 may compute one or more rescaled fuel injector slopes which determine the fuel mass delivered vs injector open time (InjSlp) as follows:

InjSlp of rescaled engine model=InjSlp of original engine model*EngCylVolRatio

InjSlp of rescaled engine controller model=InjSlp of original engine controller model*EngCylVolRatio The parameter modification engine 226 may compute new values for parameters associated with the turbocharger element of the rescaled engine model as a function of one or more of the determined ratios, as indicated at step 722. For example, the parameter modification engine 226 may compute a rescaled turbine shaft inertia parameter (TurboInertia) as follows:

TurboInertia of rescaled engine model=TurboInertia of original engine model*EngPwrRatio. The turbocharger compressor and turbine flow characteristic maps may be scaled by engine power ratio to reflect the proportional scaling of turbocharger and compressor with engine breathing and power. The turbocharger speed breakpoints may be rescaled to account for the larger turbine and correspondingly larger compressor blade tip radius by $$TurboSpeedRatio = \sqrt{\frac{1}{EngPwrRatio}}.$$

The original and rescaled engine controller models may include functionality, such as PID control functionality, for controlling the idle speed of the respective engine model. This PID control functionality may utilize a target engine idle speed parameter. The parameter modification engine 226 may compute a new target idle speed parameter for the rescaled engine controller model, as indicated at step 724. For example, the parameter modification engine 226 may compute a rescaled target idle speed parameter as follows:

target idle speed parameter of rescaled engine controller model=target idle speed parameter of original engine controller model*EngSpdRatio The parameter modification engine 226 may compute new values for air mass flow-based parameters associated with one or more of the model engine elements as a function of one or more of the determined ratios, as indicated at step 726. For example, the parameter modification engine 226 may compute a rescaled compressor mass flow rate (CompMassFlwRate) and a rescaled turbine mass flow rate (TurbMassFlwRate) for the rescaled engine model as follows:

CompMassFlwRate of rescaled engine model=CompMassFlwRate of original engine model*EngPwrRatio TurbMassFlwRate of the rescaled engine model=TurbMassFlwRate of original engine model*EngPwrRatio The parameter modification engine 226 may compute new values for mass flow-based parameters associated with the engine controller model as a function of one or more of the determined ratios, as indicated at step 728.

The lookup table reshaping engine 228 may create one or more reshaped lookup tables for the rescaled engine model, as indicated at step 730, and one or more reshaped lookup tables for the rescaled engine controller model, as indicated at step 732. The lookup table reshaping engine 228 may create reshaped lookup tables by scaling one or more of the original table's input breakpoint data sets and/or the original table's output data as a function of one or more of the determined the ratios. For example, the lookup table reshaping engine 228 may modify one or more of the dimensions of a LUT, e.g., the x dimension, the x and y dimensions, the x, y, and z dimensions, etc., as a function of one or more of the ratios.

An engine model may utilize one or more lookup tables to determine engine air mass flow. For example, an engine model may include a dual variable cam phasing form of air mass flow estimation model. This air mass flow estimation model may include an air mass flow table whose two input data breakpoints sets represent exhaust cam phaser angle (in degrees of crank retard) and trapped mass flow rate (f_mdot_trpd_bpt), and whose output data is engine air mass flow (f_mdot_air). The lookup table reshaping engine 228 may create a reshaped air mass flow table for the rescaled engine model as follows:

f_mdot_trpd_bpt of reshaped lookup table=f_mdot_trpd_bpt of original lookup table*EngPwrRatio; and f_mdot_air of reshaped lookup table=f_mdot_air of original lookup table*EngPwrRatio.

An engine controller model also may utilize one or more lookup tables to determine engine air mass flow. For example, an engine controller model may include a dual variable cam phasing form of air mass flow estimation model. This air mass flow estimation model may include an air mass flow table whose two input data breakpoints sets represent exhaust cam phaser angle (in degrees of crank retard) and trapped mass flow rate (TrpdMassFlwBpt), and whose output data is engine air mass flow (AirMassFlw).

The lookup table reshaping engine 228 may create a reshaped air mass flow table for the rescaled engine controller model as follows:

TrpdMassFlwBpt of reshaped lookup table=TrpdMassFlwBpt of original lookup table*EngPwrRatio; and AirMassFlw of reshaped lookup table=AirMassFlw of original lookup table*EngPwrRatio.

An engine model may also include a plurality of lookup tables having input breakpoint data sets for torque, such as commanded torque, and engine speed. The lookup table reshaping engine 228 may scale the original breakpoints included in the original commanded torque breakpoint data sets by multiplying each breakpoint by the EngTrqRatio. The lookup table reshaping engine 228 may scale the original breakpoints included in the original engine speed breakpoint data sets by multiplying each breakpoint by the EngSpdRatio. The lookup table reshaping engine 228 may scale the original breakpoints included in the original commanded torque breakpoint data sets by multiplying each breakpoint by the EngTrqRatio.

The lookup table reshaping engine 228 may scale breakpoints included in friction-related breakpoint data sets used by an engine model by multiplying the breakpoints by the EngTrqRatio. For example, an engine model may include a friction torque lookup table whose input breakpoint data sets represent engine speed and engine load, and whose output data is friction torque. The lookup table reshaping engine 228 may multiply the original engine speed breakpoints by the EngSpdRatio, and may multiply the original friction torque output data values by the EngTrqRatio.

One or more LUTs utilized by an engine plant model and/or an engine controller model may include a load axis or dimension. The load values may be dimensionless, normalized values and may thus be independent of engine size. Accordingly, the lookup table reshaping engine 228 may not modify the load axis or dimension of a LUT during reshaping.

An engine controller model may also include a plurality of lookup tables having input breakpoint data sets for torque, such as commanded torque, and engine speed. Additional load-related breakpoints can be commanded normalized cylinder unburned air mass (load) and commanded total injected fuel mass. The lookup table reshaping engine 228 may scale the original breakpoints included in the original commanded torque breakpoint data sets by multiplying each breakpoint by the determined EngTrqRatio and additionally by changing the spacing of the breakpoints in an optimal nonlinear fashion so as to focus a given table in a region of high nonlinearity. The lookup table reshaping engine 228 may scale the original breakpoints included in the original engine speed breakpoint data sets by multiplying each breakpoint by the EngSpdRatio and additionally by changing the spacing of the breakpoints in an optimal nonlinear fashion so as to focus a given table in a region of high nonlinearity. The lookup table reshaping engine 228 may scale the original breakpoints included in the original commanded torque breakpoint data sets by multiplying each breakpoint by the EngTrqRatio.

The lookup table reshaping engine 228 may scale breakpoints included in friction-related breakpoint data sets of lookup tables used by an engine controller model by multiplying the original breakpoints by the EngTrqRatio. For example, an engine model may include a friction torque lookup table whose input breakpoint data sets represent engine speed and engine load, and whose output data is friction torque. The lookup table reshaping engine 228 may multiply the original engine speed breakpoints by the EngSpdRatio, and may multiply the original friction torque output data values by the EngTrqRatio.

In some embodiments, the lookup table reshaping engine 228 may calibrate or tune rescaled breakpoints, as indicated at step 734. For example, following the rescaling of breakpoints of a lookup table utilized by the rescaled engine model, there may be a mismatch between a corresponding rescaled table utilized by the rescaled engine controller model. The lookup table reshaping engine 228 may identify such mismatches and calibrate or tune either or both tables so that they match by assigning all of the error to one or more adjustable controller parameters, such as throttle area percent and wastegate area percent for a SI engine, and injected fuel mass, VGT rack position, and high pressure EGR valve area percent for a CI engine. Iterative algorithms are and may be used to arrive at numerically precise solutions for the adjustable controller parameters intended to remove stackup errors, such as StateFlow heuristic algorithms and MATLAB-based numerical optimization algorithms. For example, in a SI Engine Dynamometer reference example, StateFlow heuristic rules may be used to adjust the highly nonlinear throttle area percent lookup table parameters at each operating point of the engine to match engine measured torque response to commanded torque response where possible. If torque is not met at wide open throttle, the algorithm may begin closing the turbocharger wastegate to increase boost up to the boost and/or temperature limit of the engine to meet a commanded torque. At operating points where limited engine breathing decreases the peak torque available, or where turborcharger maximum speed limits are reached, the algorithm may stop at the limit, and the engine delivers less torque than the desired torque. For compression ignition CI engines, fuel mass per inject per cylinder plays a similar role to throttle position on the SI engine, and VGT rack position plays a similar role to wastegate area percent on a SI engine. EGR valve area percent may be used to meet EGR flow requirements in NOx control as a constraint.

Figure 8:
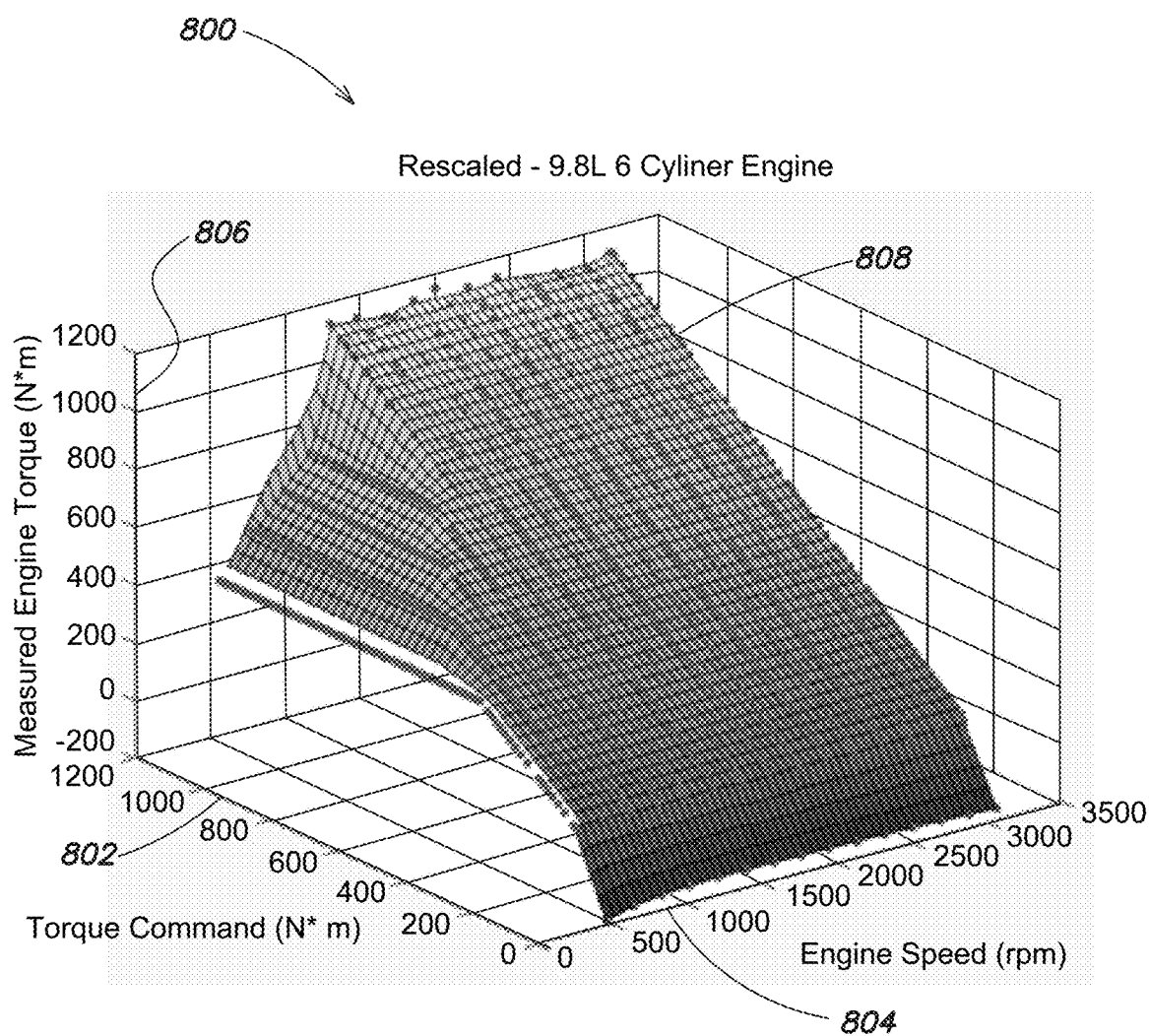
FIG. 8 is a schematic illustration of an example reshaped lookup table for use by rescaled engine model in accordance with an embodiment.

FIG. 8 is a schematic illustration of a rescaled lookup table 800 for obtaining engine brake torque as a function of engine speed and a torque command. The table 800 includes a torque command axis 802, an engine speed axis 804, and a measured engine torque axis 806. The table 800 further includes output data 808.

Figure 9:
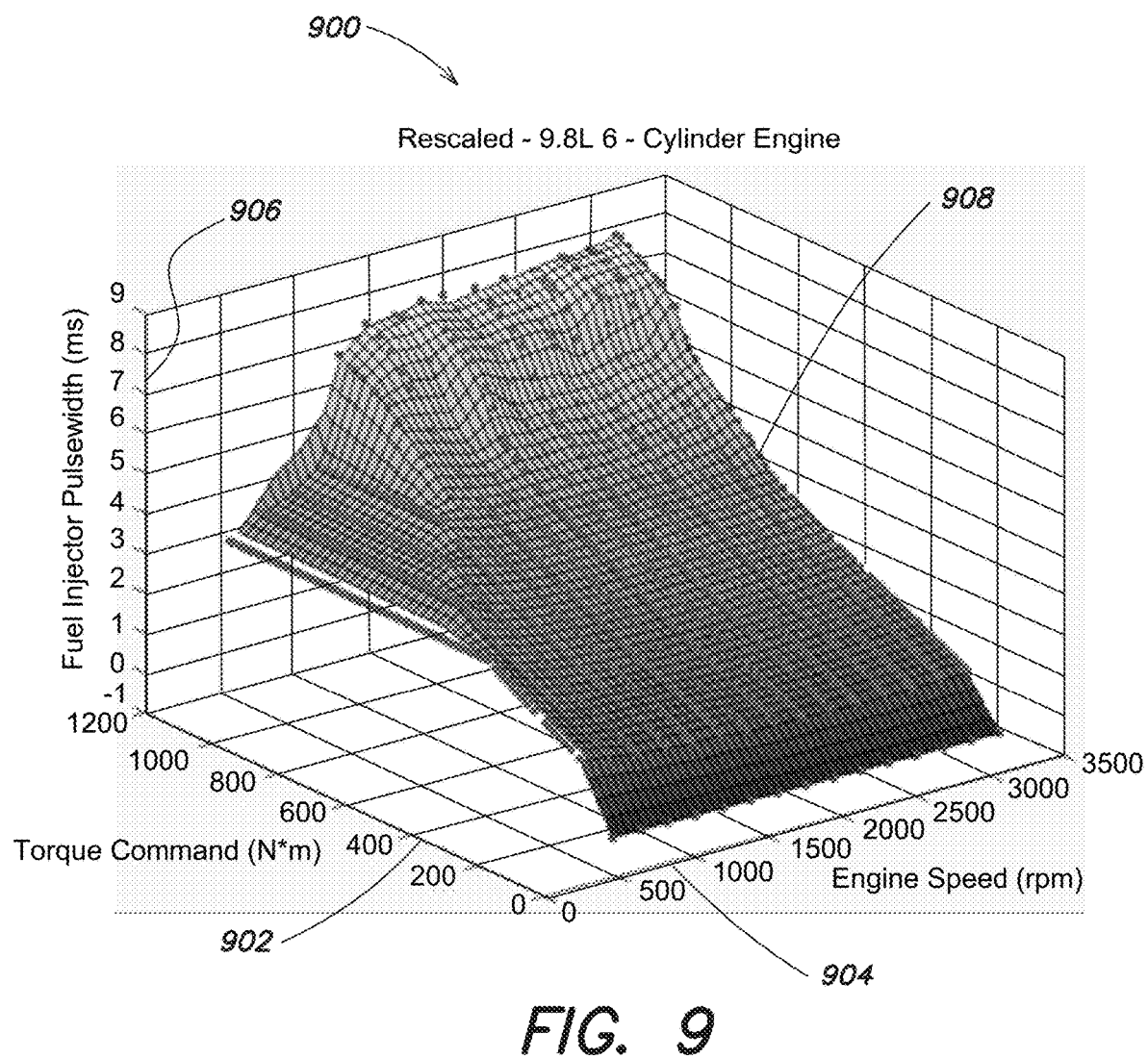
FIG. 9 is a schematic illustration of an example reshaped lookup table for use by a rescaled engine controller model in accordance with an embodiment.

FIG. 9 is a schematic illustration of an example of a rescaled lookup table 900 for obtaining a fuel injector pulsewidth and/or total fuel mass per inject per cylinder command for a fuel injector as a function of a torque command and engine speed. The table 900 includes a torque command axis 902, an engine speed axis 904, and a fuel injector pulsewidth axis or fuel mass per inject axis 906. The table 900 further includes output data 908.

The tables 800 and 900 may be rescaled versions of tables 500 and 600, respectively, for a larger size engine, e.g. a six cylinder 9.8 L engine, which may have four times the power of the original engine.

Comparing tables 500 and 800, it can be seen that engine speeds have been scaled down, e.g., due to the much larger stroke of the engine (note: while the bore/stroke ratio may be fixed, the stroke itself is much larger), and torque commands have been scaled up for the larger sized engine. Additionally, the output data, measured engine torque, is nonlinearly scaled up for the larger sized engine. For the larger sized engine, the location of peak torque is shifted with respect to engine speed in a nonlinear fashion with engine speed. Peak torque occurs at a much lower speed, as expected with large engines.

Regarding tables 900 and 600, injector slope (injector sizing) is different for the larger sized engine. Although there are more cylinders (6 vs. 4), which would normally mean smaller injectors, each individual cylinder of the larger sized 6 cylinder engine is much larger than a single cylinder of the original 1.5 L engine. Accordingly, the injector slope is larger for the new larger sized engine. For the larger sized engine, the injector pulsewidth (injector on-time) is not substantially different in scale from the original engine. This may be because the injectors themselves are increased in size to match the change in cylinder volume, so the on-time of the injectors of the small and large engines are relatively similar, although the location of large puslewidths (larger injected fuel masses) has shifted in engine speed.

Figure 10:
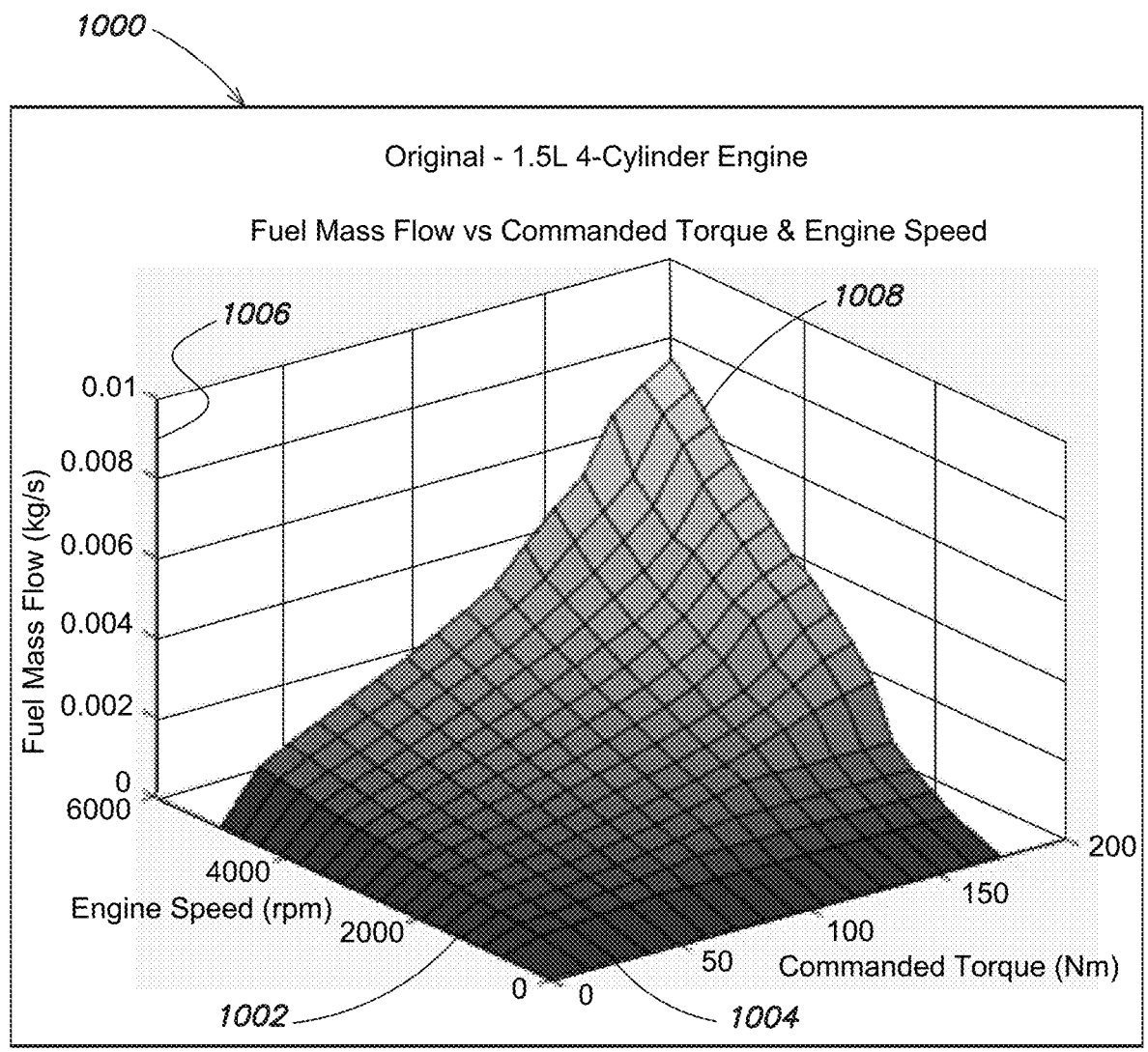
FIG. 10 is a schematic illustration of an example of an original lookup table in accordance with an embodiment.

FIG. 10 is a schematic illustration of an example of a lookup table 1000 for obtaining fuel mass flow for an original engine model that models a 1.5 L four-cylinder engine. The table 1000 includes an engine speed axis 1002, a commanded torque axis 1004, and a fuel mass flow axis 1006. The table 1000 further includes output data 1008.

Figure 11:
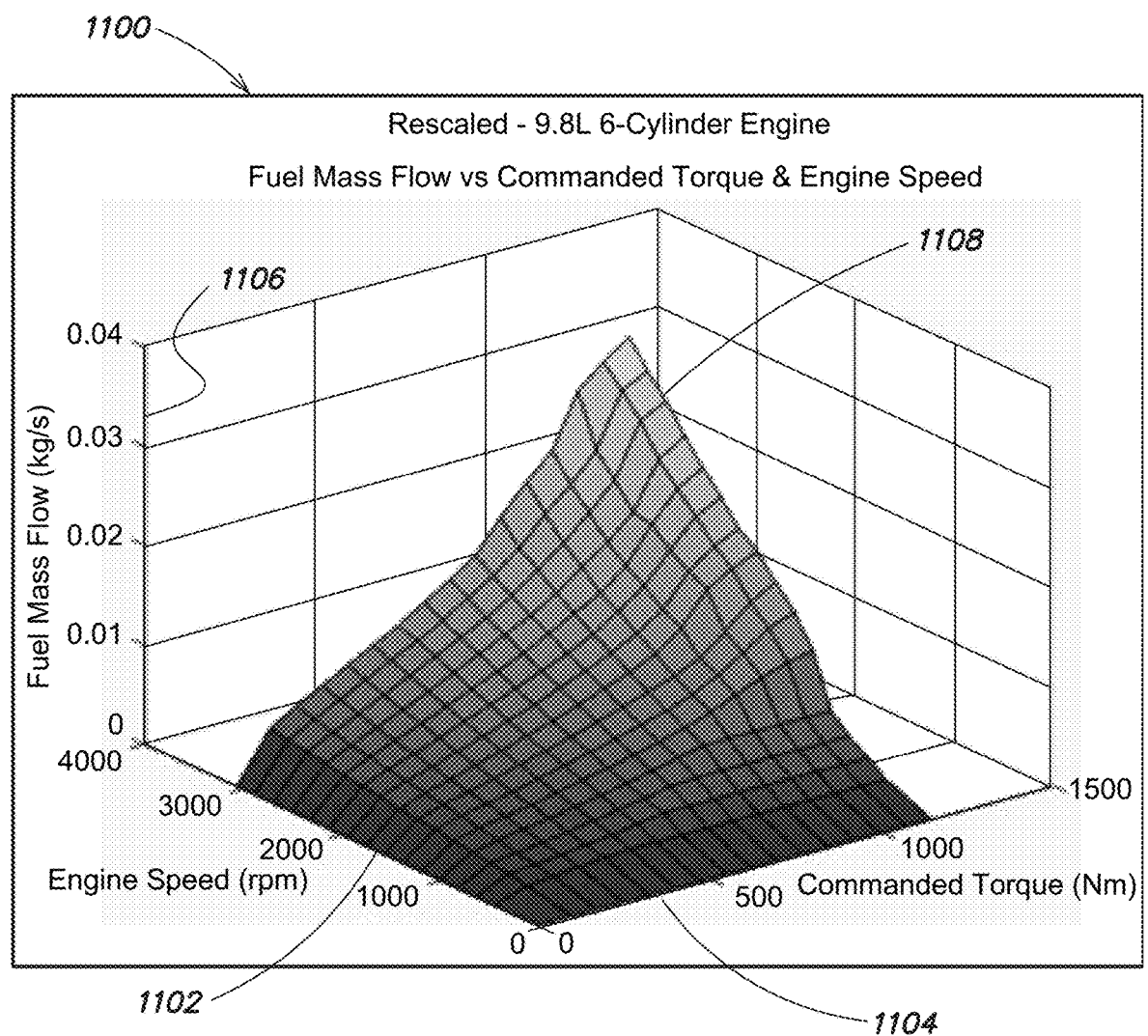
FIG. 11 is a schematic illustration of an example of a reshaped lookup table in accordance with an embodiment.

FIG. 11 is a schematic illustration of an example of a rescaled lookup table 1100 for obtaining fuel mass flow for a rescaled engine model that models a 9.8 L six-cylinder engine. The table 1100 includes an engine speed axis 1102, a commanded torque axis 1104, and a fuel mass flow axis 1106. The table 1100 further includes output data 1108.

It should be observed that the larger engine has dramatically larger torque breakpoints, and dramatically lower engine speed breakpoints than the smaller engine, and that the engine speed breakpoints move the peak torque to a new location in a nonlinear fashion.

In some embodiments, an engine model may generate emissions data during execution of the engine model. These emissions characteristics may be measured from a detailed emission model, or more preferably from an engine tested in a laboratory. The engine model may generate the emissions data based on data from one or more lookup tables and optionally with dynamically tuned estimators included in or accessible by the engine model. Exemplary emissions may include hydrocarbon (HC) mass fraction, carbon monoxide (CO) mass fraction, nitric oxide and nitrogen dioxide (NOx) mass fraction, and carbon dioxide ($CO_2$) mass fraction. Information in the emissions lookup tables may be based on test results obtained while running an actual, physical engine in a lab. The lookup table reshaping engine 228 may reshape the emissions tables when rescaling an engine model to represent a differently sized engine, thereby providing realistic empirically based emissions estimates for the re-sized engine without requiring a complete re-execution of testing in the laboratory or detailed engine emission model. The rescaled engine model created by the model rescaling tool 214 may thus predict new emission levels and locations of emission peaks and valleys in engine speed and torque operating point terms for the resized engine being modeled.

Figure 12:
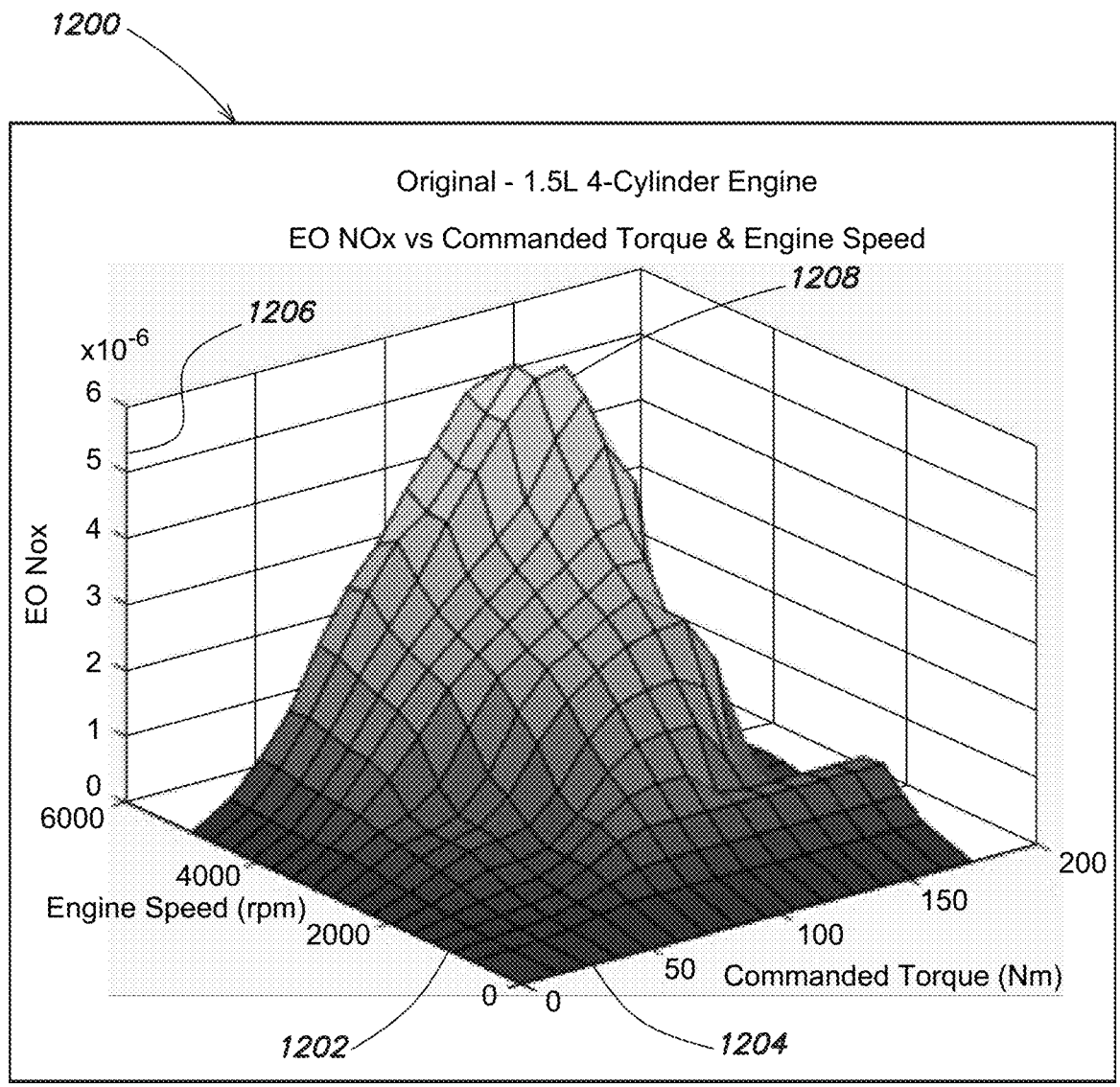
FIG. 12 is a schematic illustration of an example of an original lookup table in accordance with an embodiment.

FIG. 12 is a schematic illustration of an example of a lookup table 1200 for obtaining NOx mass fraction for an engine model that models a 1.5 L four cylinder engine. The table 1200 includes an engine speed axis 1202, a commanded torque axis 1204, and a NOx mass fraction axis 1206. The table 1200 also includes output data 1208.

Figure 13:
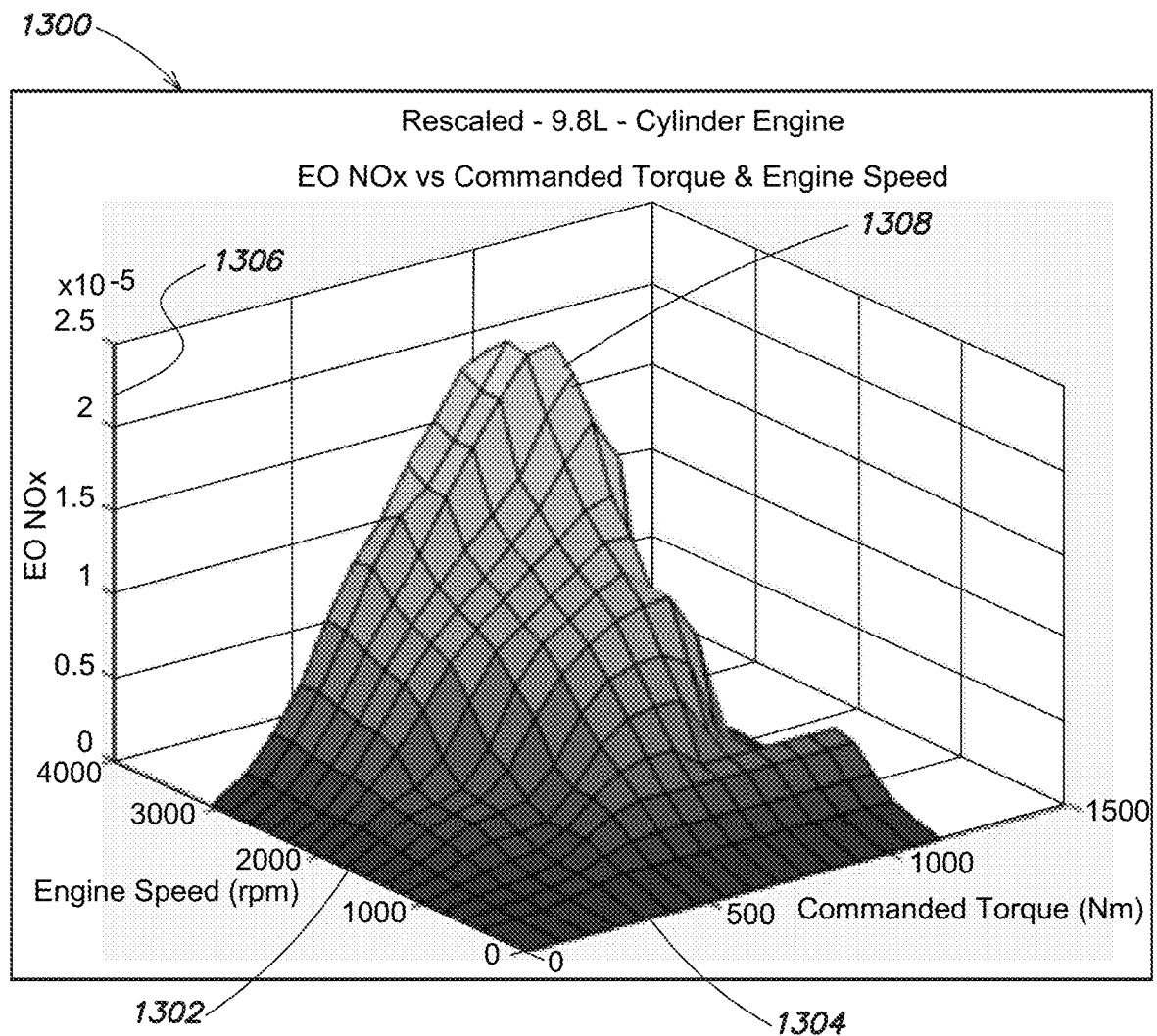
FIG. 13 is a schematic illustration of an example of a reshaped lookup table in accordance with an embodiment.

FIG. 13 is a schematic illustration of an example of a rescaled lookup table 1300 for obtaining NOx mass fraction for a rescaled engine model that models a 9.8 L six cylinder engine. The table 1300 an engine speed axis 1302, a commanded torque axis 1304, and a NOx mass fraction axis 1306. The table 1300 also includes output data 1308. As with fuel flow after re-scale, it should be noted that the relationships between emission response features such as peaks and troughs are shifted with respect to engine speed in a nonlinear fashion. Since emission mass fractions are involved as opposed to absolute emissions, there is no need to scale the emission mass fractions with engine power ratio and engine breathing.

Returning to FIG. 7D, the model rescaling tool 214 may store the rescaled engine model parameters, rescaled engine controller model parameters, and/or the reshaped lookup tables in one or more data structures, as indicated at step 736. For example, the model rescaling tool 214 may store the parameters and lookup tables in a container file or object, such as a configuration set object. Configuration set objects may contain information specifying one or more parameters, attributes or properties of a model. Multiple configuration set objects may be defined for a particular model, and each configuration set object may contain different values for the model's parameters, attributes, or properties. A given one of the configuration set objects may be selected for use during execution of the model. The values included in the given configuration set object may be used to set corresponding model parameters, attributes, or properties before or during execution of the model.

In some embodiments, the modeling environment 200 may establish one or more model workspaces, masked workspaces, or data dictionary files for a model opened by the model editor 204 and/or loaded from persistent memory into main memory. Variables utilized during execution of the model may be stored in the one or more model workspaces. For example, model element parameters may be saved as workspace variables in the one or more model workspaces. The modeling environment 200 may utilize the configuration set object containing rescaled parameters and reshaped lookup tables to initialize a model workspace for the rescaled engine controller model and the rescaled engine model.

In some embodiments, the model rescaling tool 214 and/or the UI engine 202 may output or present parameters of the original engine controller model and the original engine model, as indicated at step 738. The model rescaling tool 214 also may output or present rescaled parameters of the rescaled engine controller model and the rescaled engine model, as indicated at step 740. A user may examine the presented parameters for comparison or other purposes.

Figure 14:
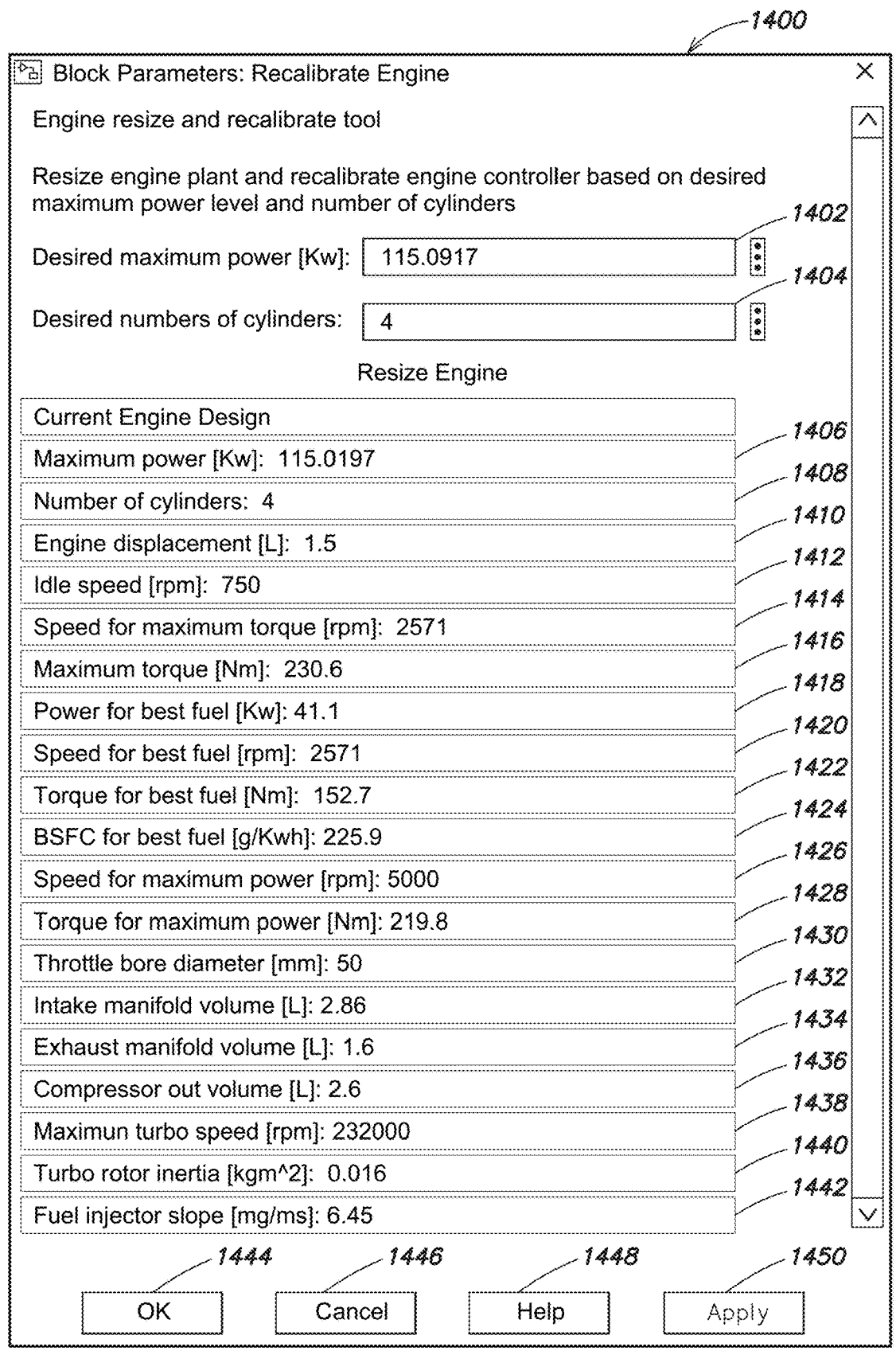
FIG. 14 is a schematic illustration of an example of a User Interface in accordance with an embodiment.

FIG. 14 is a schematic illustration of an example User Interface (UI) 1400 for receiving rescaling factors and presenting original engine controller model and engine model parameters in accordance with an embodiment. The UI 1400 may include a plurality of controls or widgets for receiving and/or displaying data. For example, the UI 1400 may include a Desired maximum power control 1402 and a Desired number of cylinders control 1404. The values presented in the Desired maximum power control 1402 and a Desired number of cylinders control 1404 may correspond to the rescaling factors and may be user editable. As illustrated, for the original engine model, the Desired maximum power is 115.0917 Kw, and the Desired number of cylinders is 4. The UI 1400 may include other controls that present at least some of the parameters associated with the engine model and/or engine control model. For example, the UI 1400 may include a Maximum power control 1406, a Number of cylinders control 1408, an Engine displacement control 1410, an Idle speed control 1412, a Speed for maximum torque control 1414, a Maximum torque control 1416, a Power for best fuel control 1418, a Speed for best fuel control 1420, a Torque for best fuel control 1422, a brake specific fuel consumption (BSFC) for best fuel control

1424, a Speed for maximum power control 1426, a Torque for maximum power control 1428, a Throttle bore diameter control 1430, an Intake manifold volume control 1432, an Exhaust manifold volume control 1434, a Compressor out volume control 1436, a Maximum turbo speed control 1438, a Turbo rotor inertia control 1440, and a Fuel injector slope control 1442. It should be understood that the list of controls is exemplary only, and that other values for additional and/or other parameters may be presented.

The UI 1400 may also include one or more command buttons, such as an OK button 1444, a Cancel button 1446, a Help button 1448, and an Apply button 1450.

In some embodiments, after entering values for the rescaling factors, e.g., Desired maximum power and Desired number of cylinders, a user may select the Apply button 1450. In response, the model rescaling tool 214 may generate a rescaled engine model and a matching rescaled engine controller model.

Figure 15:
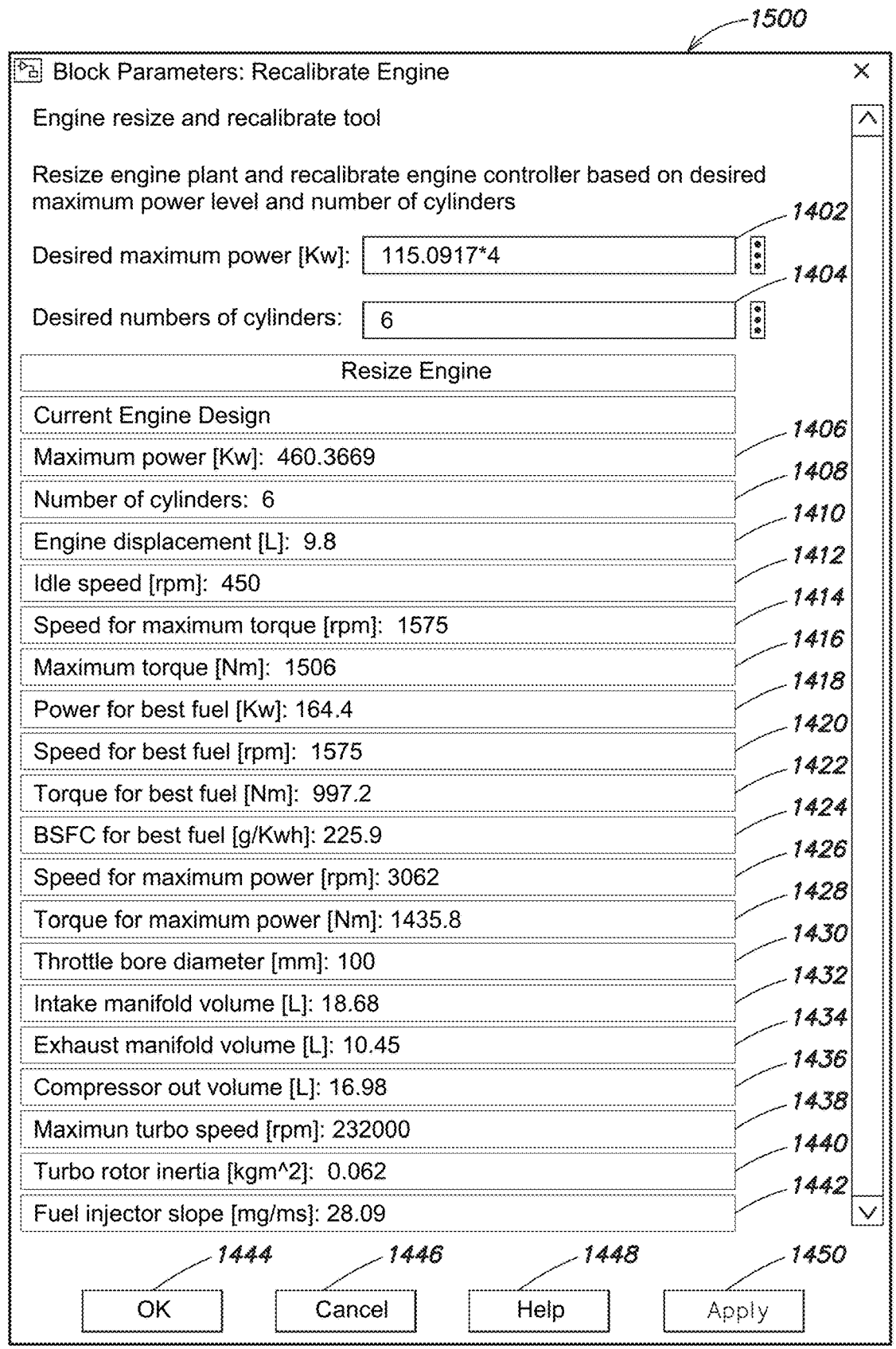
FIG. 15 is a schematic illustration of an example of another User Interface in accordance with an embodiment.

FIG. 15 is a schematic illustration of an example User Interface 1500 presenting the received rescaling factors and the rescaled engine controller model and engine model parameters. For the resized engine, the user has entered 115.0917*4 in the Desired maximum power control 1402, e.g., a fourfold increase in the original engines maximum power. In the Desired number of cylinders control 1404, the user has entered 6. In the remaining controls of the UI 1400 are presented the respective rescaled parameters. As indicated in the Idle speed control 1412, increasing the size of the engine results in the engine's idle speed dropping from 750 rpm to 459 rpm.

As alternatives to rescaling operations defined solely by changes to engine power and number of cylinders, any other combination of parameters that yield unique re-size characteristics can be chosen by the user. For example, the user could be given the option to specify re-sized engine displacement volume Vd in place of engine power, and location of minimum BSFC in engine speed in place of number of cylinders, leaving re-sized engine power and re-sized engine number of cylinders as free variables.

It should be understood that the rescaling of the original model of a four cylinder 1.5 L engine to a model of a six cylinder 9.8 L engine having four times the power as the original engine described herein is just one example. The model rescaling tool 214 may rescale an original model of an engine, such as the four cylinder 1.5 L engine, to models of other larger size engines or to models of smaller size engines, such as a one cylinder 0.15 L engine.

Returning to FIG. 7D, in some embodiments, the rescaled engine controller model and the rescaled engine model may be executed, as indicated at step 742. For example, the rescaled engine controller model and the rescaled engine plant model may be included in and thus executed as part of a system model.

The simulation engine 212 may execute the system model including the rescaled engine controller model and the rescaled engine plant model. For example, a user may select a Run command button of a command toolbar presented by the UI engine 202 in a model editor window. Alternatively, a user may enter a text-based command in a CLI. A model, such as the system model, may also be executed programmatically. In some embodiments, model execution may include a compile stage, a link stage, and a simulation loop stage. The compile and link stages may be performed by the model compiler 220 of the simulation engine 212. The compile stage may mark the start of execution of the model, and may involve preparing data structures and evaluating parameters, configuring and propagating model element characteristics (e.g., sample times, data types, etc.), determining model element connectivity, performing model element reduction and model element insertion, and generating a sorted order of the equations corresponding to the model elements of the model. Model element reduction may include collapsing and/or reducing one or more groups of model elements. For example, model elements or signals determined to be in an unused code path, e.g., dead code, rate transition model elements whose input frequency is faster than their output frequency, and type conversion blocks determined to be unnecessary may be collapsed or removed.

The preparation of data structures and the evaluation of parameters may create and initialize one or more data structures used in the compile stage. For each model element, a method may force the model element to evaluate all of its parameters. During the configuration and propagation of model element and port/signal characteristics, the compiled attributes (such as data dimensions, data types, complexity, sample modes, and sample time) of each model element (and/or ports) may be setup on the basis of the corresponding behaviors and the attributes of model elements (and/or ports) that are connected to the given model element through lines, e.g., arrows. Attributes may also be setup based on the context of a model element or a component in a model. For example, a subsystem, which may be a group of model elements hierarchically represented as a single model element, that has a given sample time may have this sample time be set to the sample time of model elements included in the subsystem.

The attribute setup may be performed through a process during which model element behaviors "ripple through" the model from one model element to the next following signal or other connectivity, as well as through the hierarchical structure of the model, and may for example follow connectivity in a forward or backward manner. This process is referred to as "propagation." In the case of a model element that has explicitly specified its model element behaviors or the behaviors of its ports, propagation may help ensure that the attributes of the model element are compatible with the attributes of the model elements connected to it or contained by it. If not, an error may be issued. At least some model elements may be implemented to be compatible with a wide range of attributes. Such model elements may adapt their behavior in accordance with the attributes of the model elements connected to them. The exact implementation of the model element may be chosen on the basis of the model in which the model element is located. Included within this step are other aspects such as validating that all rate-transitions yield deterministic results, and that the appropriate rate transition blocks are being used.

The compilation step also may determine model element connectivity. For example, a model may include one or more virtual blocks that may play no semantic role in the execution of the model. In this step, the virtual blocks may be optimized away, e.g., removed, and the remaining non-virtual model elements may be reconnected to each other appropriately. This compiled version of the model with actual model element connections may be used from this point forward in the execution process.

One or more in memory representations, such as intermediate representations (IRs), may be generated for the model by the IR builder 224. At least one of the IRs may be in the form of a directed graph, such as a hierarchical, Data Flow Graph (DFG) having a plurality of nodes interconnected by edges. The nodes of the IR may represent model elements from the executable graphical model, the edges of the IR may represent connections among the model's model elements. Special nodes of the IR may be used to provide hierarchy in the IR, for example, by abstractly representing subsystems or other components of the model. In some implementations, model elements of the model may map to one or more nodes of the IR, and lines or arrows of the model may map to one or more edges of the IR.

It should be understood that an IR may take other forms, such as a Control Flow Graph (CFG), Control Data Flow Graph (CDFG), program structure tree (PST), abstract syntax tree (AST), a netlist, etc. A CDFG may capture the control flow as well as the data flow of a graphical model through data dependency and control dependency edges.

The in-memory representation or IR may be stored in memory, such as the main memory or a persistent memory of a data processing device.

Following the compilation stage, code may or may not be generated for the model. If code is generated, the model may be executed through an accelerated execution mode in which the model, or portions of it, is translated into either software modules or hardware descriptions, which is broadly referred to herein as code. If this stage is performed, then the stages that follow may use the generated code during the execution of the model. If code is not generated, the model may execute in an interpretive mode in which the compiled and linked version of the model may be directly utilized to execute the model over the desired time-span. When users generate code for a model, they may choose to not proceed further with the model's execution. For example, they may choose to take the generated code and deploy it outside of the confines of the modeling environment 200.

The link stage may involve memory allocation, and generation of a block method execution list from the sorted order. During the simulation loop stage, the compiled and linked version of the model may be directly utilized by the simulation engine 212 to execute the model in an interpreted mode. The way in which the input and output of model elements are interconnected in the model does not necessarily define the order in which the equations (methods) corresponding to the individual model elements will be solved (executed). The actual order may be determined during the sorting step in compilation.

Figure 7A:
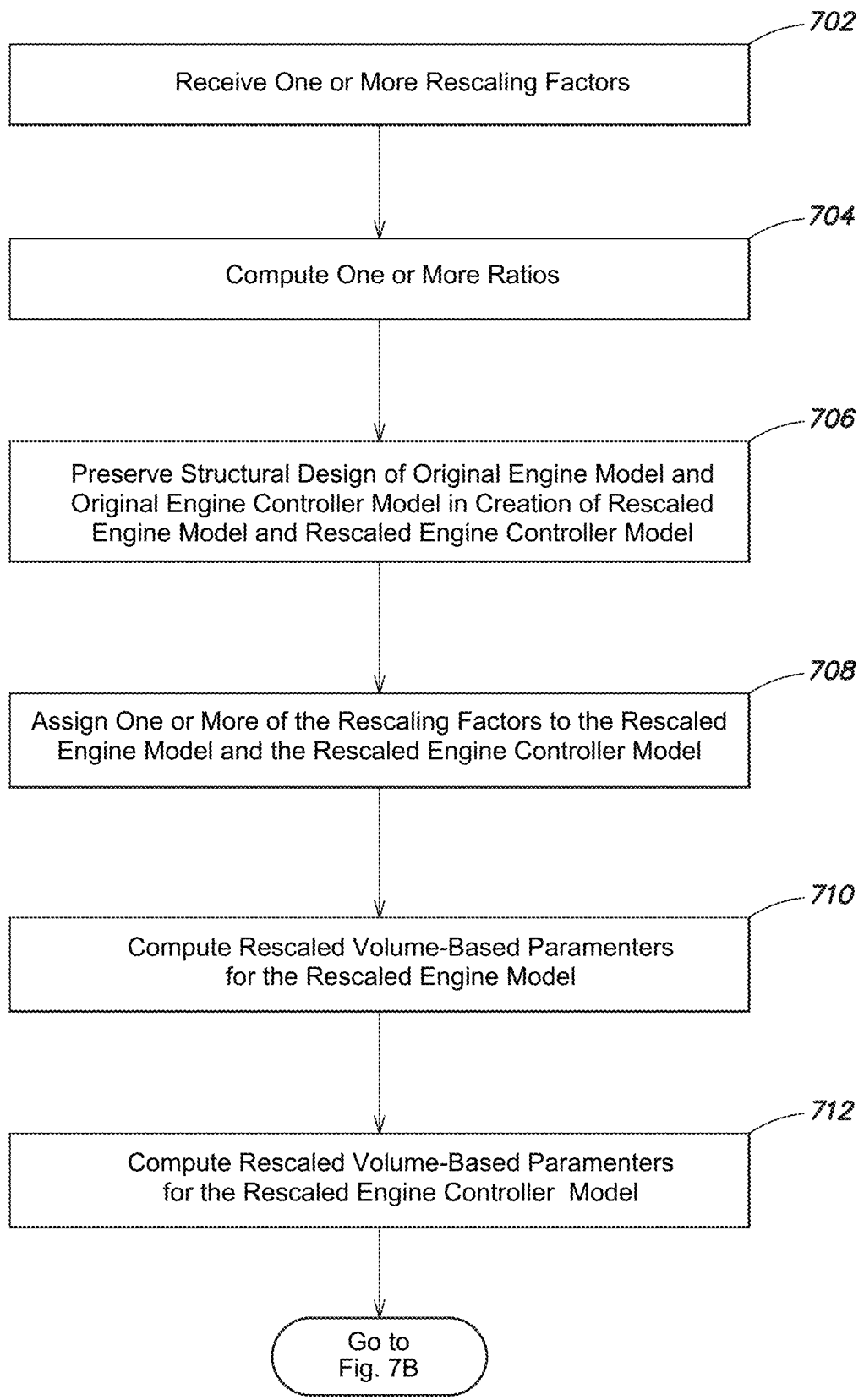
FIGS. 7A-E are partial views of a flow diagram of an example method in accordance with an embodiment.
Figure 7B:
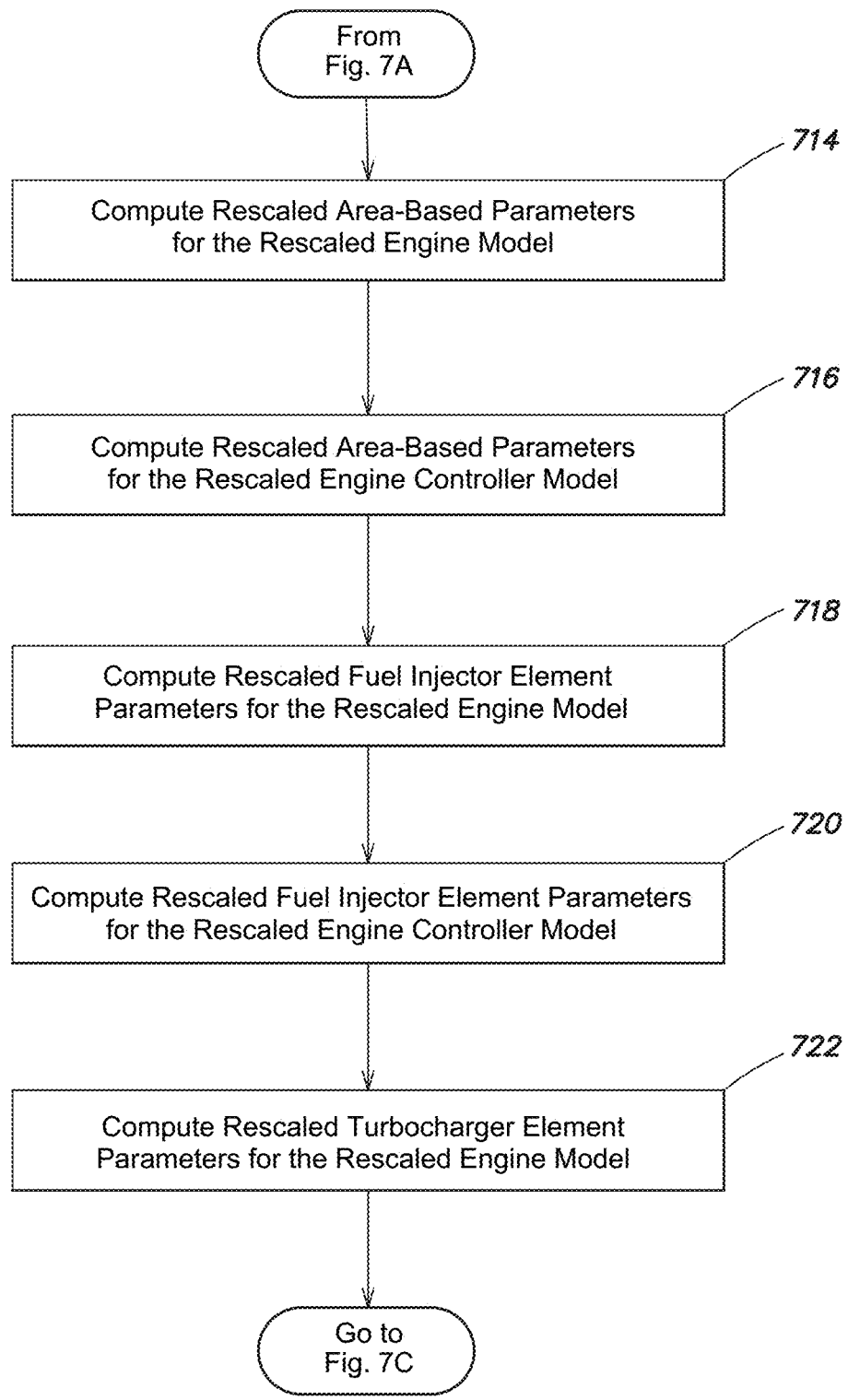
Figure 7C:
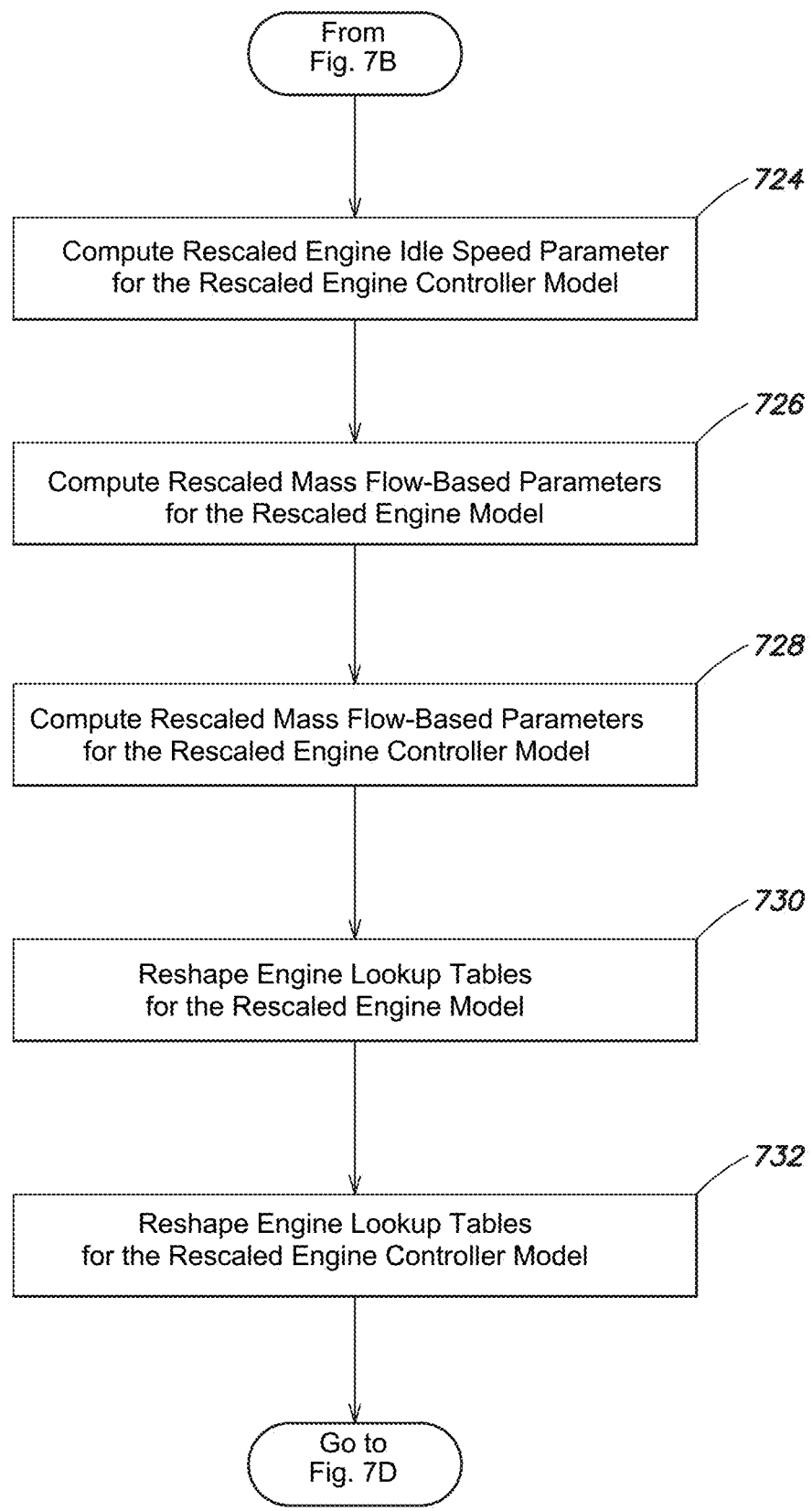
Figure 7D:
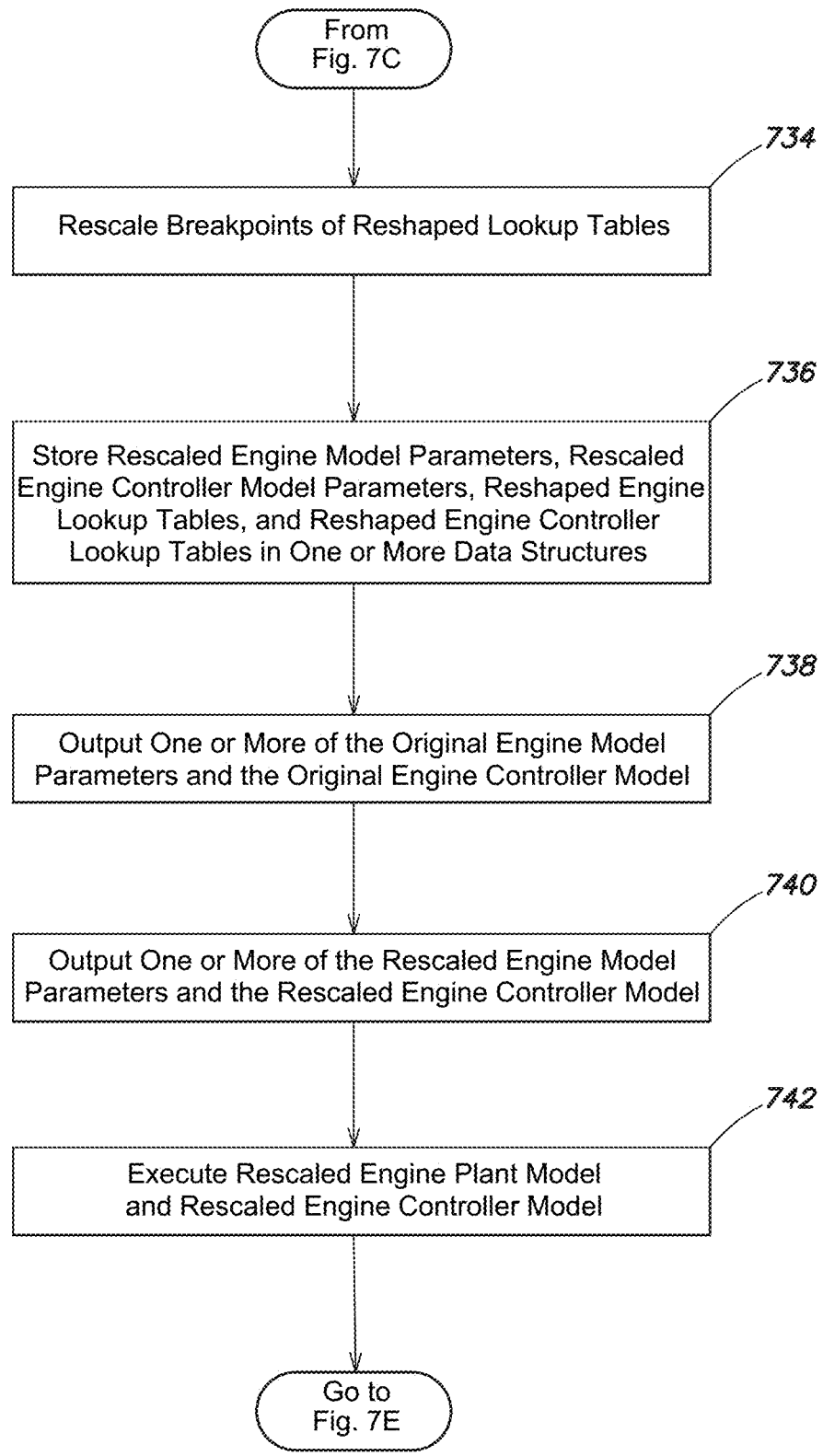
Figure 7E:
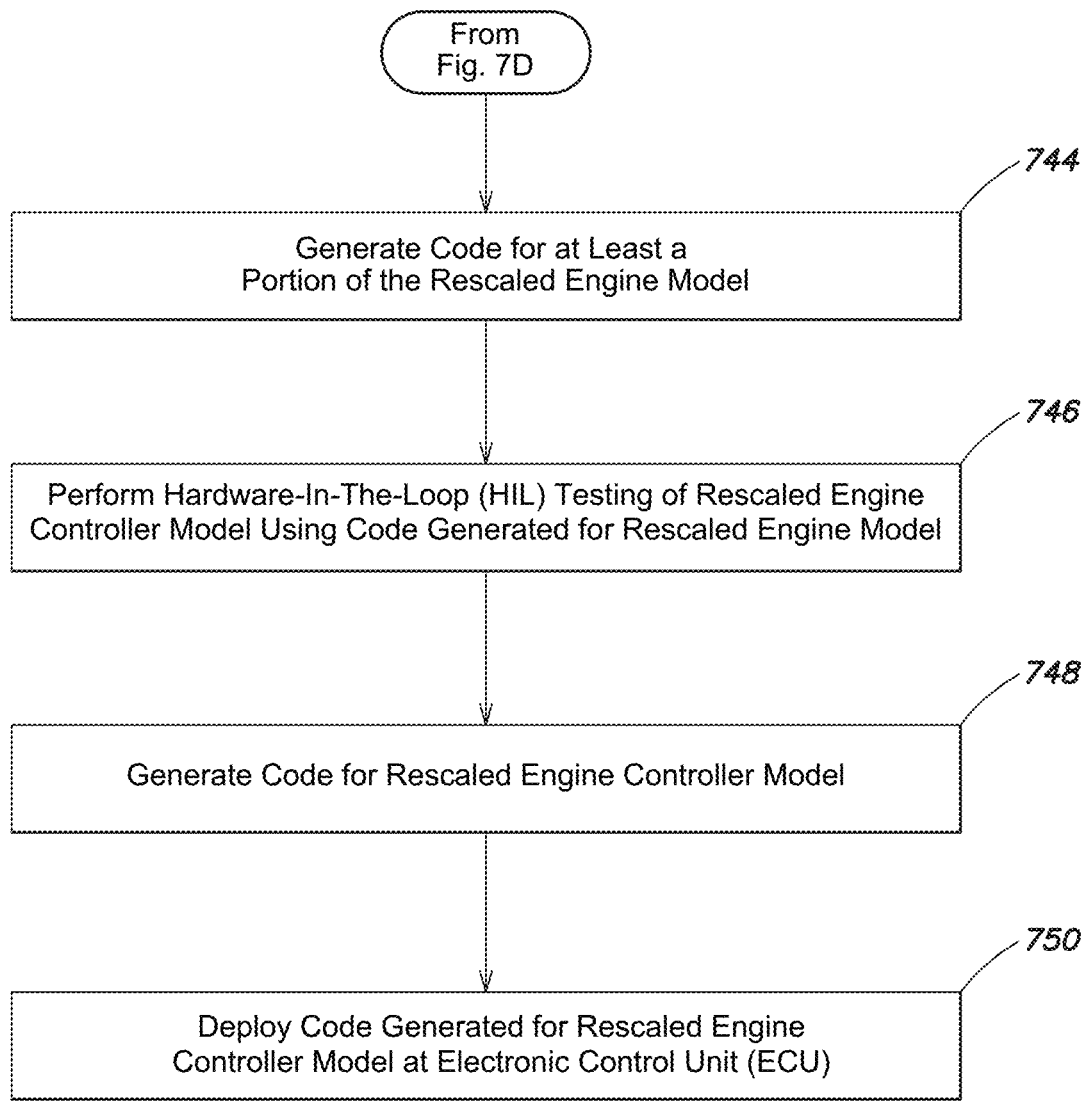

Alternatively or additionally to model execution, the code generator 208 may generate code for at least a portion of the rescaled engine model, as indicated at step 744 (FIG. 7E). The generated code for the rescaled engine model may be utilized in Hardware-in-the-Loop (HIL) testing of the rescaled engine controller model, as indicated at step 746. Alternatively or additionally to model execution and/or HIL testing, the code generator 208 may generate code for the rescaled engine controller model, as indicated at step 748. The generated code for the rescaled engine controller model may be deployed as embedded software on an electronic control unit (ECU), as indicated at step 750.

Iterative Search

In some embodiments, the model rescaling tool 214 may perform an iterative search within a parameter space. For example, instead of specifying maximum engine power as a rescaling factor, a user may specify throttle bore diameter at the Throttle bore diameter control 1430. The model rescaling tool 214 may generate a rescaled engine controller model and a rescaled engine model based on these rescaling factors. Any combination of mutually exclusive parameters as dictated by the constraining relations and assumptions of engine physics can be designated by the user as free variables, with the remaining parameters as a combination of derived or fixed variables. The derived variables (e.g. BSFC and location of minimum BSFC) can be arrived at directly where possible, or iteratively using heuristic and/or mathematical engine rescaling engine solvers.

Generation of Static Engine Model

In some embodiments, the static engine model constructor 230 may create a static rescaled engine model using data generated during testing of the rescaled engine controller model and the rescaled engine model. Additionally a third party detailed dynamic engine model can be used as a testing source from which to create a static rescaled engine model equivalent in an automated labor-saving fashion.

Figure 16A:
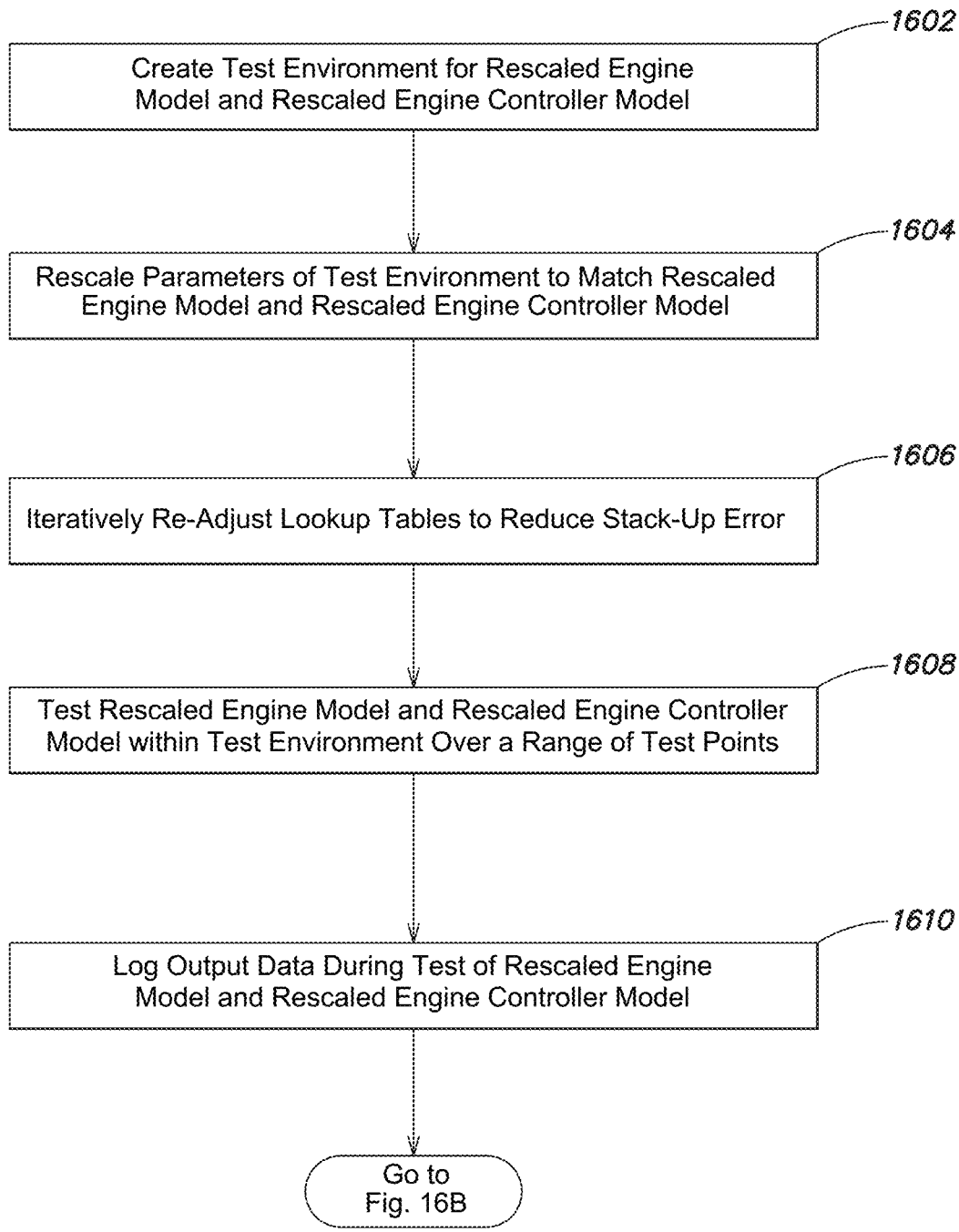
FIGS. 16A and 16B are partial views of a flow diagram of an example method in accordance with an embodiment.
Figure 16B:
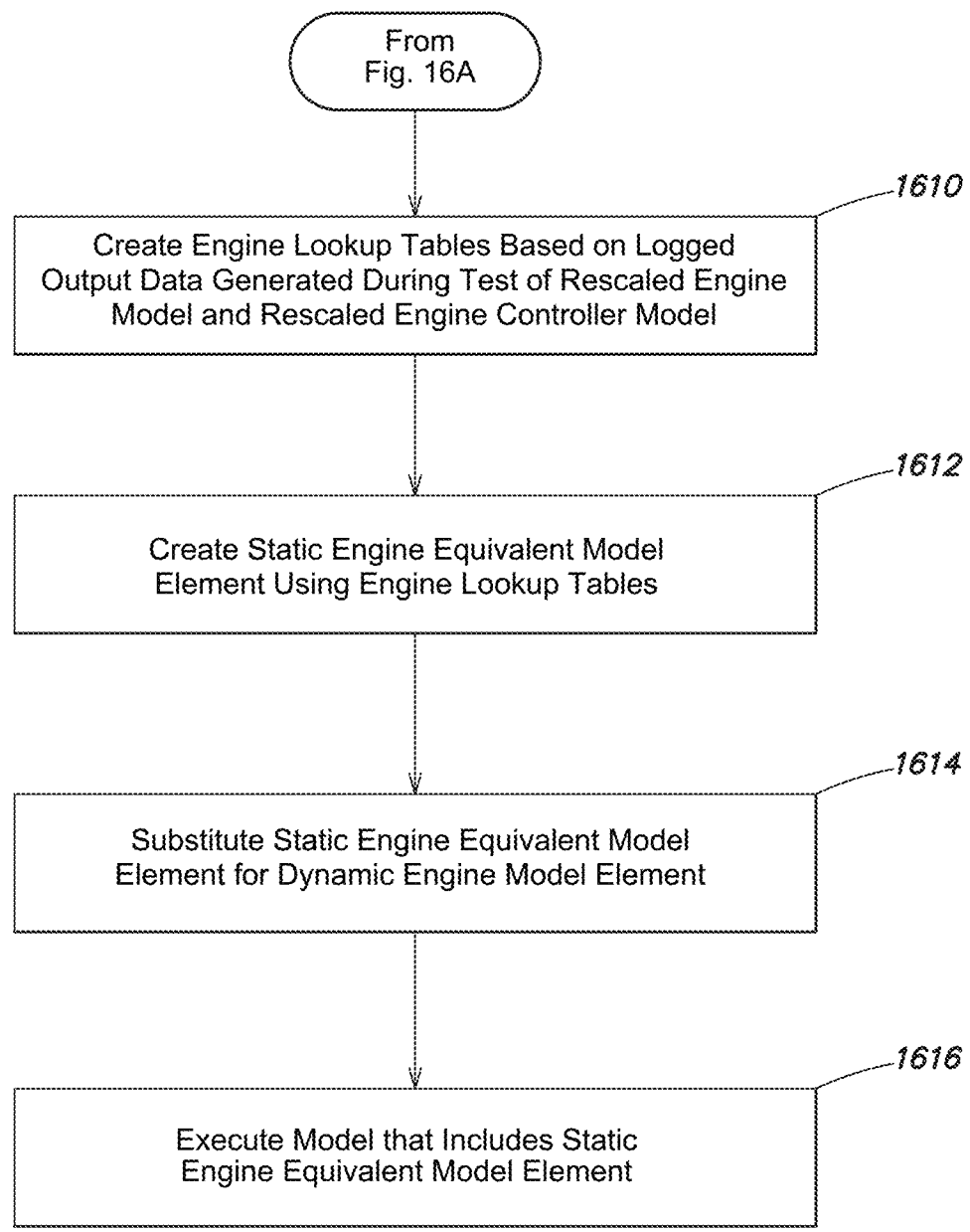

FIGS. 16A and 16B are partial views of a flow diagram of an example method in accordance with an embodiment. The modeling environment 200 may include the rescaled engine controller model and the rescaled engine model in a test environment, as indicated at step 1602. For example, the modeling environment 200 may include the rescaled engine controller model and the rescaled engine model in a dynamometer model.

Figure 17:
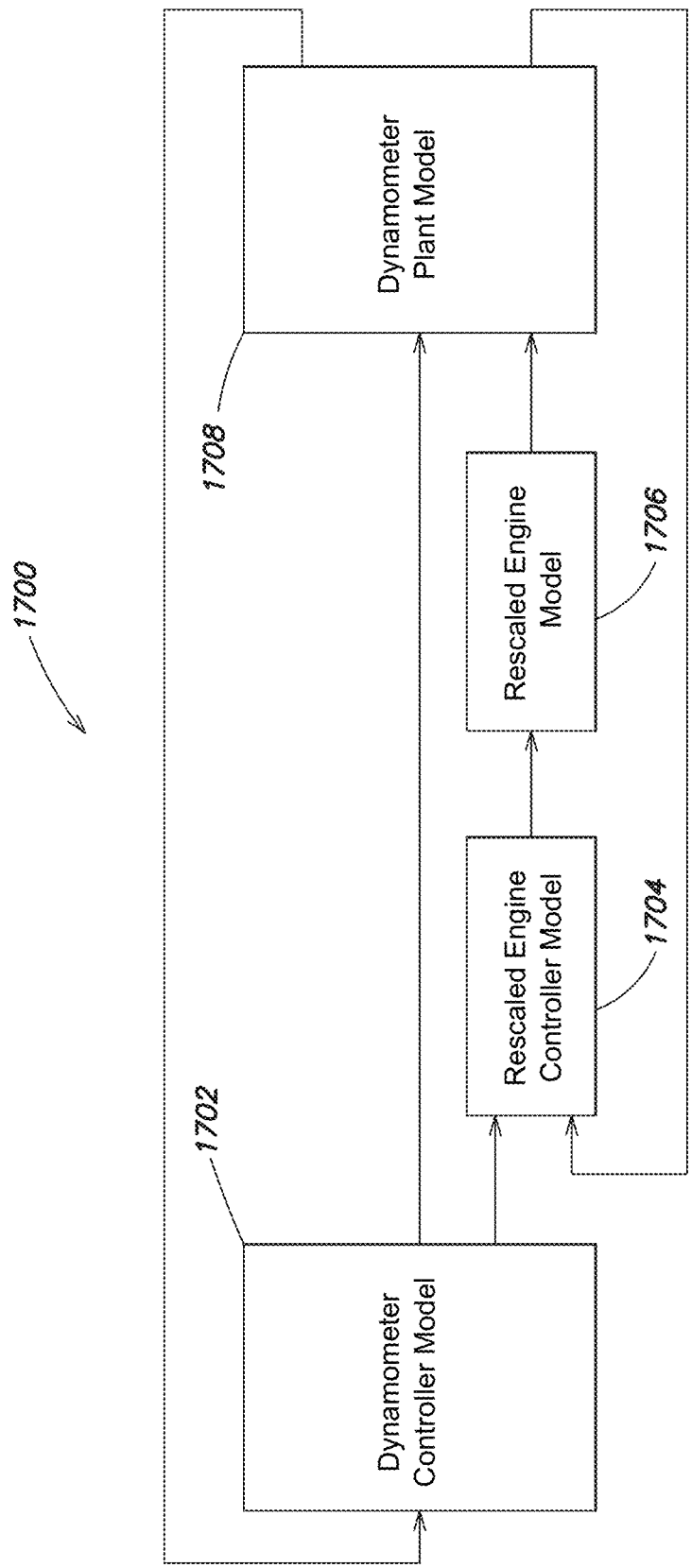
FIG. 17 is a schematic illustration of an example dynamometer model in accordance with an embodiment.

FIG. 17 is a schematic illustration of an example dynamometer system model 1700 for testing the rescaled engine controller model and the rescaled engine model in accordance with an embodiment. The dynamometer system model 1700 may include a dynamometer controller model 1702, a rescaled engine controller model 1704, a rescaled engine model 1706, and a dynamometer plant model 1708. Suitable dynamometer system models include the SI and CI Engine Dynamometer Reference Applications from The MathWorks, Inc.

In some embodiments, an original dynamometer model may have been created for the original engine controller model and the original engine model. The model rescaling tool 214 may reuse this dynamometer model. The model rescaling tool 214 may rescale one or more parameters of the dynamometer model to match the size of the rescaled engine controller and engine models using the one or more computed ratios, as indicated at step 1604. For example, the model rescaling tool may rescale the testing range in torque and speed to reflect the new engine size. For example, the dynamometer controller model may include a plurality of original engine speed command points for testing an engine controller model and engine model. The model rescaling tool 214 may generate rescaled engine speed command points as follows:

rescaled engine speed command points=original engine speed command points*EngSpdRatio.

The dynamometer controller model also may include a plurality of original engine torque command points. The model rescaling tool 214 may generate rescaled engine torque command points as follows:

rescaled engine torque command points=original engine torque command points*EngTrqRatio.

The dynamometer plant model may include parameters, such motor size parameters, inertia parameters, power absorption parameters, heat rejection capacity parameters, etc. These additional parameters may also be rescaled.

In some embodiments, one or more lookup tables may be iteratively re-adjusted to reduce stack-up errors that may occur, as indicated at step 1606. The iterative re-adjusting may be performed on a limited subset of parameters and/or lookup tables, such as parameters used to take up the slack between measured torque and commanded torque. For example, throttle and wastegate engine controller calibration tables may be re-adjusted iteratively using the Stateflow state chart tool to reduce and/or remove stack-up error that may arise due to the re-scaling of the engine plant model calibration tables. The stack-up error may include the difference between commanded engine torque and actual engine torque.

With the dynamometer model rescaled to match the rescaled engine controller and engine models, the rescaled dynamometer model may be run to test the rescaled engine controller and engine models at a plurality of test points, as indicated at step 1608. At step 1608, the final engine performance may be evaluated the after the re-scale operation of step 1604 and the re-adjust or retuning to remove stack-up error in step 1606. During testing of the rescaled engine controller and engine models, the static engine model constructor 215 may store, e.g., log, engine output data, as indicated at step 1610. The static engine model constructor 215 may create a set of lookup tables based on the engine output data obtained during testing of the rescaled engine controller and engine models, as indicated at step 1612. The set of lookup tables, which may contain sufficient data to model the performance behavior of the rescaled engine model, also may be associated with a static engine equivalent model element, as indicated at step 1614.

In some embodiments, a static engine equivalent model element may be parameterized directly using data obtained during testing of a sophisticated engine model, such as a GTSUITE engine model, a WAVE or WAVE RT model, or an AVL Boost model, in a simulation environment.

As described, the original engine model and the rescaled engine model may be dynamic models that perform operations or functions during execution to compute engine output data. During simulation of a dynamic model, differential equations may be generated and solved. In contrast, the static engine equivalent model element may not be a dynamic model. Instead, the static engine equivalent model element may determine engine output data based entirely on the information included in its set of lookup tables. The modeling environment 200 may substitute the static engine equivalent model element for the rescaled engine model, as indicated at step 1616. For example, the modeling environment 200 may delete the rescaled engine model from the system model, and connect the rescaled engine controller model to the static engine equivalent model element. The modeling environment 200 may run the system model that includes the static engine equivalent model element, as indicated at step 1618.

Because it consists principally of lookup tables, the static engine equivalent model element may execute faster than the rescaled engine model and may require less memory space than the rescaled engine model.

Exemplary Data Processing Device

Figure 18:
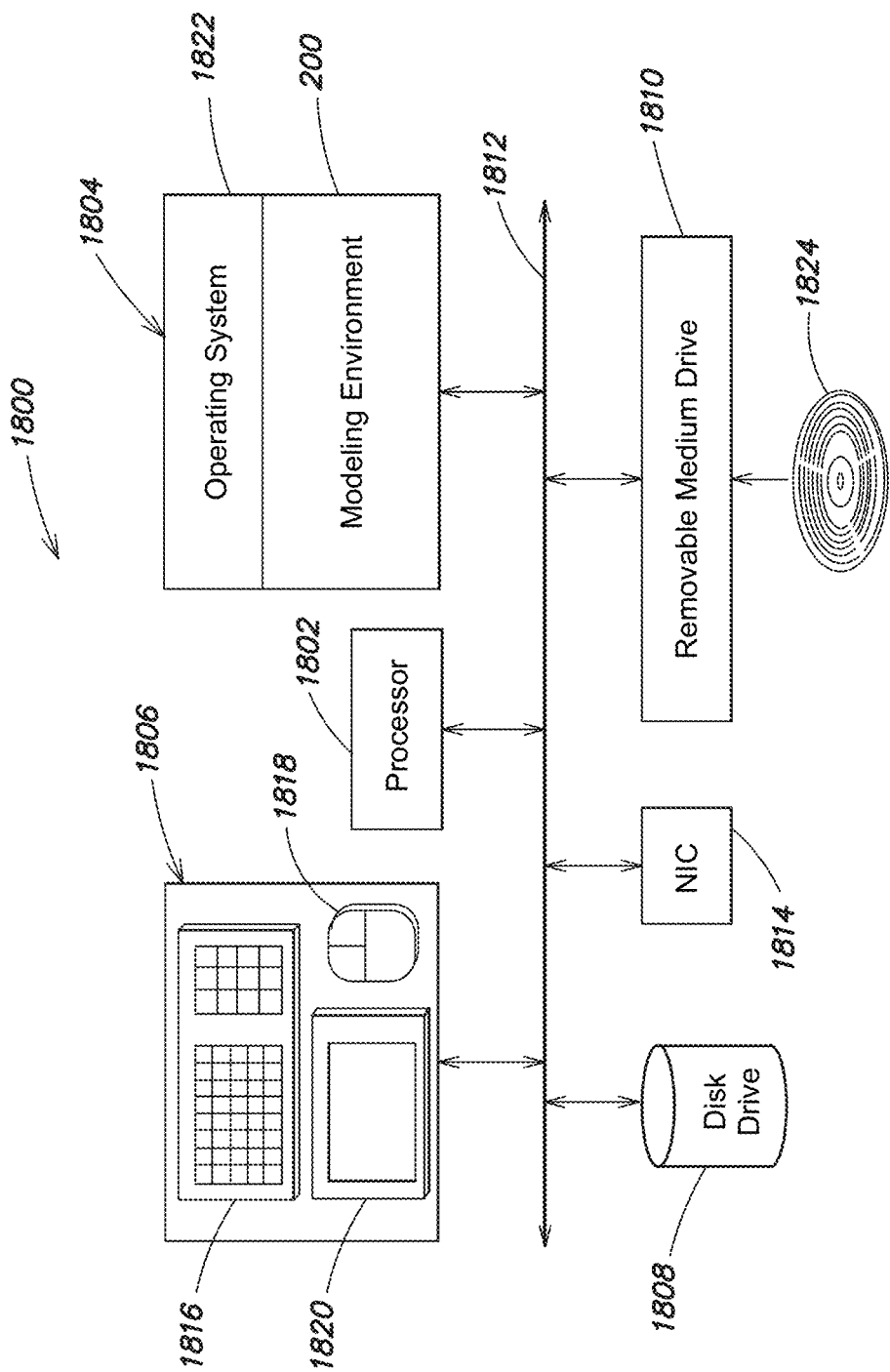
FIG. 18 is a schematic illustration of an example of a data processing system in accordance with an embodiment.

FIG. 18 is a schematic illustration of a computer or data processing system 1800 for implementing an embodiment of the invention. The computer system 1800 may include one or more processing elements, such as a processor 1802, a main memory 1804, user input/output (I/O) 1806, a persistent data storage unit, such as a disk drive 1808, and a removable medium drive 1810 that are interconnected by a system bus 1812. The computer system 1800 may also include a communication unit, such as a network interface card (NIC) 1814. The user I/O 1806 may include a keyboard 1816, a pointing device, such as a mouse 1818, and a display 1820. Other user I/O 1806 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1804, which may be a Random Access Memory (RAM), may store a plurality of program libraries or modules, such as an operating system 1822, and one or more application programs that interface to the operating system 1822, such as the modeling environment 200.

The removable medium drive 1810 may accept and read a computer readable medium 1824, such as a CD, DVD, floppy disk, solid state drive, tape, flash memory or other non-transitory medium. The removable medium drive 1810 may also write to the computer readable medium 1824.

Suitable computer systems include personal computers (PCs), workstations, servers, laptops, tablets, palm computers, smart phones, electronic readers, and other portable computing devices, etc. Nonetheless, those skilled in the art will understand that the computer system 1800 of FIG. 18 is intended for illustrative purposes only, and that the present invention may be used with other computer, data processing, or computational systems or devices. The present invention may also be used in a computer network, e.g., client-server, architecture, or a public and/or private cloud computing arrangement. For example, the modeling environment 1800 may be hosted on one or more cloud servers or devices, and accessed by remote clients through a web portal or an application hosting system, such as the Remote Desktop Connection tool from Microsoft Corp.

Suitable operating systems 1822 include the Windows series of operating systems from Microsoft Corp. of Redmond, WA, the Android and Chrome OS operating systems from Google Inc. of Mountain View, California, the Linux operating system, the MAC OS® series of operating systems from Apple Inc. of Cupertino, California, and the UNIX® series of operating systems, among others. The operating system 1822 may provide services or functions for applications or modules, such as allocating memory, organizing data objects or files according to a file system, prioritizing requests, managing I/O, etc. The operating system 1822 may run on a virtual machine, which may be provided by the data processing system 1800.

As indicated above, a user, such as an engineer, scientist, programmer, developer, etc., may utilize one or more input devices, such as the keyboard 1816, the mouse 1818, and the display 1820 to operate the modeling environment 200, including the model rescaling tool 214.

Figure 19:
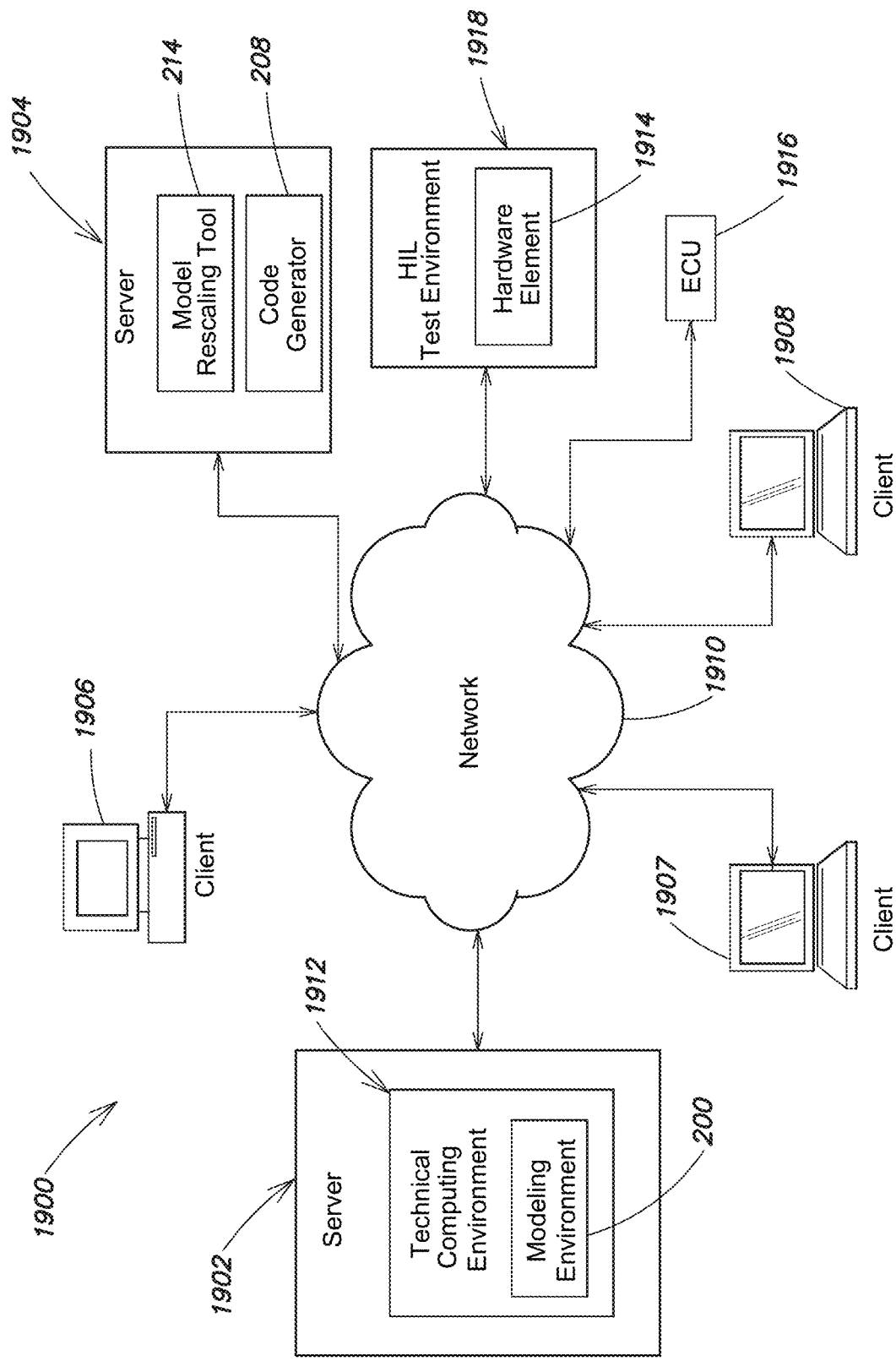
FIG. 19 is a schematic diagram of an example of a distributed computing environment in accordance with an embodiment.

FIG. 19 is a schematic diagram of a distributed computing environment 1900 in which systems and/or methods described herein may be implemented. The environment 1900 may include client and server devices, such as two servers 1902 and 1904, and three clients 1906-1908, interconnected by one or more networks, such as network 1910. The servers 1902 and 1904 may include applications or processes accessible by the clients 1906-1908. For example, the server 1902 may run a technical computing environment 1912 that may run the modeling environment 200. The server 1904 may run the model rescaling tool 214, the code generator 208, and/or some other application. The devices of the environment 1900 may interconnect via wired connections, wireless connections, or a combination of wired and wireless connections.

In some embodiments, the distributed environment 1900 may include a Hardware-in-the-Loop (HIL) test environment 1918, which may include one or more hardware elements indicated at 1914. The distributed environment 1900 also may include an electronic control unit (ECU) 1916.

The servers 1902 and 1904 may include one or more devices capable of receiving, generating, storing, processing, executing, and/or providing information. For example, the servers 1902 and 1904 may include a computing device, such as a server, a desktop computer, a laptop computer, a tablet computer, a handheld computer, or a similar device.

The clients 1906-1908 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1906-1908 may download data and/or code from the servers 1902 and 1904 via the network 1910. In some implementations, the clients 1906-1908 may be desktop computers, workstations, laptop computers, tablet computers, handheld computers, mobile phones (e.g., smart phones, radiotelephones, etc.), electronic readers, or similar devices. In some implementations, the clients 1906-1908 may receive information from and/or transmit information to the servers 1902 and 1904.

The network 1910 may include one or more wired and/or wireless networks. For example, the network 1910 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 19 is provided as an example. In practice, there may be additional devices and/or networks, fewer devices and/or networks, different devices and/or networks, or differently arranged devices and/or networks than those shown in FIG. 19. Furthermore, two or more devices shown in FIG. 19 may be implemented within a single device, or a single device shown in FIG. 19 may be implemented as multiple, distributed devices. Additionally, one or more of the devices of the distributed computing environment 1900 may perform one or more functions described as being performed by another one or more devices of the environment 1900.

Rescaling Electric Motor Example

Systems and methods of the present disclosure may rescale an electric motor model and a matching controller model for the electric motor model. A common type of electric motor is a permanent magnet motor. A permanent magnet motor is an alternating current (AC) motor having a rotor mounted on a shaft for rotation inside of a stator, which is stationary relative to the rotor. The stator has windings and the rotor carries permanent magnets around inside the stator's windings. The permanent magnets can be mounted on the exterior surface of the rotor, known as a surface permanent magnet motor (SPM). Alternatively, the permanent magnets may be embedded in the rotor itself, known as an interior permanent magnet motor (IPM). The stator windings may be energized by a 3-phase AC electric supply creating a rotating magnetic field in the gaps between the stator and the rotor. The rotating magnetic field induced in the stator's windings drives the rotor, producing torque on the shaft when a load is applied. The axis by which the stator's windings produce flux in the rotor's permanent magnets is known as the motor's direct axis or d-axis. The axis on which torque is produced by the motor is known as the quadrature axis or q-axis. The q-axis leads the d-axis by 90°. For a synchronous permanent magnet motor also known as a Permanent Magnet Synchronous Machine (PMSM), the rotor rotates synchronously with the rotating magnetic field.

To control a permanent magnet motor, a controller controls the 3-phase electric power being supplied to the stator's windings. One type of controller is a Field Oriented Control (FOC) controller. With an FOC controller, stator current quantities (phase currents) are transformed from a stationary reference frame to a torque producing current component and a flux producing current component in a rotating reference frame of the motor. The FOC controller controls the motor's torque indirectly by controlling the d-axis and q-axis components of the stator current in the rotating reference frame. When the motor is used to power a vehicle, such as a car, a truck, a motorcycle, a vessel, an aircraft, etc., the accelerator pedal or throttle can provide a reference signal for the desired torque to be provided by the motor. Inside the FOC controller, two Proportional Integral (PI) control loops may determine a control signal based on the difference, e.g., the error, between the d-axis and q-axis stator current components for achieving the desired torque, e.g., based on the accelerator or throttle reference signals, and the present values of the motor's d-axis and q-axis stator currents.

Figure 20:
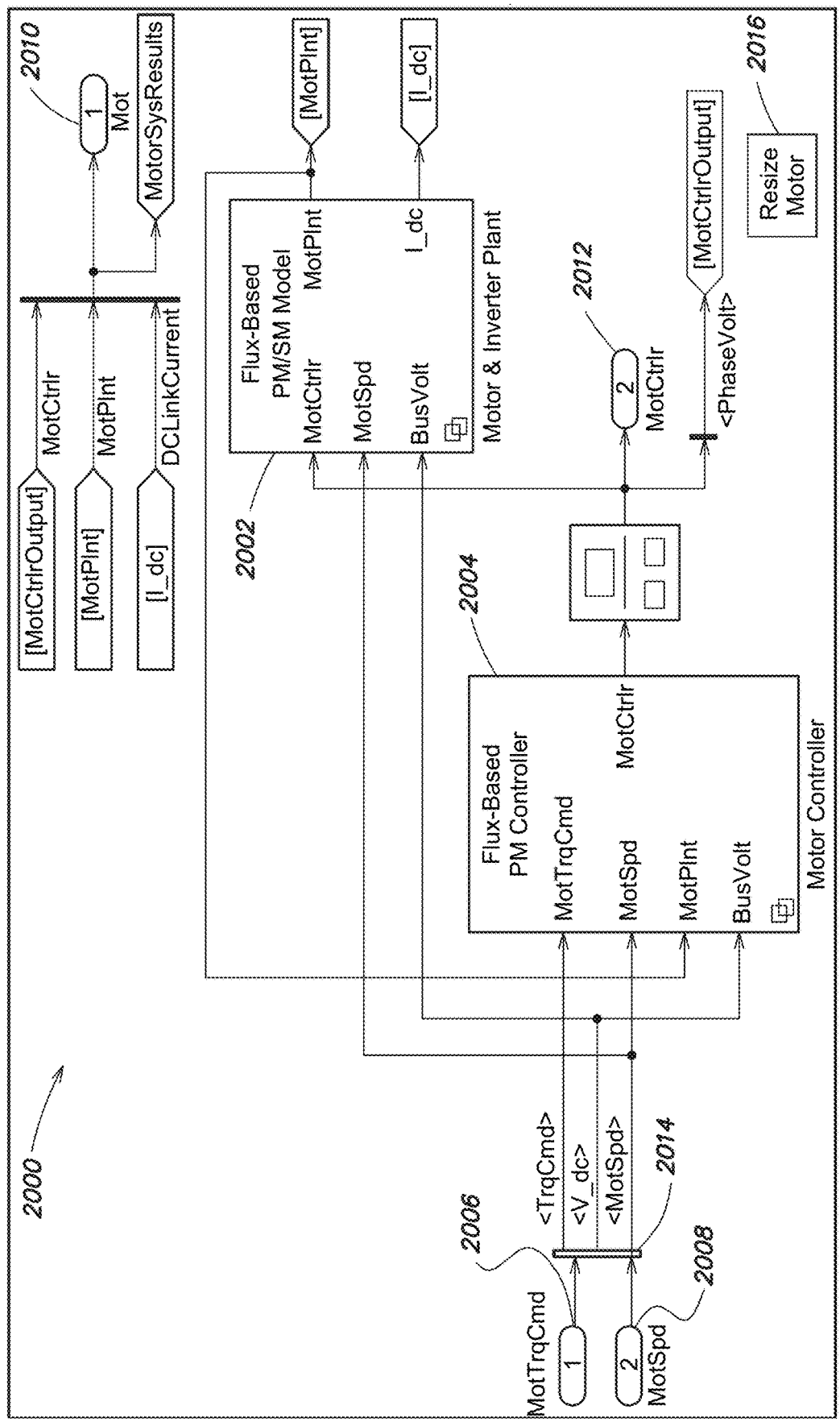
FIG. 20 is a schematic illustration of an example electric motor drive system model in accordance with one or more embodiments.

FIG. 20 is a schematic illustration of an example of an electric motor drive system model 2000 that models a motor, an inverter, and a motor controller, in accordance with one or more embodiments. The electric motor drive system model 2000 may include a motor model 2002 and a motor controller model 2004. The motor model 2002 may model the operation of an electric motor, and the motor controller model 2004 may model the operation of a controller for controlling the electric motor modeled by the motor model 2002.

The motor model 2002 may model a nonlinear three-phase, interior Permanent Magnet Synchronous Machine (PMSM) motor and the controller model 2004 may model a flux-based Field Oriented Control (FOC) controller for controlling the three-phase, interior PMSM motor. The motor model 2002 may be configured to receive one or more inputs and provide one or more outputs. For example, the motor model 2002 may receive a PhaseVolt command signal in volts, a Motor Speed (MotSpd) signal in radians per second and a direct current (DC) Bus Voltage (BusVolt) signal in volts, as inputs. The motor model 2002 may produce a Motor Plant (MotPlnt) signal and a DC Current (I_dc) signal, as outputs. The motor controller model 2004 also may receive one or more inputs and may compute one or more outputs. For example, the motor controller model 2004 may be configured to receive a motor torque command (TrqCmd) signal in Newton-meters (N-m), the motor speed (MotSpd) signal, and the DC bus voltage (Bus Voltage) signal, as inputs. The controller model 2004 may also receive information from the motor model (MotPlnt) on the operation of the motor, e.g., as feedback, such as the d-axis and the q-axis stator currents, among other information. As outputs, the controller model 2004 may compute a command signal having three stator terminal phased voltages (PhaseVolt).

The motor model 2000 may include two input elements 2006 and 2008, such as Inport blocks, named Motor Torque Command (MotTrqCmd) and Motor Speed (MotSpd) that receive or access input signals. The model 2000 also may include two output elements 2010 and 2012, such as Outport blocks, named Motor (Mot) and Motor Controller (MotCtrlr) that provide output signals computed by the motor model 2000. The input elements 2006 and 2008 represent data, such as signals, received by the model 2000, while the output elements 2010 and 2012 represent data, such as signals, produced, e.g., computed, by the model 2000 during execution. The signal received by the motor model 2000 at the MotTrqCmd input port 2006 may be a bus signal. A bus signal may be a signal composed of multiple signals and may also be referred to as a composite signal. A modeling environment may provide one or more bus elements for combining signals into a composite signal and/or for extracting individual signals from a composite signal. The motor model 2000 may include a bus selector element 2014 that receives the bus signal from the MotTrqCmd input port 2006 and the signal from the MotSpd input port 2008 and outputs one or more selected signals, such as a Torque Command (TrqCmd) signal, a DC Bus Voltage (V_dc) signal and the MotSpd signal.

The motor controller model 2004 may be configured to operate on one or more inputs and to compute one or more outputs. For example, the motor controller model 2004 may operate on the Torque Command (TrqCmd), the Motor Speed (MotSpd), and the V_dc, here identified as Bus Voltage (BusVolt), signals as input to the motor model 2000. The motor controller model 2004 may also operate on a Motor Plant (MotPlnt) signal, which may be computed by the motor model 2002. The motor controller model 2004 may compute a Motor Controller (MotCtlr) command signal.

The motor model 2002 may be configured to operate on one or more inputs and provide one or more outputs. For example, the motor model 2002 may operate on the Motor Speed (MotSpd) and Bus Voltage (BusVolt) signals as input to the motor model 2000. The motor model 2002 also may operate on the Motor Controller (MotCtlr) command signal computed by the motor controller model 2004. The motor model 2002 may compute the Motor Plant (MotPlnt) signal and a DC Current (I_dc) signal.

In some embodiments, the electric motor drive system model 2000 may also include a model element 2016 named 'Resize Motor'. As described herein, the Resize Motor element 2016 may direct the model rescaling tool 214 to create a rescaled motor model and a rescaled controller model based on the motor model 2002 and the motor controller model 2004, which may be referred to as the baseline motor model and the baseline motor controller model.

The electric motor drive system model 2000 may be constructed on a model canvas of a model editor, which may be in the form of a desktop environment presented on a display of a data processing device, such as a workstation, laptop, tablet, etc. For example, the UI engine 202 and the model editor 204 may provide or support a desktop including a model canvas on which the drive system model 2000 is presented. In addition to a model canvas, the model editor may include command buttons for performing desired actions organized in tabs of a toolstrip. For example, a Simulation tab may include a Run button. In response to a user selecting the Run button, the simulation engine 212 may execute the drive system model 2000.

Figure 21:
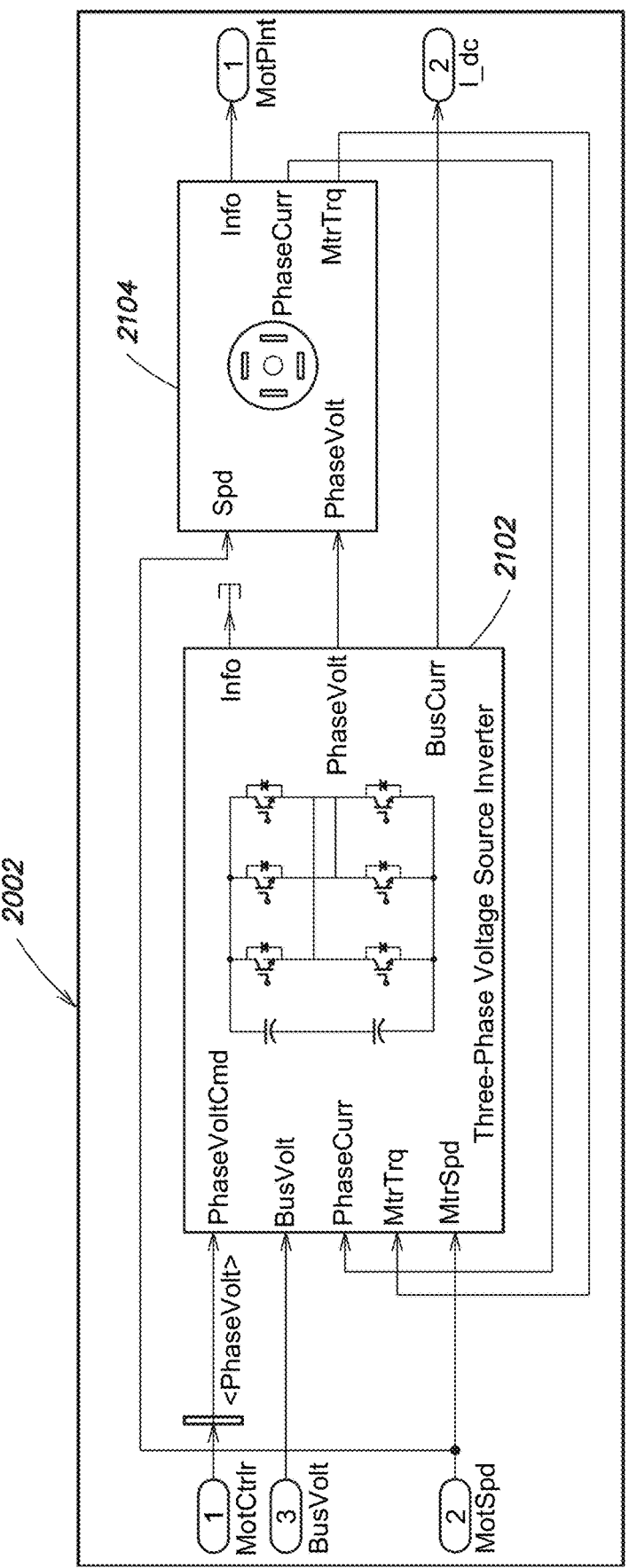
FIG. 21 is a schematic illustration of an example of motor and inverter plant model in accordance with one or more embodiments.

FIG. 21 is a schematic illustration of an example of the motor model 2002, which is opened to view its elements, in accordance with one or more embodiments. The motor model 2002 may include an inverter element 2102 and a motor element 2104. In some embodiments, the motor element 2104 may model a three-phase, interior permanent magnet synchronous motor (PMSM) motor.

Figure 22:
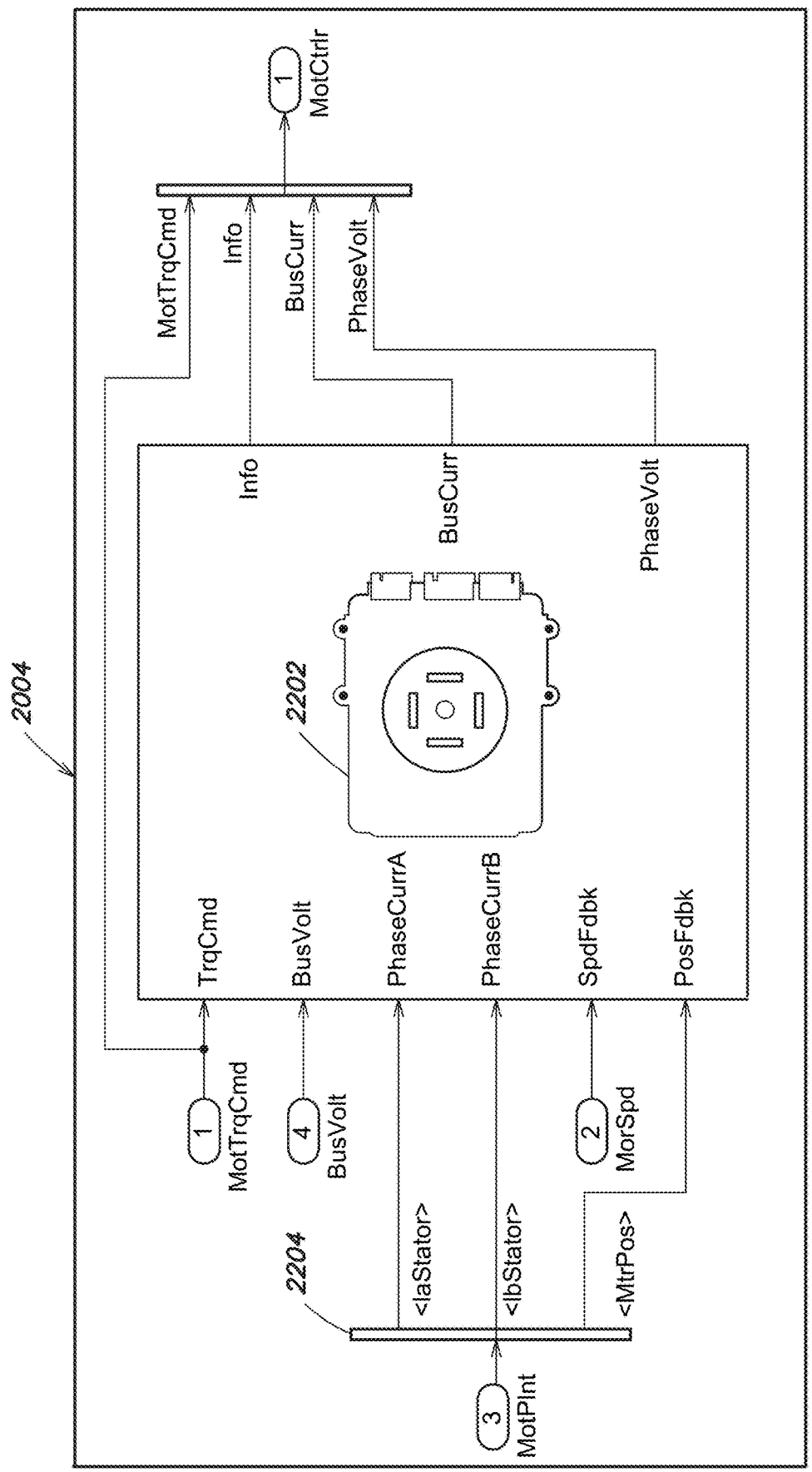
FIG. 22 is a schematic illustration of an example motor controller model in accordance with one or more embodiments.

FIG. 22 is a schematic illustration of an example of the motor controller model 2004, which is opened to view its elements, in accordance with one or more embodiments. The motor controller model 2004 may include a flux-based permanent magnet (PM) motor controller element 2202. The motor controller model 2004 also may include a bus selector element 2204 that selects particular signals from the MotPlnt bus signal as inputs to the flux-based PM motor controller element 2202. For example, the bus selector element 2204 may select an IaStator signal, an IbStator signal and a Motor Position (MtrPos) signal from the MotPlnt bus signal as inputs to the flux-based PM motor controller element 2202.

The elements of a simulation model, such as the electric motor drive system model 2000, may be linked together by connections to exchange information, such as data, control, signals, state transitions, events, messages, and/or physical relationships, such as mechanical, electrical, thermal, etc., among the elements. The connections may establish information paths through the model, which may extend from the model's top-level inputs to its top-level outputs. Connections may have a graphical representation, such as lines, wires, arrows, etc., that indicates the type of connection. For example, in a time-based simulation environment, a connection appearing as a single line arrow may represent a mathematical relationship, such as a signal, between two connected blocks where a first, e.g., source, block updates the signal, and a second, e.g., sink, block reads the signal. A signal may refer to a time varying quantity having one or more values for example at all points in time during model execution. For example, a signal may have a value at each time step during execution of a model.

The arrangement of model elements and connections within a model may specify a physical system, procedure, algorithm, and/or behavior, and the model may be executed, e.g., simulated, by the modeling environment to model system behavior or perform the procedure, algorithm, and/or behavior. During execution, a model may process input values, and may generate output values. A user may direct the modeling environment to execute, e.g., run, a model using sample input data, and may evaluate whether the model, when executed, generates expected output values. If it does not, the user may revise the model.

In some embodiments, the connections may represent one or more actual physical connections. Specifically, the model elements may include connection ports configured to mimic actual physical connection points between physical components represented by the model elements. The number of connection ports included at a given model element may be determined by the number of energy flows that the model element exchanges with other model elements, and may also depend on the model element's level of idealization of the actual physical component that it represents. An energy flow may be characterized by one or more variables. For example, an energy flow may be characterized by a through variable and an across variable whose product may specify energy flow in watts. A through variable represents a value that may be measured in series to the component, while an across variable represents a value that may be measured in parallel to the component. In the rotational mechanical domain, the through variable may be force and the across variable may be angular velocity. In the electrical domain, the through variable may be current and the across variable may be voltage. The user may employ a graphical connection tool, such as a wiring tool, to establish physical connection lines among the blocks. The connections among graphical objects representing actual physical elements may define a physical topology of the system being modeled.

In other embodiments, the connections may be signals of a dynamic or time-based model that describes a dynamic system of equations that defines time-based relationships between signals and state variables. Signals may represent quantities that change over time, and may have values at all points in time. The relationships between signals and state variables may be defined by the set of equations represented by model elements included in the model. Time-based model elements may include signal ports that may be graphically interconnected with signal-based connections, such as arrows, wires, etc. The source of a signal corresponds to the model element that writes to the signal during the evaluation of the model element's equations, and the destination of the signal is the model element(s) that reads the signal during the evaluation of the destination model element's equations.

A model element included in a model, such as the motor element 2104 and the motor controller element 2202 of the electric motor drive system model 2000, may have numeric parameters that determine how the model element calculates output values during execution of the model. To control the calculations that the model element performs, a user can enter values for the model element's parameters. Values may be entered directly or by a symbol that references a numeric value, such as a symbol defined in a workspace for the model. In addition, values for the model element's parameters can be set graphically, e.g., through a user interface for the model element, or textually, e.g., by using get and set commands that may be entered at the command line of a command line interface, for example. A model element's parameters may have various data types, such as scalar, vector, array, matrix, table, etc.

The motor element 2104 and the motor controller element 2202 may both include or have access to one or more parameters in the form of lookup tables (LUTs), which may be used by the motor element 2104 and the motor controller element 2202 in the determination of their outputs. As described earlier, a LUT may include one or more input breakpoint data sets and output table data. Each input breakpoint data set may be an index of input values, e.g., in the form of a vector, for a particular dimension of the lookup table. The input breakpoint data sets relate a lookup table's input values to the output values that the table returns. The individual input values included in an input breakpoint data set may be referred to as breakpoints.

For example, the motor element 2104 may include non-linear motor flux linkage data, which may be obtained from dynamometer testing of a physical motor being modeled by the motor element 2104 or from finite element analysis (FEA) of a design of the motor being modeled by the motor element 2104. In some embodiments, this data may be stored in the motor element 2104 in one or more LUTs, such as a d-axis current LUT and a q-axis current LUT. During execution of the electric motor drive system model 2000, the d-axis current LUT may provide a d-axis current value $(i_d)$ as a function of a q-axis flux linkage $(\lambda_q)$ value and a d-axis flux linkage $(\lambda_d)$ value. The q-axis current LUT may provide a q-axis current $(i_q)$ value as a function of a q-axis flux linkage $(\lambda_q)$ value and a d-axis flux linkage $(\lambda_d)$ value. The motor element 2104 may utilize the data in the one or more LUTs to compute the outputs of the motor element 2104 during execution of the electric motor drive system model 2000.

The motor controller element 2202 may include non-linear d-axis and q-axis reference current data as a function of motor torque, motor speed, and DC link voltage (BusVolt in FIG. 22). This data may be derived from dynamometer testing of a physical motor or from finite element analysis (FEA) of a design of a motor. This data may be stored in the motor controller element 2202 in one or more LUTs, such as a d-axis reference current LUT and a q-axis reference current LUT. The motor controller element 2202 may utilize the data in the one or more LUTs to compute the outputs of the motor controller element 2202 during execution of the drive system model 2000. In some embodiments, the motor controller element 2202 may optionally include speed controller functionality that computes a torque command as a function of a rotor speed command and a rotor speed. The motor controller element 2202 may utilize the d-axis and q-axis reference current LUTs to compute d-axis and q-axis current commands as a function of the motor speed and the torque command, which is either determined by the optional speed controller or input directly to the motor controller element 2202. Two Proportional Integral (PI) control loops may receive the computed d-axis and q-axis current commands as well as d-axis and q-axis current values of the motor, e.g., output by the motor element 2104, and may compute d-axis and q-axis voltage commands.

The PI control loops may include nonlinear motor data in the form of d-axis and q-axis flux linkage LUTs, which may be used to determine d-axis and q-axis cross-coupling terms. These two cross-coupling terms may be added into the d-axis and q-axis voltage commands as part of a 'cross-decoupling control'. The d-axis and q-axis voltage commands determined by the PI control loops may be transformed into stator phase voltages for controlling the motor for achieving the desired torque. The determined stator phase voltage commands may be provided to the motor model 2002.

As described, in some embodiments, the motor element 2104 and the motor controller element 2202 may include and/or access six LUTs. For example, the motor element 2104 may include and/or access two LUTs that output d-axis and q-axis currents of the motor being modeled as a function of d-axis flux and q-axis flux of the motor. The motor controller element 2202 may include and/or access four LUTs. Two LUTs may output d-axis and q-axis control reference currents as a function of motor speed and desired torque. Two other LUTs may output d-axis and q-axis flux linkage as a function of d-axis and q-axis current of the motor. Current indices can be considered as "states", meaning that, at this particular instantaneous moment, the motor's current value is this id value and this iq value, and the LUT provides corresponding flux linkage values for the d-axis and q-axis. For the motor controller element 2202, the d-axis and q-axis current values may be "control references" that the control element 2202 is striving to achieve. The d-axis and q-axis current values of the LUTs included in the motor element 2104 also may be considered as "states" that, in this case, are inversely mapped from the flux linkage LUTs.

The d-axis and q-axis reference current data (id/iq) may be derived through a rule-based optimization routine that utilizes characterization data from the dynamometer testing or the FEA. An exemplary tool for deriving id/iq control reference data is the Model-Based Calibration (MBC) Toolbox from The MathWorks, Inc. Flux linkage and torque data as well as the motor's current, voltage, speed constraints information may be input into the MBC Toolbox, and the Toolbox can generate the id/iq current control reference LUTs.

Because the motor controller element 2202 includes data, such as the flux linkage data for the motor modeled by the motor element 2104 and the corresponding id/iq current reference data, the motor controller element 2202 (and thus the motor controller model 2004) is matched to the motor element 2104 (and thus to the motor model 2002).

In some embodiments, the motor element 2104 may be implemented as a masked element. A masked element may utilize a mask to hide the contents of the masked element, e.g., the model elements contained in the masked element. A user of a masked element thus cannot edit the masked element. An example of a masked element is the masked subsystem from the Simulink modeling environment. A masked element may appear in a model as an atomic element with its own parameter dialog box. By entering desired values in the dialog box, a user may parametrize the masked element.

Figure 23:
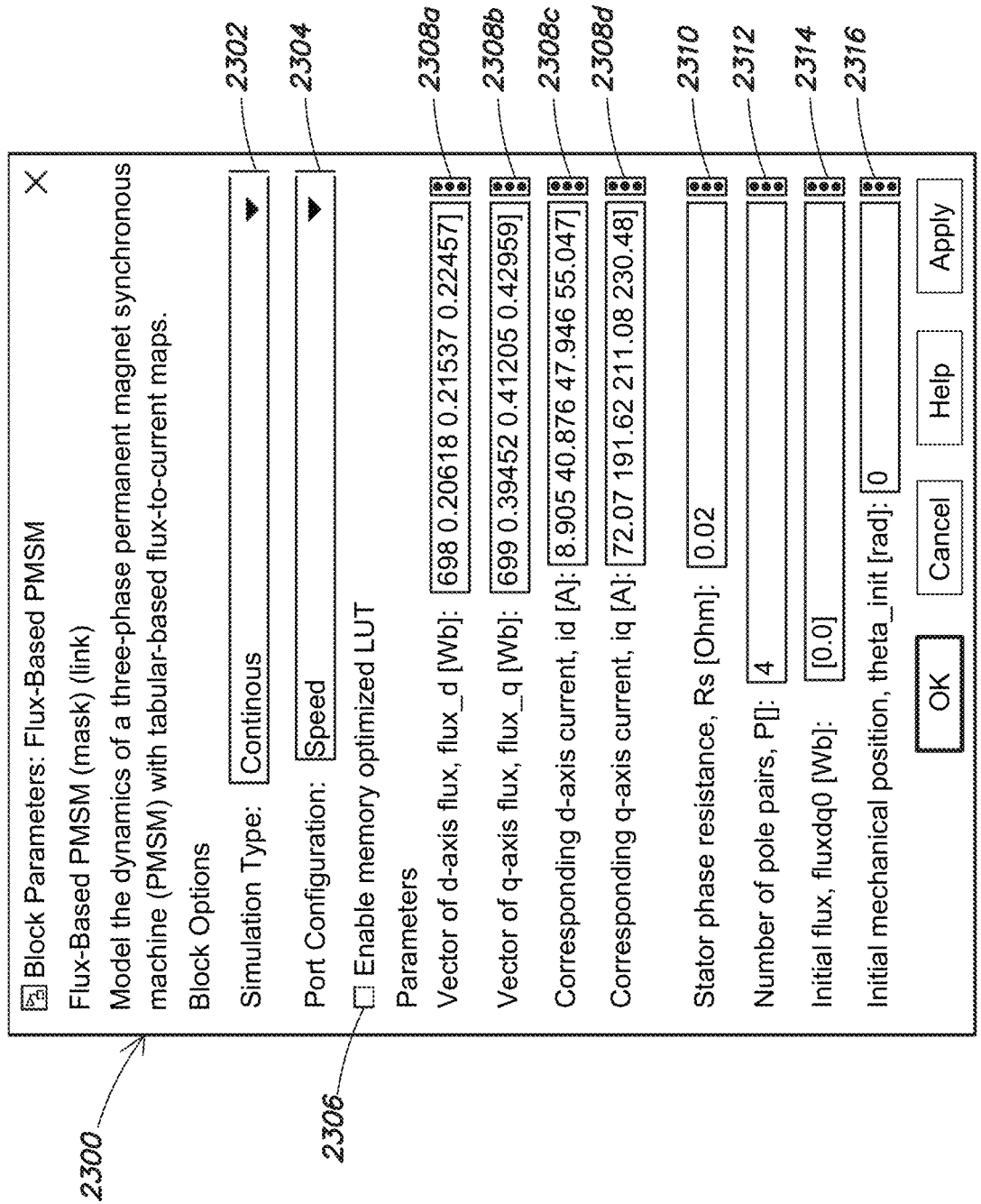
FIG. 23 is a schematic illustration of an example user interface for a motor element in accordance with one or more embodiments.

FIG. 23 is a schematic illustration of an example User Interface (UI) 2300 for the three-phase PM motor element 2104, in accordance with one or more embodiments. The UI 2300, which may be in the form of a dialog window, may include a plurality of user interface elements for receiving and/or displaying information or data. The dialog 2300 may include one or more user interface elements for setting values for parameters of the motor element 2104. For example, the dialog 2300 may include a dropdown menu 2302 for selecting a simulation type and a dropdown menu 2304 for selecting a port configuration. Available simulation types may include Continuous (selected) and Discrete. Available port configurations may include Speed (selected) and Torque. The dialog 2300 may include a checkbox 2306 for enabling or disabling memory optimized Lookup Tables (LUT). The dialog 2300 may include data entry fields 2308a-d for entering data used in one or more Lookup Tables (LUTs). The data, which may be entered as vectors, may represent d-axis flux, q-axis flux, d-axis current, and q-axis current. The dialog 2300 may include a data entry field 2310 for receiving a stator phase resistance. The dialog 2300 may include a data entry field 2312 for receiving a number of pole pairs for the motor, a data entry field 2314 for receiving an initial flux, and a data entry field 2316 for receiving an initial mechanical position of the rotor.

In some embodiments, the flux-based PM motor controller element 2202 may be implemented as a masked element, such as a masked subsystem or a masked model.

Figure 24:
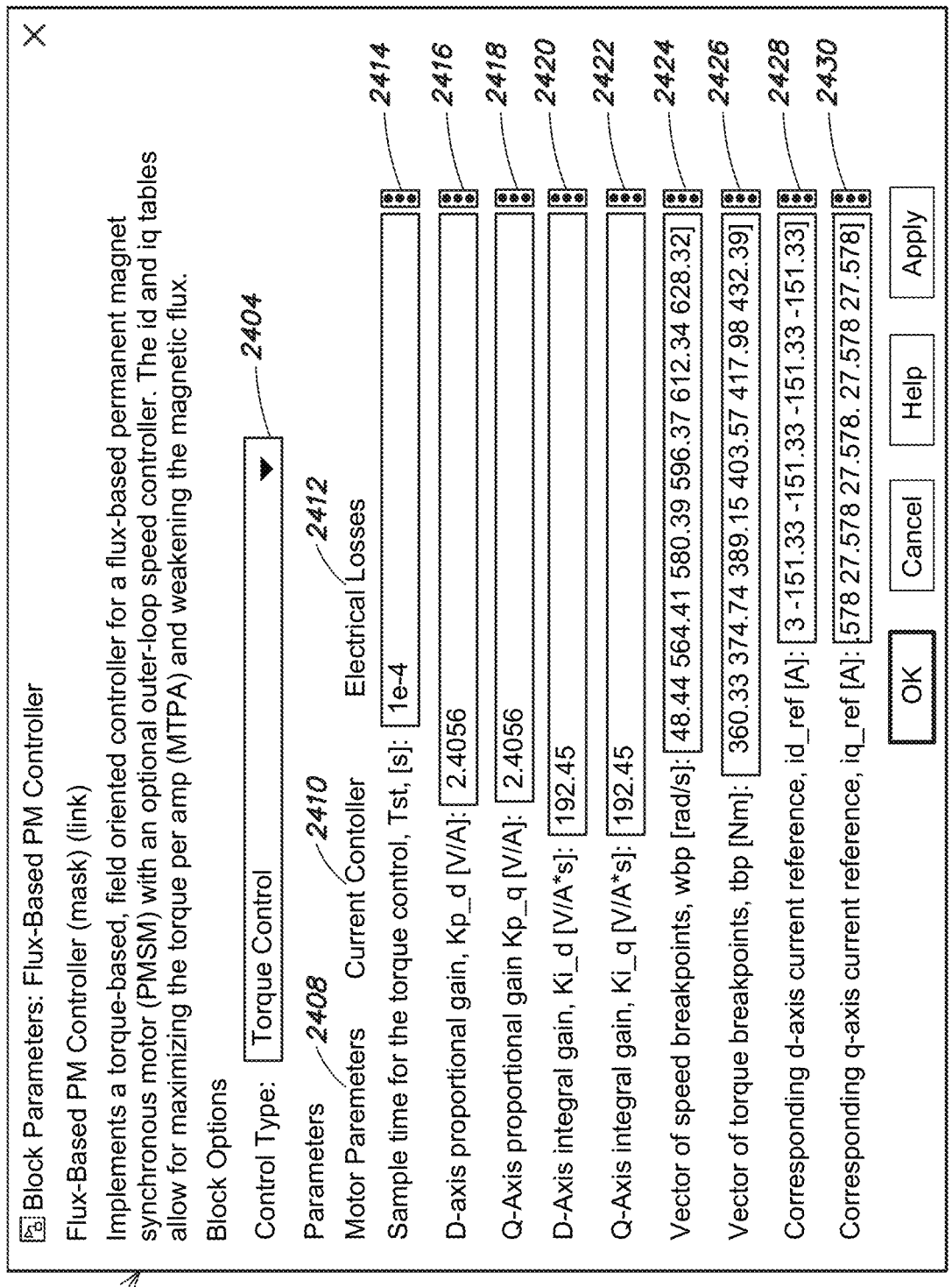
FIG. 24 is a schematic illustration of an example user interface for a controller element in accordance with one or more embodiments.

FIG. 24 is a schematic illustration of an example mask dialog 2400 for the flux-based PM motor controller element 2202, in accordance with one or more embodiments. The dialog 2400 may include a Block Options area 2402 with a drop-down menu 2404 for specifying a Control type. Available options may include Torque Control (selected) and Speed Control. The dialog 2400 may also include a Parameters area 2406 which may be organized into a Motor Parameters tab 2408, a Current Controller tab 2410 (selected) and an Electrical Losses tab 2412. The Current Controller tab 2410 may include a plurality of data entry fields for setting values for parameters of the controller element 2102. For example, the Current Controller tab 2410 may include a numeric entry box 2414 for setting a value for the 'Sample time for the torque control' parameter, a numeric entry box 2416 for setting the 'D-axis proportional gain' parameter, a numeric entry box 2418 for setting the 'Q-axis proportional gain' parameter, a numeric entry box 2420 for setting the 'D-axis integral gain' parameter, and a numeric entry box 2422 for setting the 'Q-axis integral gain' parameter. Values also may be specified by entering symbols in one or more of the numeric entry boxes, and associating numeric values with the entered symbols.

The Current Controller tab 2410 also may include data entry boxes for entering values for the LUTs utilized by the controller element 2102. For example, the Current Controller tab 2410 may include a data entry box 2424 for setting the 'vector of speed breakpoints', a data entry box 2426 for setting the 'vector of torque breakpoints', a data entry box 2428 for setting the 'Corresponding d-axis current reference', and a data entry box 2430 for setting the 'Corresponding q-axis current reference'.

For purposes of explanation, the illustrative embodiments are described as including particular, predefined blocks available in the Powertrain Blockset™ from The MathWorks, Inc. Nonetheless, it should be understood that the present disclosure may be used with other motor and/or controller models constructed using other blocks or model elements, including blocks or model elements from other modeling environments, such as the MapleSim physical modeling and simulation tool, the Simplorer simulation program from ANSYS, Inc. of Canonsburg, PA, the PLECS tools from Plexim GmbH of Zurich, Switzerland, the AVL BOOST modeling and simulation tool, the LabVIEW virtual instrument programming system and the NI MatrixX modeling environment, among others.

By way of example, the motor model 2002 may have been created by the user to model an 80 kilowatt (kW) PMSM electric motor. For example, the motor model 2002 may include data obtained for an 80 kW PMSM motor, e.g., either through dynamometer testing and/or FEA. Likewise, the controller model 2004 may have been created by the user to model a controller designed to control an 80 kW PMSM electric motor. The controller model 2004 also may include data, which again may have been obtained using dynamometer testing and/or FEA.

Suppose after creating the 80 kW motor and controller models, the user wishes to evaluate a flux-based PMSM motor model with similar nonlinear behavior but of a different size and a controller model matched to the differently sized motor model. For example, suppose the user wishes to evaluate a 200 kW flux-based PMSM motor model and matching controller model. Obtaining new data for a 200 kW motor, e.g., using FEA or dynamometer testing, can be time-consuming and expensive. For example, dynamometer testing involves manufacturing a physical motor and mounting it to a dynamometer system for testing. Manufacturing a motor and running it in a dynamometer system is time-consuming and expensive. FEA requires the creation of a detailed motor topology design, including a geometry of at least the stator and rotor, typically using one or more Computer Aided Engineering (CAE) tools, such tools can be expensive and requires significant training to use. Creating and validating such a design is also time-consuming.

The model rescaling tool 214, however, can automatically rescale the original 80 kW motor model 2002 and the controller model 2004, referred to as baseline models, to create a 200 kW motor model and a matching controller model, referred to as rescaled models. The rescaling process may not require the user to obtain any new data for the new size motor, e.g., the 200 kW motor, and its matching controller.

In some embodiments, a user may issue one or more commands to the model rescaling tool 214 to rescale the motor model 2002 and the controller model 2004 to models of the new size. The one or more commands may be entered textually or graphically, e.g., from within the desktop environment for the modeling environment 214. For example, the user may select the Resize Motor model element 2016, e.g., using a pointing device, such as a mouse. The Resize Motor model element 2016 may represent and/or implement a procedure performed by the model rescaling tool 214 for automatically rescaling a baseline motor model and a baseline controller to a resized motor model and a resized controller model.

FIGS. 25A-D are partial views of a flow diagram of an example method of rescaling an electric motor model and a matching controller model, such as the motor model 2002 and the controller model 2004, in accordance with one or more embodiments. The flow diagram of FIGS. 25A-D is intended for illustrative purposes only. In some embodiments, one or more steps may be omitted, additional steps may be added, the order of steps may be changed, and/or one or more sequences as indicated by the arrows of FIGS. 25A-D may be omitted.

The model rescaling tool 214 may receive one or more rescaling factors, as indicated at step 2502. As described herein, the one or more rescaling factors may be non-dimensional ratios between the size of the resized motor and the size of the original motor. The model rescaling tool 214 also may receive one or more attributes or characteristics of the resized motor, as indicated at step 2504. The model rescaling tool 214 also may derive one or more rescaling factors, as indicated at step 2506. The rescaling factors and the attributes/characteristics may indicate the new size of the motor and the matching controller to be modeled. In some embodiments, the attributes/characteristics that are received may include the power and the inverter side direct current (DC) link voltage for the resized motor, and the one or more rescaling factors that are received or derived may include one or more of an axial rescaling factor ($K_A$), a radial rescaling factor ($K_R$) and a rewinding factor ($K_W$). Electric motors are often cylindrically shaped with an axial length and a diameter. The axial rescaling factor ($K_A$) may represent the ratio of the axial length of the rescaled motor relative to the axial length of the baseline motor. For example, for a baseline motor of length L, the length of the rescaled motor may be $K_A \times L$. The axial rescaling factor may represent the change in axial length of the motor's core along the motor shaft. In some embodiments, the axial lengths of the stator stack, the rotor stack and the magnets may all be changed in the same ratio. The radial rescaling factor ($K_R$) may represent the ratio of the cross-section of the rescaled motor relative to the cross-section of the baseline motor. The cross-section may be represented by the outer diameter of the stator of the rescaled motor relative to the outer diameter of the stator of the baseline motor. For example, for a baseline motor of diameter D, the diameter of the rescaled motor may be $K_R \times D$. The rewinding factor ($K_W$) may represent the ratio of the number of turns of windings per coil ($N_c$) of the stator of the rescaled motor divided by number of parallel paths of windings ($a_p$), e.g., $N_c/a_p$, of the stator of the rescaled motor relative to the $N_c$ divided by $a_p$ of the stator of the baseline motor. The rewinding factor may not be a direct rescaling of the baseline motor. Instead, rewinding may adjust the winding numbers and paths to make sure that the final power and terminal voltage of the resized motor will meet the design requirement. The derivation of the above rescaling factors is based on the requirement that the cross-section geometry and the slot current density are unchanged between the rescaled and baseline motors. This ensures that the magnetic fields in the rescaled motor are the exact images of the magnetic fields in the baseline motor. The one or more rescaling factors may be non-dimensional values.

It should be understood that other rescaling factors besides or in addition to axial, radial and rewinding may be received or derived. For example, another rescaling factor that may be used is Constant Power Speed Ratio (CPSR), which is the ratio of a motor's maximum speed at which the motor's power remains constant to the motor's full load base speed. A baseline motor may have a first CPSR value and a rescaled motor may have another CPSR value. CPSR can be used as a rescaling factor for lumped parameter models, which may also be referred to as dynamic motor model.

In addition, other attributes/characteristics besides or in addition to power and DC link voltage may be received. For example, other attributes/characteristics include a torque limit and a current limit, which may result from a thermal requirement of the electric motor.

In some embodiments, inputs for controlling the resizing procedure, such as the one or more rescaling factors and the one or more resize attributes/characteristics, among other information, may be entered through one or more user interfaces (UIs), such as a dialog. For example, in response to selection of the Resize Motor model element 2016, the UI engine 202 may present one or more interfaces, such as one or more dialogs or other user interfaces (UIs), through which a user may enter information for directing or controlling the process of rescaling the baseline motor model 2002 and the baseline controller model 2004.

Figure 26:
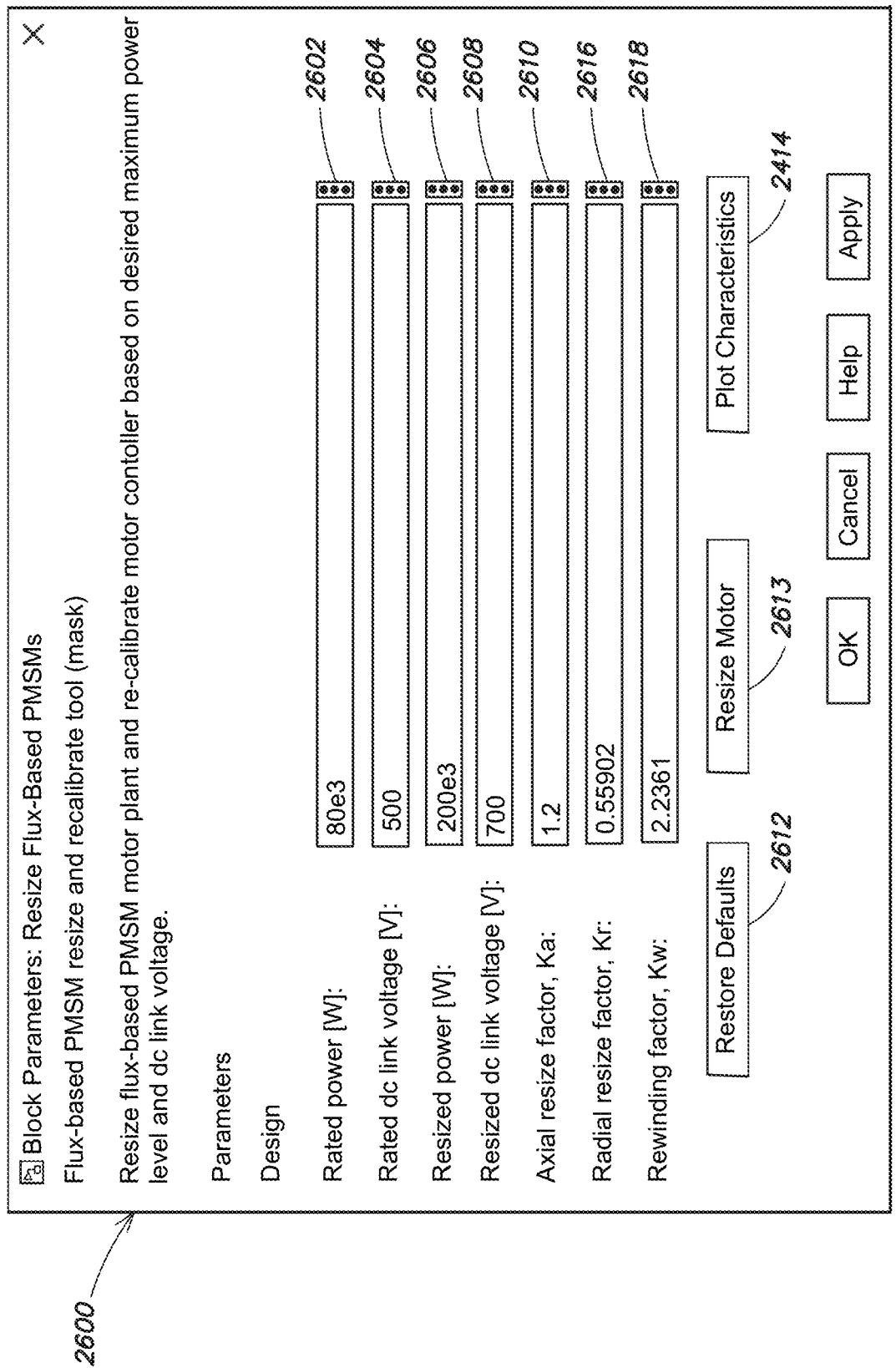
FIG. 26 is a schematic illustration of an example User Interface for rescaling a motor model and a controller model in accordance with one or more embodiments.

FIG. 26 is a schematic illustration of an example User Interface (UI) 2600 for receiving information for rescaling the baseline motor model 2002 and the baseline controller model 2004 in accordance with one or more embodiments. The UI 2600 may include elements configured to receive values for design parameters for a flux-based motor model.

For example, the UI 2600 may include a 'Rated Power [W]' data entry box 2602, a 'Rated dc link voltage [V]' data entry box 2604, a 'Resized power [W]' data entry box 2606, a 'Resized dc Link Voltage [V]' data entry box 2608, and an 'Axial Resize Factor (Ka)' data entry box 2610. The UI 2600 also may include three command buttons 2612-2614 named 'Restore Defaults', 'Resize Motor', and 'Plot Characteristics.' The UI 2600 may further include a 'Radial resize factor, Kr' data display field 2616 and a 'Rewinding factor, Kw' data display field 2618.

The user may enter the power of the baseline motor, e.g., 80e3 (80 kW), in the 'Rated power' data entry box 2606 and the dc line voltage of the base line motor, e.g., 500, in the 'Rated dc link voltage' data entry box 2604. The user may also enter a power for the resized motor, e.g., 200e3 Watts (200 kW), in the 'Resize Power' data entry box 2606. The user also may enter a value for the DC link voltage for the resized motor in the data entry box 2608. In some embodiments, the DC link voltage of the resized motor may be the same as the baseline motor. The user may enter a value, e.g., '1.2', for the axial resize factor in the 'Axial Resize Factor' data entry box 2610. In response to selection of the 'Resize Motor' command button 2613, the rescaling tool 214 may rescale the baseline models using the values entered in the UI 2600. In some embodiments, the number of pole pairs of the baseline motor model may not be changed in the rescaled motor model. Accordingly, in some embodiments, the UI 2600 may not include a data entry box for pole pairs.

Other UIs may be presented for receiving information for rescaling other types of motor models and controllers besides a flux-based PMSM motor.

It should also be understood that the UI 2600 of FIG. 26 is meant for illustrative purposes only and that the present disclosure may be used with other UIs. For example, in some embodiments, a UI may include a plurality of tabs, such as a 'Design Parameters' tab, a 'Parameters (Existing Motor)' tab, and a 'Parameters (Resized Motor)' tab, that organize the UI's interface elements. The Design Parameters tab may include a 'Level of fidelity' dropdown menu through which a user may select a resize method. Exemplary methods that may be available for selection include 'Flux-Based PMSM Model', 'Mapped Model,' and 'Dynamic Model'.

In some embodiments, the model rescaling tool 214 may use the power characteristics and the axial rescaling factor ($K_A$) to derive the radial rescaling factor ($K_R$). The model rescaling tool 214 may use the axial rescaling factor ($K_A$), the radial rescaling factor ($K_R$) and the DC link voltage characteristics to derive the rewinding factor ($K_W$). For example, the model rescaling tool 214 may derive the radial rescaling factor ($K_R$) as follows:

$$K_R = \sqrt{\frac{\frac{P_{rescaled}}{P_{baseline}}}{K_A}}$$

where, $P_{rescaled}$ is the power of the rescaled motor, e.g., 200 kW in the current example, $P_{baseline}$ the power of the baseline motor that is being rescaled, e.g., 80 kW, and $K_A$ is the axial rescaling factor.

The model rescaling tool 214 may derive the rewinding scaling factor ($K_W$) as follows:

$$K_W = \frac{\frac{V_{dc\,rescaled}}{V_{dc\,baseline}}}{K_R * K_A}$$

where, $V_{dc\ rescaled}$ is the DC link voltage of the rescaled motor, $V_{dc\ baseline}$ is the DC link voltage of the baseline motor, $K_R$ is the rewinding scaling factor, and $K_A$ is the axial scaling factor.

DC link voltage is the input to the inverter, which modulates the DC link voltage to produce an AC voltage. If the inverter is directly connected to a battery, then the battery's terminal voltage is the DC link voltage.

In some embodiments, the model rescaling tool 214 may apply one or more constraints on one or more of the values entered by the user for rescaling the baseline motor. For example, if the user is rescaling a baseline motor to a higher power motor, as in this example, then the model rescaling tool 214 may constrain the value for the axial rescaling factor ($K_A$) as entered by the user to be greater than one. For example, when rescaling a motor model to a higher power motor model, the model rescaling tool 214 may prevent a user from entering an axial rescaling factor ($K_A$) that is less than one. Additionally or alternatively, the model rescaling tool 214 may issue a warning message if the user enters or attempts to enter an axial rescaling factor ($K_A$) that is less than one. In addition, the model rescaling tool 214 may constrain or prevent a user from entering values for the power level and the axial rescaling factor ($K_A$) that result in the derived radial scaling factor ($K_R$) being less than one, when rescaling to a higher power motor. This constraint may be implemented because it would be counterintuitive and/or impractical to manufacture a new motor with a higher power relative to an original motor that nonetheless has a smaller radius than the original motor. The model rescaling tool 214 may additionally or alternatively issue a warning message to the user.

If a user is rescaling a baseline motor model to a rescaled motor model with less power than the baseline motor model, the model rescaling tool 214 may constrain or prevent a user from entering an axial rescaling factor that is greater than one. The motor rescaling tool 214 also may constrain or prevent the entry of values for power level and axial scaling factor ($K_A$) that result in the derived radial scaling factor ($K_R$) being greater than one. In this case, it would be counterintuitive and/or impractical to manufacture a new motor with a lower power relative to an original motor that nonetheless has a larger radius than the original motor. The model rescaling tool 214 may additionally or alternatively issue a warning message to the user.

In some embodiments, the model rescaling tool 214 may constrain the number of pole pairs for the rescaled motor model to be the same as the baseline motor model. The resized motor may have the same cross-sectional geometry as the baseline motor. Cross-sectional geometry, moreover, determines the pole pair numbers of a motor. Thus, if the cross-sectional geometry remains the same between the rescaled and the baseline motors, then the pole pairs numbers also remain the same.

In other embodiments, the user may enter values for all of the rescaling factors, e.g., $K_A$, $K_R$ and $K_W$. In other embodiments, the user may enter values for $K_R$ and/or $K_W$ and the model rescaling tool may derive the remaining factors.

The parameter modification engine 226 may use one or more rescaling factors to rescale one or more parameters of the baseline motor model 2002, as indicated at step 2508.

For example, the parameter modification engine 226 may compute a new value for the stator phase resistance parameter for the rescaled motor model based on the value of the parameter for the baseline motor model 2002 as shown below:

$$R_{s\,rescaled} = \frac{K_W^2}{K_R^2} K_A R_{s\,baseline}$$

where, $R_S$ is the stator phase resistance in ohms.

The parameter modification engine 226 may compute a new value for the maximum current parameter for the rescaled motor model based on the value of the parameter for the baseline motor model as shown below:

$$I_{rescaled} = \frac{K_R}{K_W} I_{baseline}$$

where,

I is any current variable. For example, the above ratio or relationship may be used to rescale the current indices, id and iq, of the flux linkage tables as well as the reference current indices of the controller's LUTs. Indices may also be referred to as breakpoints. The above ratio or relationship also may be used to rescale the maximum motor current of the rescaled motor based on the maximum motor current of the baseline motor. The maximum motor current of a motor may be given by the motor designer to ensure the iron core of the motor will not saturate to a certain threshold.

The lookup table reshaping engine 228 may use one or more rescaling factors to reshape one or more LUTs of the motor model, as indicated at step 2510. For example, the lookup table reshaping engine 228 may reshape the d-axis current LUT and the q-axis current LUT of the baseline motor model 2002. As noted, the d-axis current LUT may output a d-axis current value, $i_d$, as a function of a q-axis flux value, $\lambda_q$, and a d-axis flux value, $\lambda_d$. The lookup table reshaping engine 228 may rescale the output current values and the input breakpoints of the baseline d-axis and q-axis current LUTs as follows:

$$i_{d\,rescaled} = \frac{K_R}{K_W} I_{d\,baseline}$$

$$i_{q\,rescaled} = \frac{K_R}{K_W} I_{q\,baseline}$$

$$\lambda_{d\,rescaled} = K_A K_R K_W \lambda_{d\,baseline}$$

$$\lambda_{q\,rescaled} = K_A K_R K_W \lambda_{q\,baseline}$$

where, $i_d$ is the stator current for the d-axis,
$i_q$ is the stator current for the q-axis,
$\lambda_d$ is the d-axis flux, and
$\lambda_q$ is the q-axis flux.

Reshaping operations can include not only rescaling of output and input breakpoint parameters, but also nonlinear breakpoint spacing rearrangements to focus the lookup tables in specific regions of high nonlinearity.

Figure 27:
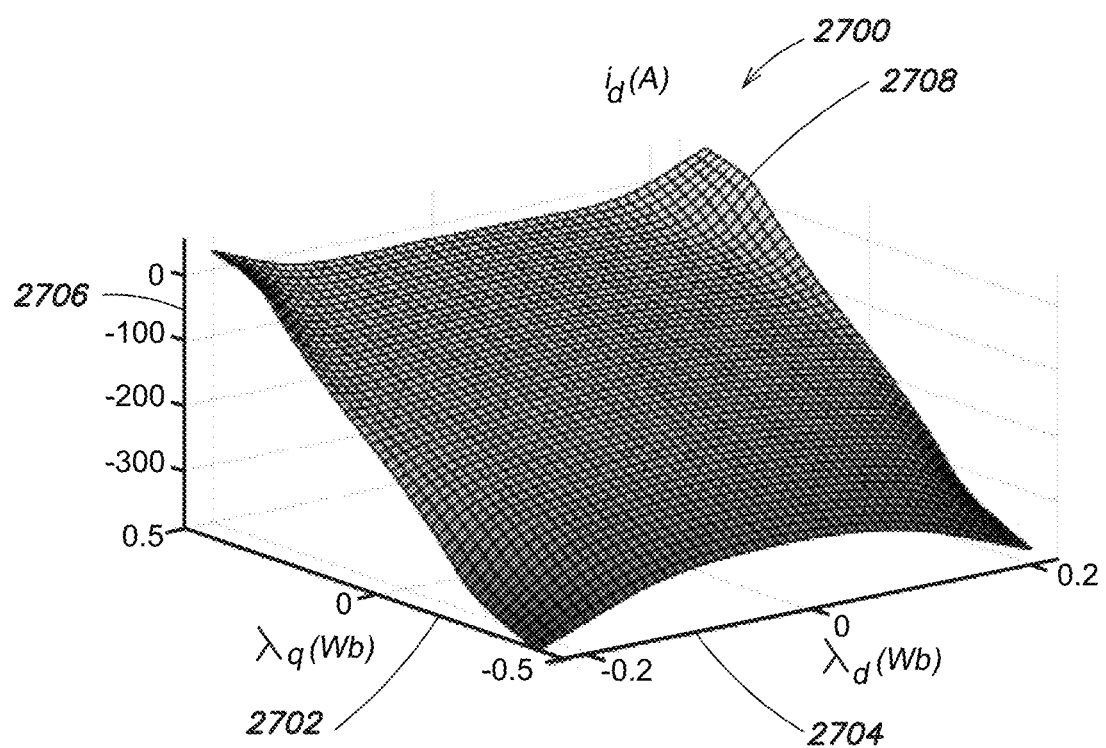
FIG. 27 is a schematic illustration of an example of a lookup table for a baseline motor model in accordance with one or more embodiments.

FIG. 27 is a schematic illustration of an example of a lookup table 2700 for obtaining d-axis current for the baseline motor model 2002 that models an 80 kW PMSM motor in accordance with one or more embodiments. The table 2700 includes a q-axis flux ($\lambda_q$) axis 2702, a d-axis flux ($\lambda_d$) axis 2704 and a d-axis current ($i_d$) axis 2706. The table 2700 also includes a plot of table data 2708.

Figure 28:
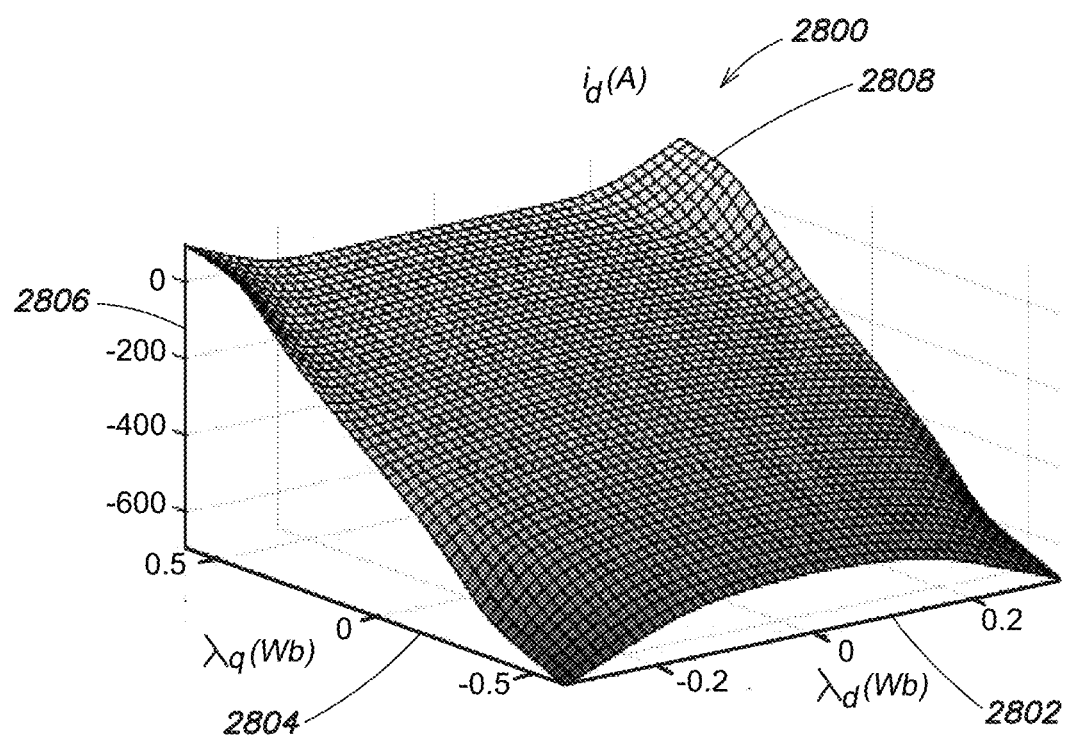
FIG. 28 is a schematic illustration of an example of a rescaled lookup table for a rescaled motor model in accordance with one or more embodiments.

FIG. 28 is a schematic illustration of an example of a rescaled lookup table 2800 for obtaining d-axis current for a rescaled motor model that models a 200 kW PMSM motor in accordance with one or more embodiments. The table 2800 includes a q-axis flux ($\lambda_q$) axis 2802, a d-axis flux ($\lambda_d$) axis 2804 and a d-axis current ($i_d$) axis 2806. The table 2800 also includes a plot of table data 2808.

It should be observed that the larger motor produces higher current values and uses higher flux values. The larger motor also produces higher torque values correspondingly.

Figure 25A:
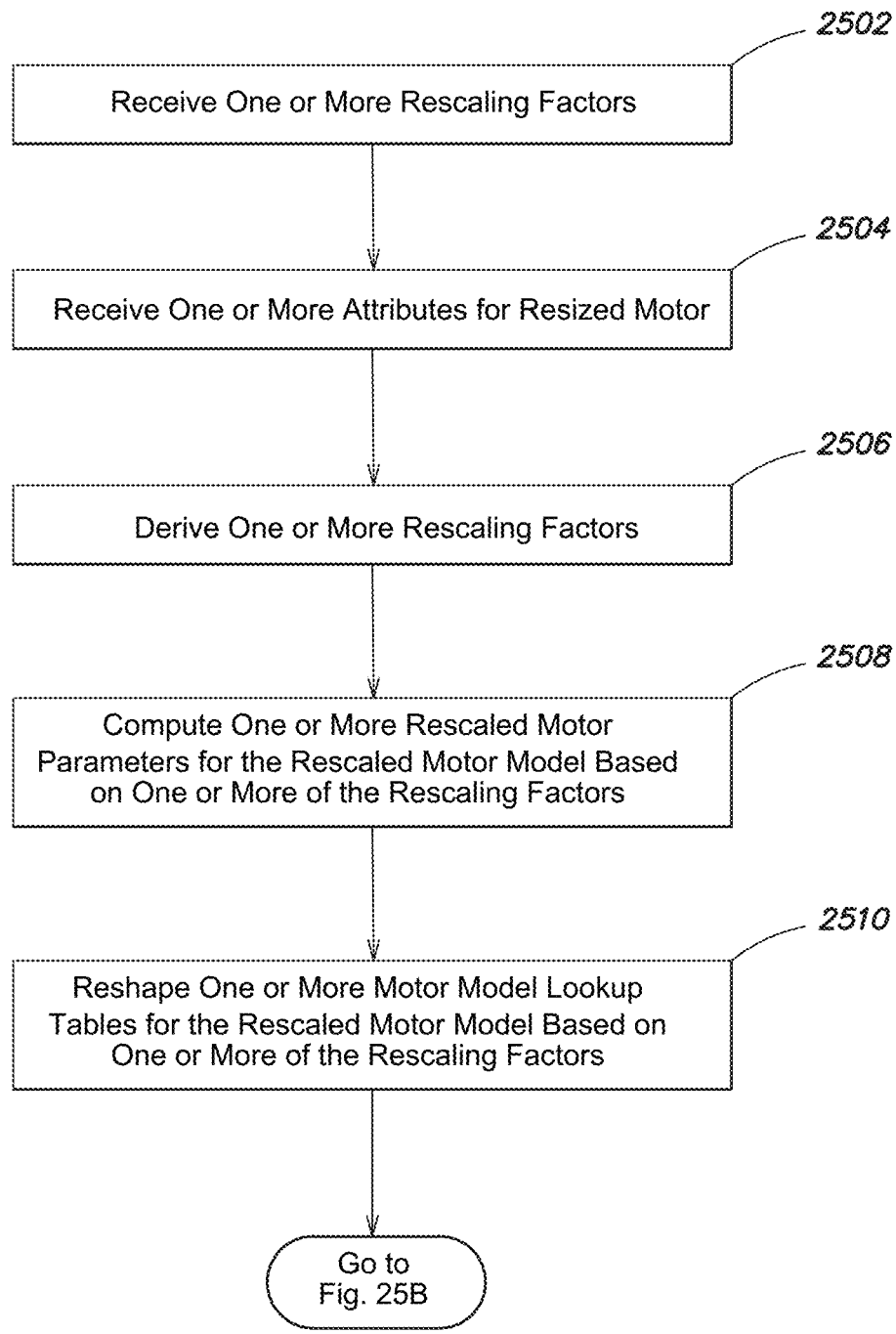
FIGS. 25A-D are partial views of a flow diagram of an example method in accordance with one or more embodiments.
Figure 25B:
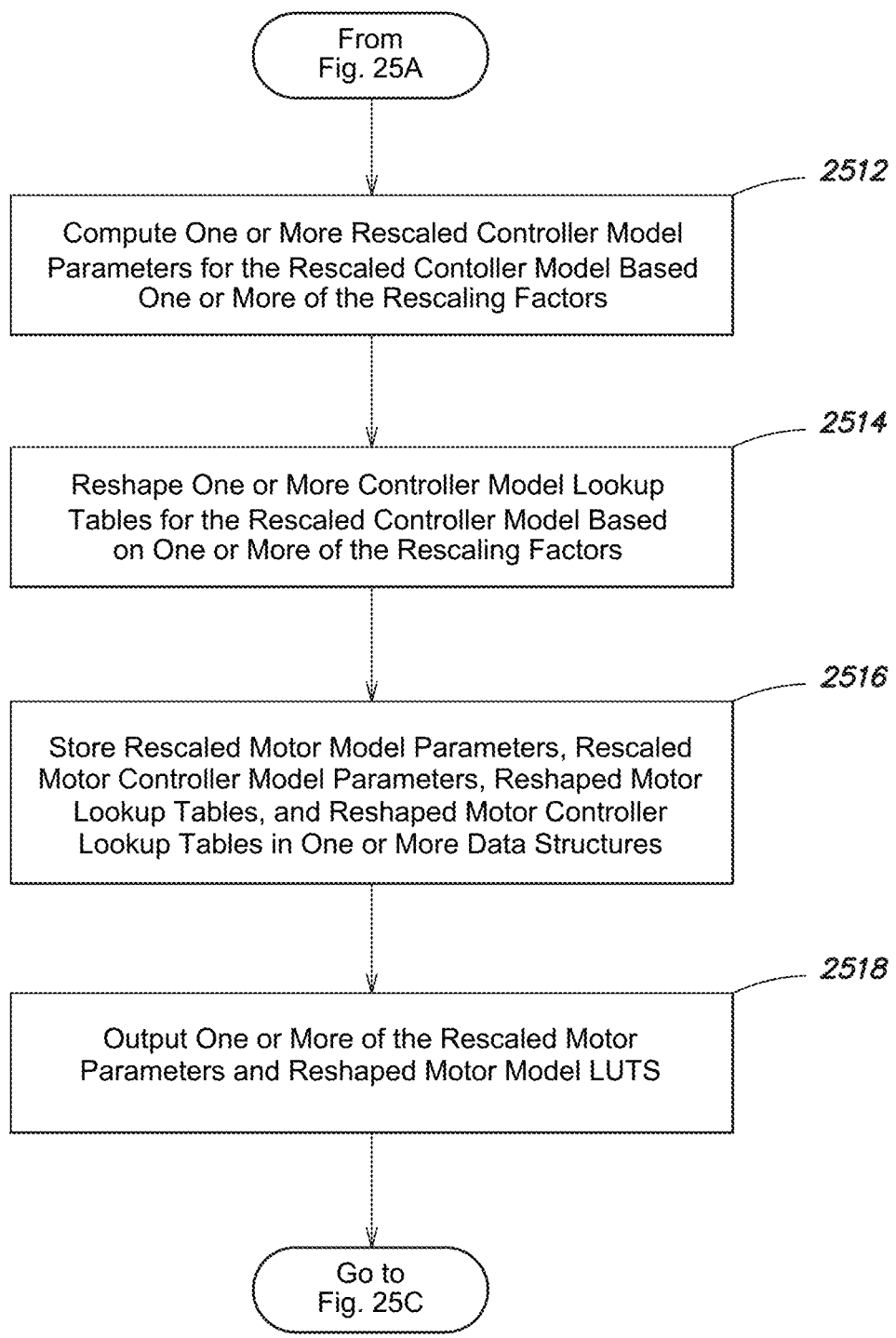

The parameter modification engine 226 may use one or more of the rescaling factors to rescale one or more parameters of the baseline controller model 2004, as indicated at step 2512 (FIG. 25B).

For example, the parameter modification engine 226 may compute new Proportional (P) and Integral (I) parameters for the rescaled controller model based on the values for the baseline controller model 2004 as shown below:

$$K_{p\_d\,rescaled} = K_W^2 \cdot K_A \cdot K_{p\_d\,baseline}$$

$$K_{p\_q\,rescaled} = K_W^2 \cdot K_A \cdot K_{p\_q\,baseline}$$

$$K_{i\_d\,rescaled} = \left(\frac{K_W^2}{K_R^2}\right) \cdot K_A \cdot K_{i\_d\,baseline}$$

$$K_{i\_q\,rescaled} = \left(\frac{K_W^2}{K_R^2}\right) \cdot K_A \cdot K_{i\_q\,baseline}$$

where, $K_{p\_d}$ is the d-axis $K_p$ parameter,
$K_{p\_q}$ is the q-axis $K_p$ parameter,
$K_{i\_d}$ is the d-axis $K_i$ parameter, and
$K_{i\_q}$ is the q-axis $K_i$ parameter.

It should be understood that the parameter modification engine 226 may use one or more other ratios or equations to compute rescaled P and I parameter that are in addition to or different from the above exemplary ratios or equations. For example, in other embodiments, the parameter modification engine 226 may use one or more of the following ratios or equations:

$$K_{p\_d\,rescaled} = K_R K_{p\_d\,baseline}$$

$$K_{p\_q\,rescaled} = K_R K_{p\_q\,baseline}$$

$$K_{i\_d\,rescaled} = \frac{K_{i\_d\,baseline}}{K_R}$$

$$K_{i\_q\,rescaled} = \frac{K_{i\_q\,baseline}}{K_R}$$

In some embodiments, this may be further extended to a series of values as given below:

$$K_{p\_new} = i \cdot K_R \cdot K_p$$

$$K_{i\_new} = \frac{K_i}{i \cdot K_R}$$

where i is may be positive real number, $\{i \in R: i>0\}$, e.g., i=0.25, 0.5, 1,2, etc.

This approach provides a series of regulator gains for the resized motor.

The lookup table reshaping engine 228 may use one or more rescaling factors to reshape the LUTs of the baseline controller model 2004, as indicated at step 2514. For example, the baseline controller model 2004 may include d-axis and q-axis flux linkage tables in the current controller as part of "cross-decoupling" control. The lookup table reshaping engine 228 may rescale the breakpoints of the baseline d-axis and q-axis flux linkage LUTs as follows:

$$i_{d\_index\,rescaled} = \frac{K_R}{K_W} i_{d\_index\,baseline}$$

$$i_{q\_index\,rescaled} = \frac{K_R}{K_W} i_{q\_index\,baseline}$$

$$\psi_{d\,rescaled} = K_A K_R K_W \psi_{d\,baseline}$$

$$\psi_{q\,rescaled} = K_A K_R K_W \psi_{q\,baseline}$$

is where, $i_{d\_index}$ are d-axis current input breakpoints,
$i_{q\_index}$ are q-axis current input breakpoints,
$\psi_d$ is the flux linkage for the d-axis,
$\psi_q$ is the flux linkage for the q-axis.

The baseline controller model 2004 also may include a LUT for determining a d-axis reference current values as a function of torque and motor speed and a LUT for determining q-axis reference current values also as a function of torque and motor speed. The lookup table reshaping engine 228 may scale the breakpoints of the LUTs of the baseline controller model 2004 as shown below:

$$Torque_{rescaled} = K_R^2 K_A Torque_{baseline}$$

$$i_{d\_ref\,rescaled} = \frac{K_R}{K_w} i_{d\_ref\,baseline}$$

$$i_{q\_ref\,rescaled} = \frac{K_R}{K_w} i_{q\_ref\,baseline}$$

Motor speed may not be rescaled.

Figure 29:
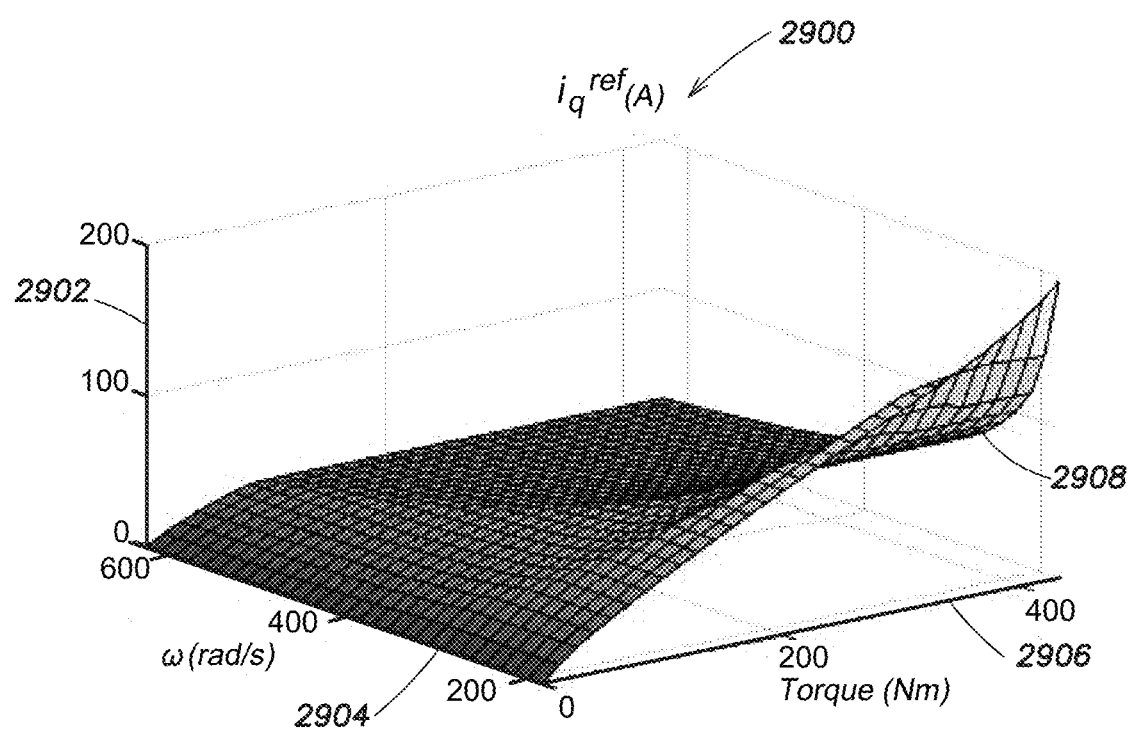
FIG. 29 is a schematic illustration of an example of a lookup table for a baseline controller model in accordance with one or more embodiments.

FIG. 29 is a schematic illustration of an example of a lookup table 2900 for obtaining q-axis reference current for the baseline controller model 2004 matched to an 80 kW PMSM motor in accordance with one or more embodiments. The table 2900 includes a d-axis reference current ($i_{q\_reference}$) axis 2902, a motor speed (ω) axis 2904, and a torque axis 2906. The table 2900 also includes a plot of table data 2908.

Figure 30:
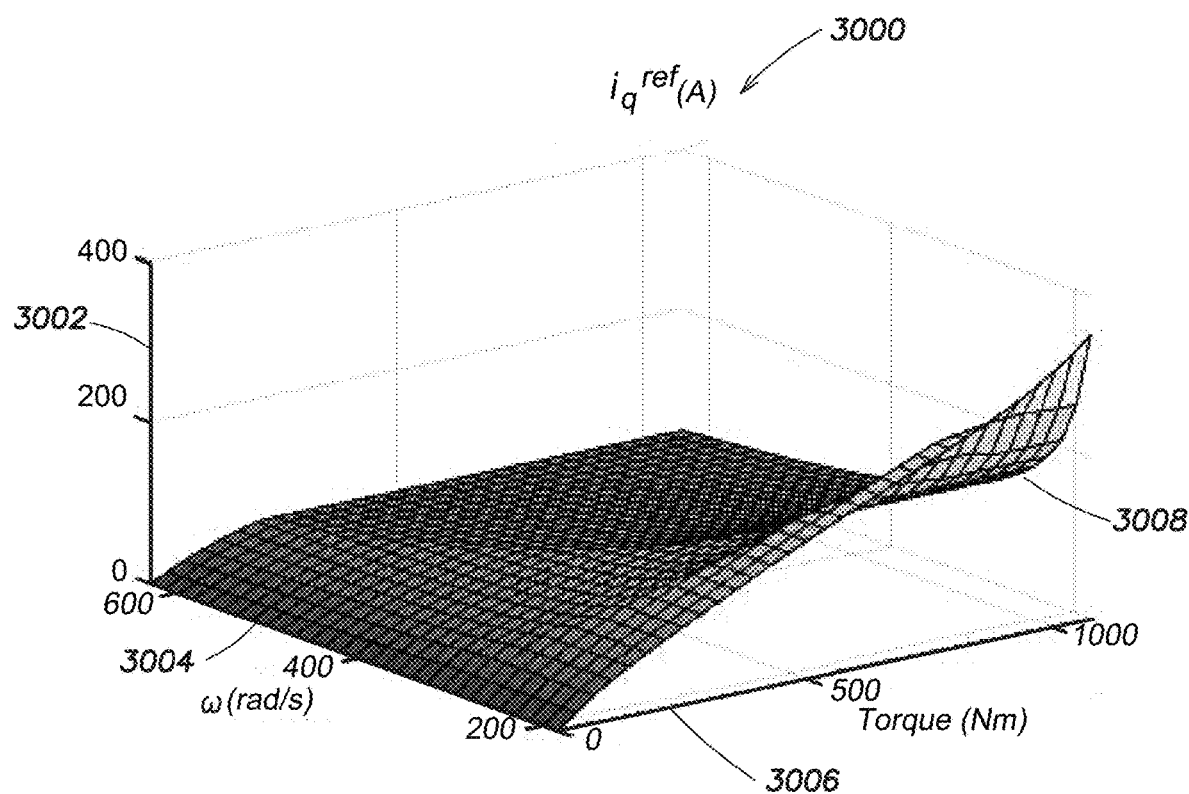
FIG. 30 is a schematic illustration of an example of a rescaled lookup table for a rescaled controller model in accordance with one or more embodiments.

FIG. 30 is a schematic illustration of an example of a rescaled lookup table 3000 for obtaining q-axis reference current for a rescaled controller model matched to a 200 kW PMSM motor in accordance with one or more embodiments. The table 3000 includes a d-axis reference current ($i_{q\_reference}$) axis 3002, a motor speed (ω) axis 3004, and a torque axis 3006. The table 3000 also includes a plot of table data 3008.

Figure 25C:
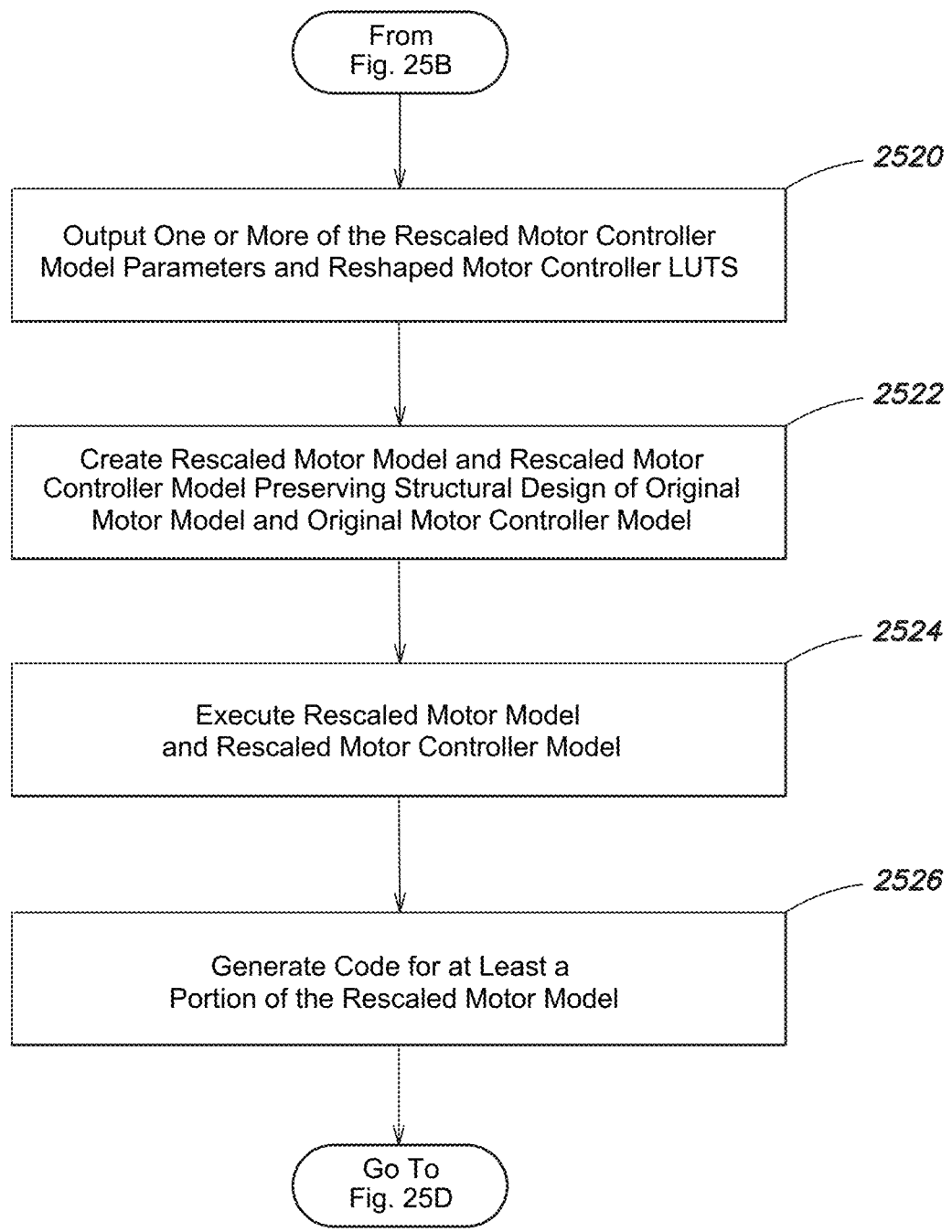

The model rescaling tool 214 may store new, rescaled parameter values and reshaped LUTs in one or more data structures, such as one or more files, container objects, data objects, workspace variables, etc., as indicated at step 2516. In some embodiments, the model rescaling tool 214 may output one or more of the rescaled motor model parameters and/or one or more reshaped motor model LUTs, as indicated at step 2518. The model rescaling tool also may output one or more of the rescaled controller model parameters and/or one or more reshaped controller model LUTs, as indicated at step 2520 (FIG. 25C).

The model rescaling tool 214 may create a rescaled motor model and a rescaled controller model, as indicated at step 2522. In some embodiments, the model rescaling tool 214 may preserve the structural design of the original (baseline) controller model and the original (baseline) motor model during the rescaling process, as also indicated at step 2522. For example, the rescaling tool 214 may reuse the original (baseline) motor model 2002 and the original (baseline) controller model 2004 by applying the rescaled parameters and the reshaped LUTs to the original (baseline) motor model and the original (baseline) controller model. That is, the rescaling tool 214 may not add any new model elements, remove any existing model elements, or change any connections among existing model elements in the original (baseline) motor model and the original (baseline) controller model. The model rescaling tool 214 may accomplish the rescaling process by directing the original (baseline) motor and controller models to utilize the new, rescaled parameter values computed by the parameter modification engine 226 and the new, reshaped lookup tables created by the lookup table reshaping engine 228 in place of the original parameters and original lookup tables. In some embodiments this may include changing the numerical values of workspace variables that are referenced by symbols in the models.

In other embodiments, the model rescaling tool 214 may create a new, rescaled motor model and/or a new, rescaled controller model that are separate from the original (baseline) motor model 2002 and/or the controller model 2004. For example, the model rescaling tool 214 may create copies of the original motor model 2002 and the original controller model 2004, and may assign the new, rescaled parameter values and the new, reshaped lookup tables to the new, rescaled motor and controller models.

The simulation engine 212 may execute the rescaled motor model and the rescaled controller model, as indicated at step 2524. For example, the simulation engine 212 may utilize the information in the one or more data structures storing the rescaled motor model parameters, the rescaled controller model parameters, the reshaped motor model LUTs, and the reshaped controller model LUTs during model execution.

Figure 25D:
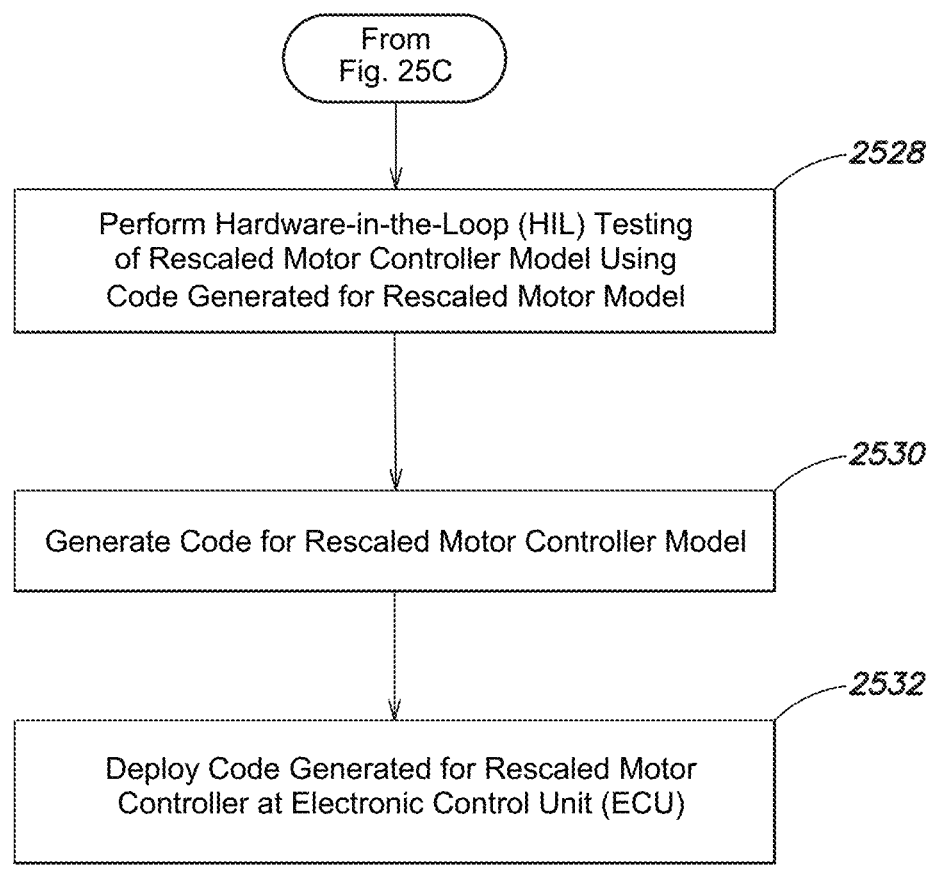

Alternatively or additionally to model execution, the code generator 208 may generate code for at least a portion of the rescaled motor model, as indicated at step 2526. The generated code for the rescaled motor model may be utilized in Hardware-in-the-Loop (HIL) testing of the rescaled controller model, as indicated at step 2528 (FIG. 25D). Alternatively or additionally to model execution and/or HIL testing, the code generator 208 may generate code for the rescaled controller model, as indicated at step 2530. The generated code for the rescaled controller model may be deployed as embedded software, for example on an electronic control unit (ECU) for use in a vehicle, as indicated at step 2532. For example, an ECU or other target hardware may be fabricated, and the generated code loaded onto the ECU or target hardware. The ECU or target hardware may be installed in a vehicle.

In some embodiments, the rescaled controller model and the rescaled motor model may be included in a simulation model that models a dynamometer setup.

Figure 31:
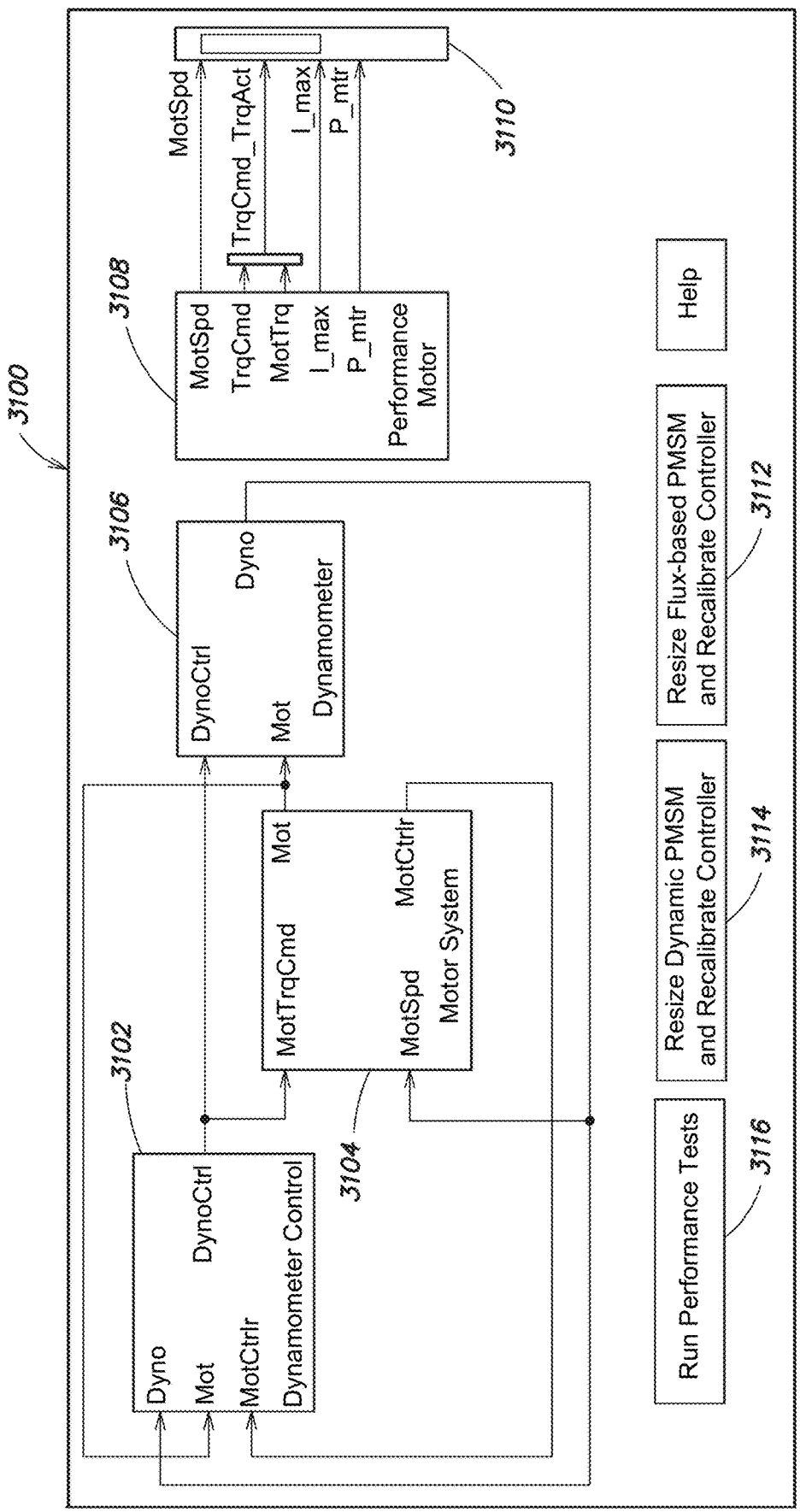
FIG. 31 is a schematic illustration of an example dynamometer system model for testing a rescaled controller model and a rescaled motor model in accordance with one or more embodiments.

FIG. 31 is a schematic illustration of an example motor dynamometer model 3100 for testing the rescaled motor controller model and the rescaled motor model in accordance with one or more embodiments. The motor dynamometer model 3100 may include a dynamometer control model 3102, a motor system model 3104, and a dynamometer model 3106. The motor dynamometer model 3100 also may include a performance monitor 3108 and a display element 3110, such as a scope block. The motor system model 3104 may contain the rescaled motor controller model and the rescaled motor model. The dynamometer control model 3102 may provide input stimuli for the motor system model 3104. For example, the dynamometer control model 3102 may provide motor speed inputs over a range, such as 0 to maximum (max) speed. The dynamometer control model 3102 may vary the speed in increments, such as increments of 500 rpm, over the range. Each speed increment may be held for a time interval. The dynamometer control model 3102 also may provide torque inputs. For example, during the time interval for each speed increment, the dynamometer control model 3102 may vary the torque input from 0 to max torque and back to 0. The dynamometer model 3106 may monitor one or more outputs of the motor and/or motor controller models, such as torque, current, etc. In some embodiments, the dynamometer model 3106 may determine, e.g., compute, characteristics, such as the temperature of the motor, etc.

The motor dynamometer model 3100 may include one or more command buttons. For example, the motor dynamometer model 3100 may include a command button 3112, named 'Resize Flux-based PMSM and Recalibrate Controller', for commencing a process for resizing a flux-based PMSM motor model and matching motor controller button, and a command button 3114, named 'Resize Dynamic PMSM and Recalibrate Controller', for commencing a process for resizing a dynamic PMSM motor model and matching motor controller model. The motor dynamometer model 3100 also may include a command button 3116, named 'Run Performance Tests', for running the motor dynamometer model 3100, which may go through the different operating points in commanded torque and speed, and may also determine the measured torque.

In some embodiments, an original dynamometer system model may have been created for the original (baseline) controller model and the original (baseline) motor model. The model rescaling tool 214 may reuse this dynamometer system model. The model rescaling tool 214 may rescale one or more parameters of the motor dynamometer model 3100 to match the size of the rescaled motor controller and motor models using one or more rescaling factors. For example, the model rescaling tool 214 may rescale the testing range in torque to reflect the new motor size. In some embodiments, the model rescaling tool 214 may preserve the testing range in speed of the motor dynamometer model 3100, because a motor's speed range may be relatively fixed for electric vehicles.

For example, the dynamometer control model 3102 may include a plurality of original motor torque command points. The model rescaling tool 214 may generate rescaled motor torque command points for the dynamometer control model 3102 as follows:

$$\text{Motor Torque Command}_{rescaled} = K_R^2 K_A \text{Motor Torque Command}_{baseline}$$

The model rescaling tool 214 may first determine a maximum achievable torque for the rescaled motor using the maximum achievable torque of the baseline motor in the above equation and/or relation. The maximum torque for baseline motor may be known. Accordingly, the maximum torque for the resized motor may be determined. Next, the model rescaling tool 214 may resize the torque command points of the baseline motor dynamometer model 3100 by the above relation.

Alternatively, the user can input new torque command points that conform to torque limits determined elsewhere.

The motor dynamometer model 3100 may include parameters, such as motor size parameters, inertia parameters, power absorption parameters, heat rejection capacity parameters, etc. These additional parameters may also be rescaled.

With the motor dynamometer model rescaled to match the rescaled motor controller and motor models, the rescaled motor dynamometer model may be run to test the rescaled motor controller and motor models at a plurality of test points. During testing of the rescaled motor controller and motor models, motor output data may be stored, e.g., logged. In some embodiments, a set of lookup tables may be created based on the motor output data obtained during testing of the rescaled motor controller and motor models. The set of lookup tables, which may contain sufficient data to model the performance behavior of the rescaled motor model, also may be associated with a static motor equivalent model element.

Figure 33A:
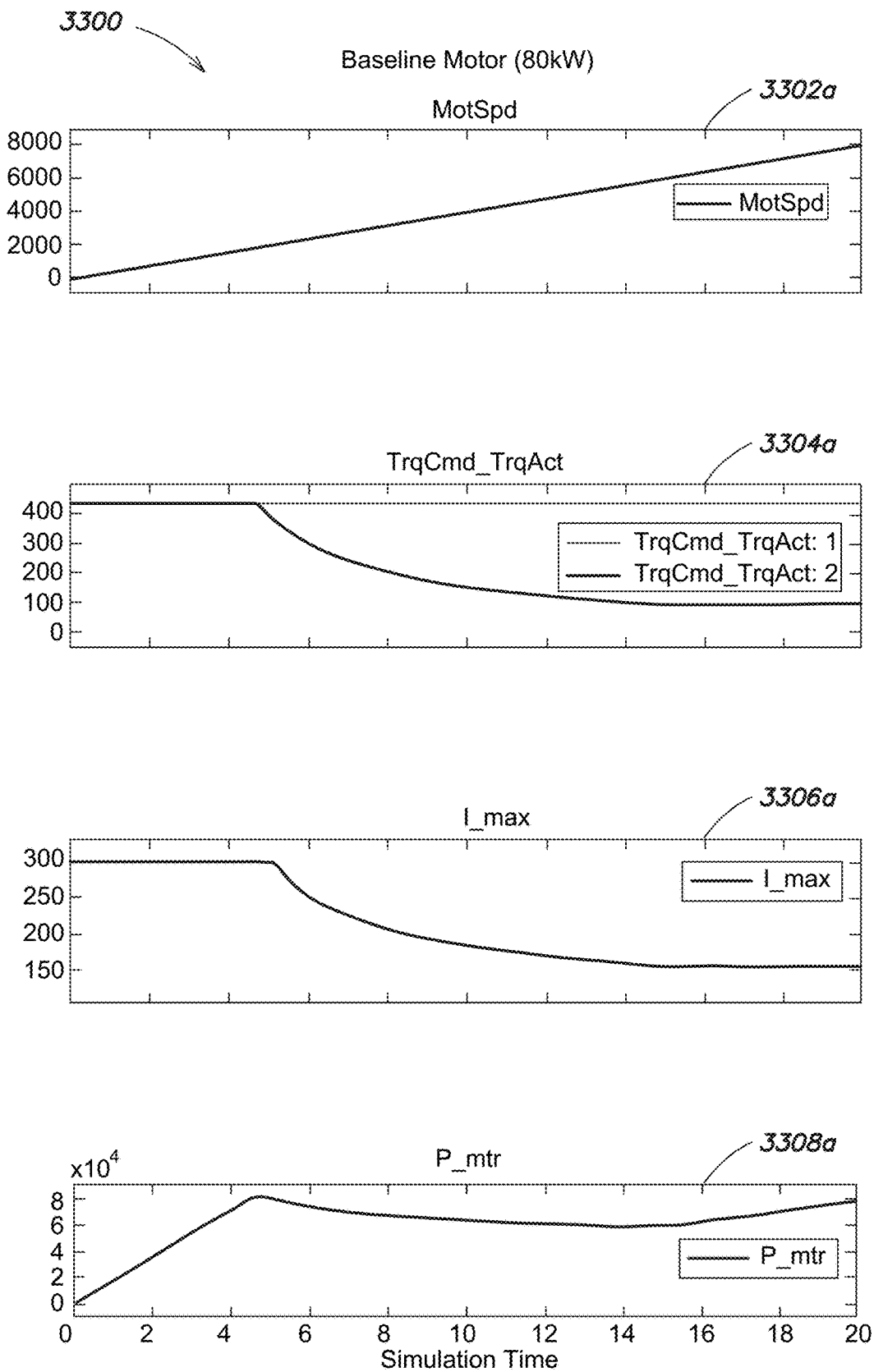
FIGS. 33A and B are partial views of an example of plots of data from performance tests produced during simulation of a baseline motor model and motor controller model and a rescaled motor model and motor controller in accordance with one or more embodiments.
Figure 33B:
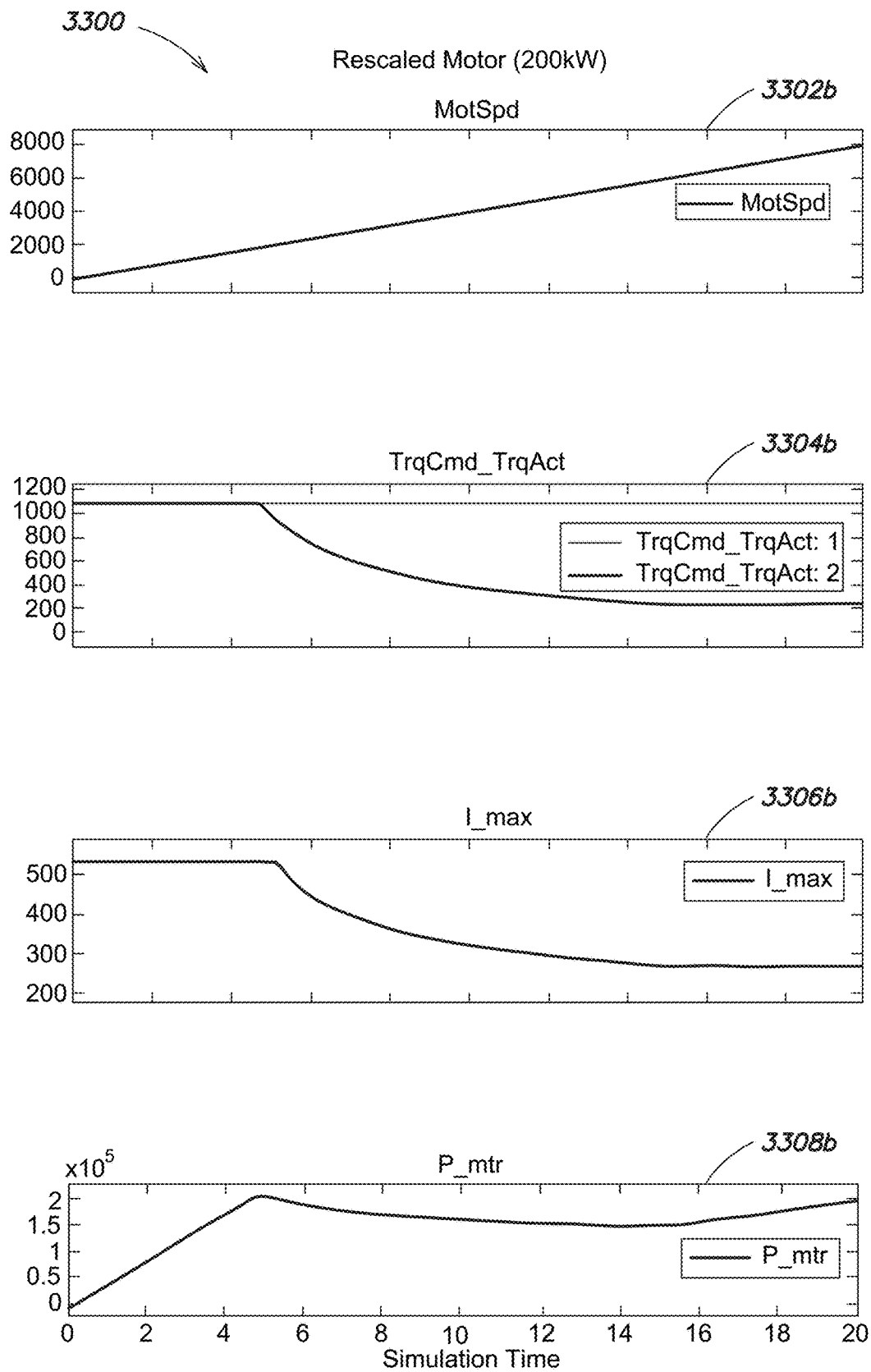

FIGS. 33A and B are partial views of an example of an arrangement 3300 of plots of data resulting from performance tests of an 80 kW motor as compared to a 200 kW motor produced during simulation in accordance with one or more embodiments. The plots may include plots of motor speed 3302a and 3302b, torque command vs. actual torque 3304a and 3304b, maximum current (I_max) 3306a and 3306b, and motor power 3308a and 3308b all as a function of simulation time, e.g., zero to 20 seconds. As shown in plots 3302a and 3302b, motor speed for both the baseline and the rescaled motors is increased linearly from zero (at simulation time zero) to 8000 revolutions per minute (rpm) (at simulation time 20 seconds). As shown in plot 3304a, the torque command for the baseline motor is held constant at approximately 420 Nm over the entire simulation time. While the torque produced by the baseline motor matches the torque command for motor speed zero to 2000 rpm, when the motor speed exceeds approximately 2000 rpm, the torque produced by the baseline motor starts to fall below the torque command. As shown in plot 3304b, the torque command for the rescaled motor is held constant at approximately 1040 (Nm) over the entire simulation time. As with the baseline motor, while the torque produced by the rescaled motor matches the torque command for motor speed zero to 2000 rpm, when the motor speed exceeds approximately 2000 rpm, the torque produced by the rescaled motor starts to fall below the torque command.

Figure 34A:
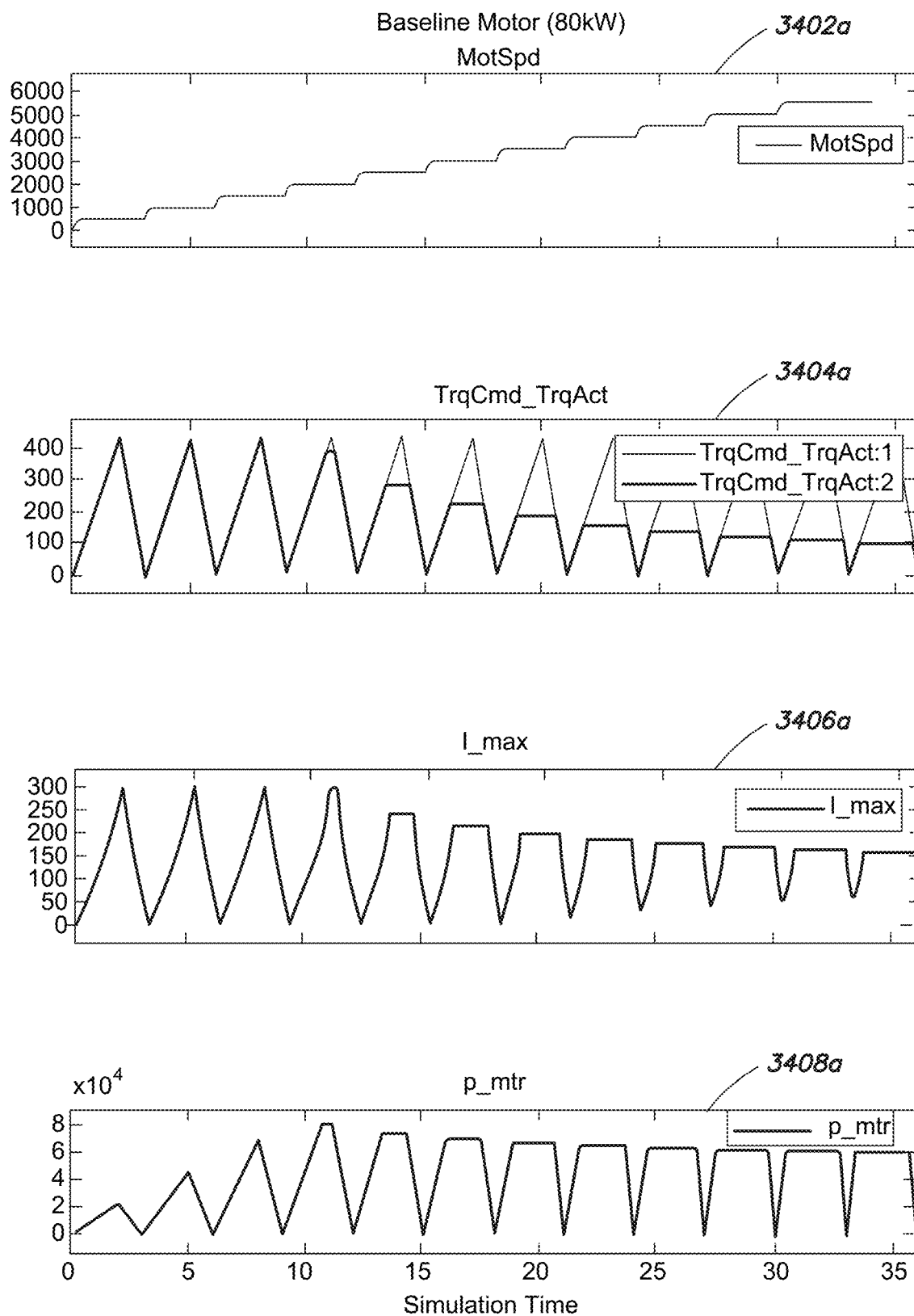
FIGS. 34A and B are partial views of another example of plots of data from performance tests produced during simulation of a baseline motor model and motor controller model and a rescaled motor model and motor controller model in accordance with one or more embodiments.
Figure 34B:
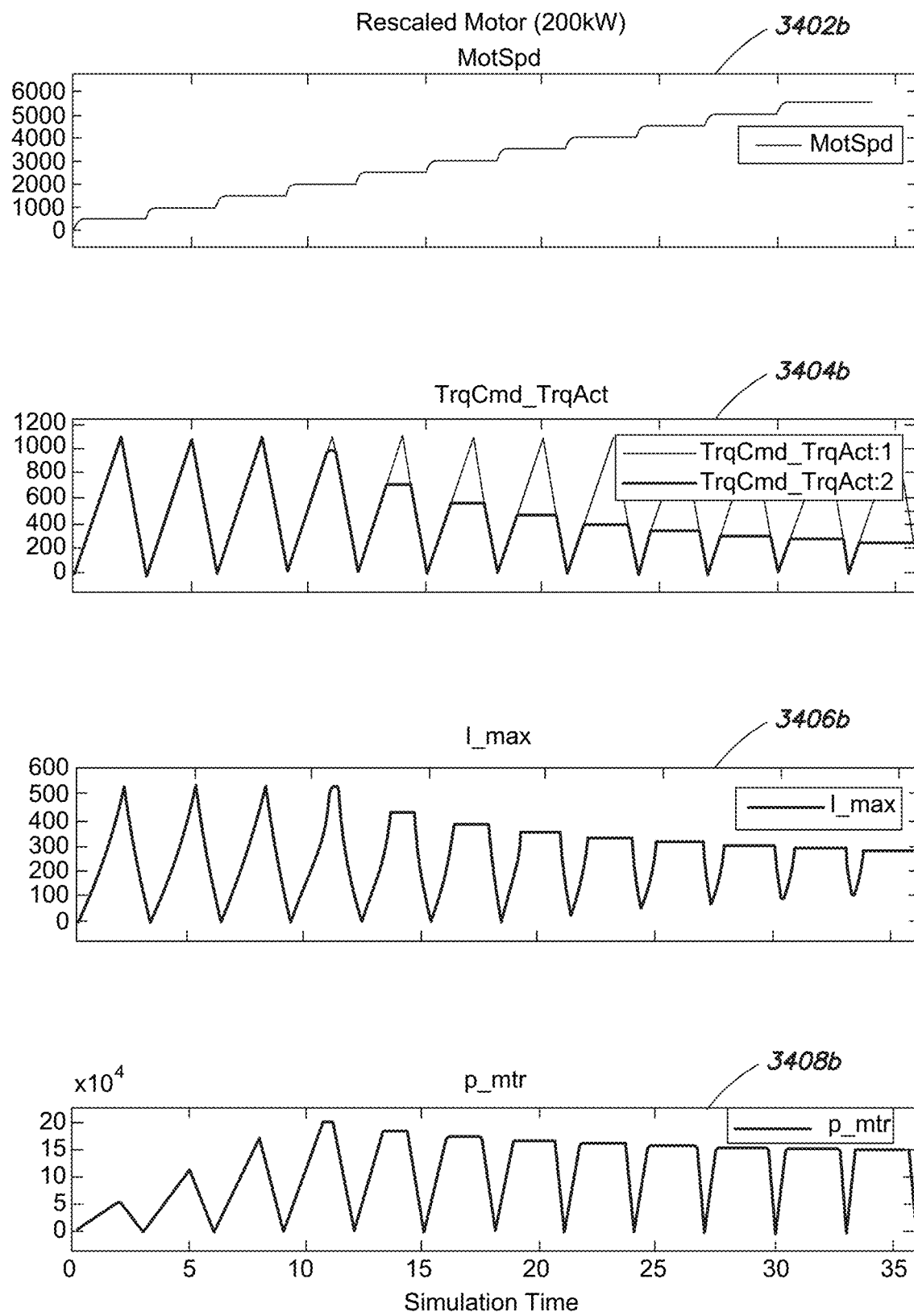

FIGS. 34A and B are partial views of example of an arrangement 3400 of plots of data resulting from performance tests of an 80 kW motor as compared to a 200 kW motor tested at different operating points of torque and speed compared to FIGS. 33A and B produced during simulation in accordance with one or more embodiments. The plots may include plots of motor speed 3402a and 3402b, torque command vs. actual torque 3404a and 3404b, maximum current (I_max) 3406a and 3406b, and motor power 3408a and 3408b all as a function of simulation time, e.g., zero to 36 seconds. As shown in plots 3402a and 3402b, motor speed for both the baseline and the rescaled motors is incremented in steps of 500 rpm from zero to 6000 rpm with each step held for approximately three seconds simulation time. As shown in plot 3404a, for each step of motor speed, the torque command rises linearly from zero to approximately 420 Nm and then drops linearly back to zero. While the torque produced by the baseline motor matches the torque command for motor speed zero to 1500 rpm, starting at motor speed 2000 rpm, the torque produced by the baseline motor does not match the torque command. As shown in plot 3304b, for each step of motor speed, the torque command rises linearly from zero to approximately 1040 Nm and then drops linearly back to zero. As with the baseline motor, while the torque produced by the resealed motor matches the torque command for motor speed zero to 1500 rpm, starting at motor speed 2000 rpm, the torque produced by the resealed motor does not match the torque command.

In some embodiments, a static motor equivalent model element may be parameterized directly using data obtained from finite element analysis (FEA), such as a models created in ANSYS Maxwell, or JSOL JMAG simulation environment.

As described, the original motor model and the resealed motor model may be physical and/or dynamic models that perform operations or functions during execution to compute motor output data. During simulation of a dynamic model, differential equations may be generated and/or solved. In contrast, the static motor equivalent model element may not be a dynamic model. Instead, the static motor equivalent model element may determine motor output data based entirely on the information included in its set of lookup tables. The modeling environment 200 may substitute the static motor equivalent model element for the resealed motor model. For example, the modeling environment 200 may delete the resealed motor model from the dynamometer system model and connect the resealed controller model to the static motor equivalent model element. The modeling environment 200 may run the dynamometer system model that includes the static motor equivalent model element.

Because it consists principally of lookup tables, the static motor equivalent model element may execute faster than the resealed motor model and may use less memory space than the resealed motor model.

It should be understood that the resealed motor controller and motor models can be used to determine the size of other system components, such as battery and/or electrical components of a vehicle.

Suppose in addition to or instead of rescaling the 80 kW motor and controller models, the user wishes to evaluate a lower power flux-based PMSM motor and controller models. For example, suppose the user wishes to evaluate a 20 kW flux-based PMSM motor model and matching controller model. With the present disclosure, the model rescaling tool 214 can automatically rescale the 80 kW motor model 2002 and the controller model 2004 to create a 20 kW motor model and a matching controller model. As with the rescaling to the 200 kW motor and controller models, rescaling to a lower power motor model and controller model does not require the user to obtain new non-linear data for the new size motor, e.g., the 20 kW motor, and its matching controller to be modeled.

Here, an exemplary axial rescaling factor ($K_A$) may be 0.8, and a new power input may be 20e3. In some embodiments, the DC link voltage for the rescaled motor may be kept the same as the baseline motor.

Figure 32:
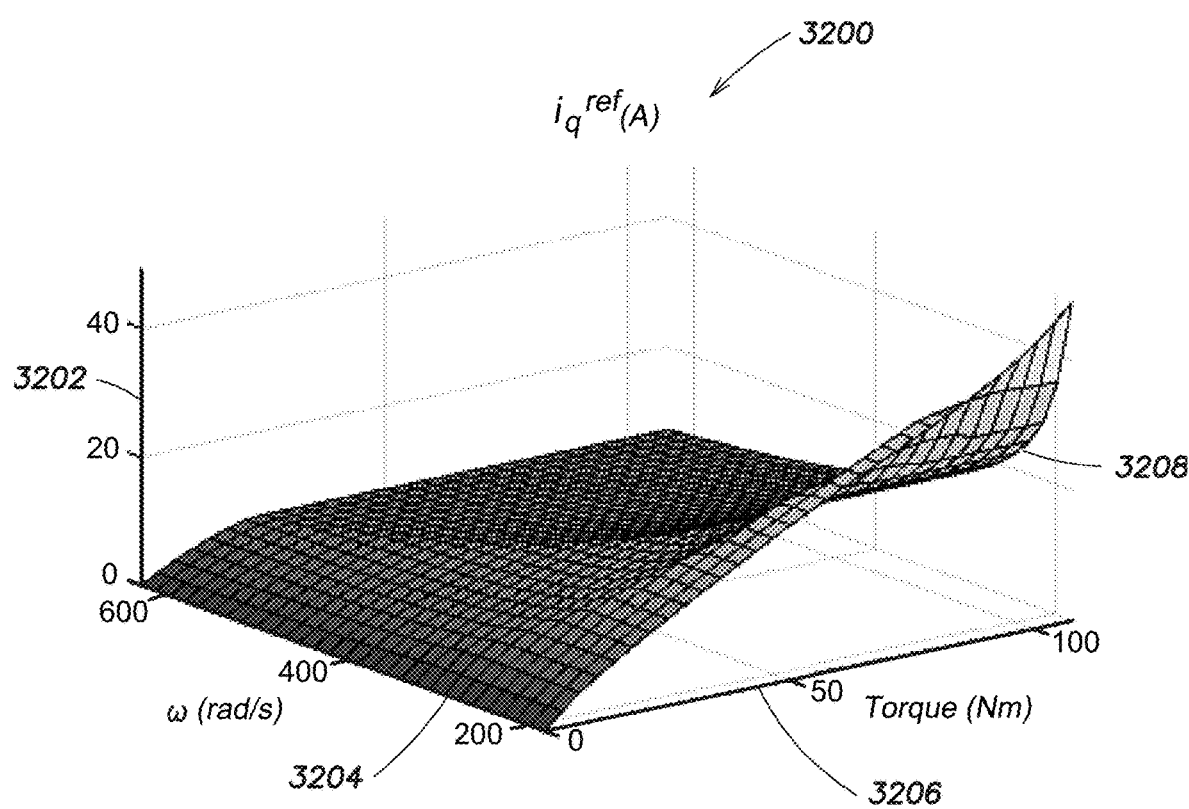
FIG. 32 is a schematic illustration of an example of a rescaled lookup table for a rescaled controller model in accordance with one or more embodiments.

FIG. 32 is a schematic illustration of an example of a rescaled lookup table 3200 for obtaining q-axis reference current for a rescaled controller model matched to a 20 kW PMSM motor in accordance with one or more embodiments. The table 3200 includes a q-axis reference current ($i_{q-reference}$) axis 3202, a motor speed ($\omega$) axis 3204 and a torque axis 3206. The table 3200 also includes a plot of table data 3208.

In some embodiments, the motor model may model other types of electric motors, such as a Synchronous Reluctance (SynRM) motor, a Permanent Magnet Assisted Synchronous Reluctance motor, or a lumped parameter/dynamic PMSM motor, and the controller model may model a controller for these other types of electric motors. The model rescaling tool 214 may use the same process as described for the PMSM motor when rescaling a SynRM or a Permanent Magnet Assisted Synchronous Reluctance motor. A lumped parameter motor model may not include flux linkage parameters. Instead, a lumped parameter model may include one or more inductance parameters, such as d-axis and q-axis inductance parameters. The model rescaling tool 214 may rescale the one or more inductance parameters of the lumped parameter model as follows:

$$L_{d\ rescaled} = K_W^2 K_A L_{d\ baseline}$$

$$L_{q\ rescaled} = K_W^2 K_A L_{q\ baseline}$$

where, $L_d$ is the d-axis inductance, and $L_q$ is the q-axis inductance.

The following examples implement one or more aspects of methods and/or systems of the present disclosure. These examples are non-limiting examples. Features of different examples may be combined in other implementations. Features of each example may be modified or removed in other implementations.

Aspect 1. A method comprising:
accessing an engine controller model and an engine model, the engine controller model and the engine model being executable, the engine controller model including original controller parameters and original controller lookup tables, the engine model including original engine parameters and original engine lookup tables, the engine model during execution simulating operation of an original engine of a given size;

receiving one or more rescaling factors that indicate a change in the given size of the original engine to a new size of a resized engine;

determining based on the one or more rescaling factors, a plurality of ratios between the original engine of the given size and the resized engine of the new size;

generating rescaled controller parameters by modifying the original controller parameters based on the plurality of ratios;

generating rescaled engine parameters by modifying the original engine parameters based on the plurality of ratios;

creating reshaped controller lookup tables by modifying the original controller lookup tables based on the plurality of ratios;

creating reshaped engine lookup tables by modifying the original engine lookup tables based on the plurality of ratios; and executing, by the processor, the engine controller model and the engine model utilizing the rescaled controller parameters, the rescaled engine parameters, the reshaped controller lookup tables, and the reshaped engine lookup tables, to simulate operation of the resized engine of the new size.

Aspect 2. The method of aspect 1 wherein the one or more rescaling factors include a maximum engine power and a number of engine cylinders.

Aspect 3. The method of any of the preceding aspects, in particular of aspect 1, wherein the plurality of ratios include at least one of:
a first ratio of engine speeds between the original engine of the given size and the resized engine of the new size;
a second ratio of engine torques between the original engine of the given size and the resized engine of the new size;
a third ratio of engine displacements between the original engine of the given size and the resized engine of the new size, or
a fourth ratio of engine powers between the original engine of the given size and the resized engine of the new size.

Aspect 4. The method of any of the preceding aspects, in particular of aspect 3, wherein the original engine parameters include first engine parameters for engine volume characteristics, and the generating the rescaled engine parameters includes modifying the first parameters as a function of at least the second ratio.

Aspect 5. The method of any of the preceding aspects, in particular of aspect 3, wherein the original engine parameters include second engine parameters for engine area characteristics, and the generating the rescaled engine parameters includes modifying the second parameters as a function of at least the fourth ratio.

Aspect 6. The method of any of the preceding aspects, in particular of aspect 3, wherein one or more of the original engine lookup tables include first breakpoints for engine speed and second breakpoints for engine torque, injected fuel mass, or normalized cylinder air charge, and the creating reshaped engine lookup tables includes modifying the first breakpoints as a function of at least the first ratio, and modifying the second breakpoints as a function of at least the second ratio.

Aspect 7. The method of any of the preceding aspects, in particular of aspect 6, wherein the one or more of the original engine lookup tables further include table array data, the method further comprising:

modifying the table array data by at least one of the plurality of ratios.

Aspect 8. The method of any of the preceding aspects, in particular of aspect 1 wherein the executing includes:

generating, by the engine controller model, rescaled engine commands; and generating, by the engine model, rescaled engine output data.

Aspect 9. The method of any of the preceding aspects, in particular of aspect 1, wherein the original engine lookup tables include first tables containing emissions data for the original engine of the given size, the creating reshaped engine lookup tables includes reshaping the first tables to represent new emissions data for the resized engine of the new size.

Aspect 10. The method of any of the preceding aspects, in particular of aspect 1, wherein the executing the engine controller model and the engine model occurs over a range of test points producing rescaled engine output data, the method further comprising:

creating, by the processor, a set of static engine lookup tables from the rescaled engine output data; and creating a model element that includes the set of static engine lookup tables, where the model element represents a static engine equivalent to the engine model that utilizes the rescaled engine parameters and the reshaped engine lookup tables.

Aspect 11. The method of any of the preceding aspects, in particular of aspect 1, further comprising:

generating code for the engine controller model having the rescaled controller parameters and the reshaped controller lookup tables, the code configured for deployment as embedded software on an electronic control unit (ECU).

Aspect 12. The method of any of the preceding aspects, in particular of aspect 1, further comprising:

generating code for at least a portion of the engine model having the rescaled engine parameters and the reshaped engine lookup tables; and performing hardware-in-the-loop (HIL) testing of the engine controller model having the rescaled controller parameters and the reshaped controller lookup tables, using the code generated for the at least a portion of the engine model having the rescaled engine parameters and the reshaped engine lookup tables.

Aspect 13. The method of any of the preceding aspects, wherein:

an engine lookup table is adapted to store nonlinear engine behavior data; and/or a controller lookup table is adapted to store optimal control commands for given engine operating points.

Aspect 14. The method of any of the preceding aspects, wherein:

a lookup table relates controller command input values to controller output that will yield a desired response in the engine, in particular under quasi-steady and dynamic engine operating conditions; and/or a lookup table includes one or more input breakpoint datasets and output table data.

Aspect 15. The method of any of the preceding claims, wherein:

an input breakpoint data set is an index of input values for a particular dimension of the lookup table; and/or a breakpoint is defined as an input value included in an input breakpoint data set.

Aspect 16. The method of any of the preceding aspects, wherein parameters, in particular the number of cylinders and/or the displacement, of the engine model for a given engine architecture define the size of the engine.

Aspect 17. One or more non-transitory computer-readable media, having stored thereon instructions that when executed by a computing device, cause the computing device to implement a method according to any of the previous claims.

Aspect 18. An apparatus comprising:

a memory storing an engine controller model and an engine model, the engine controller model and the engine model being executable, the engine controller model including original controller parameters and original controller lookup tables, the engine model including original engine parameters and original engine lookup tables, the engine model during execution simulating operation of an original engine of a given size; and processor coupled to the memory, the processor configured to:

receive one or more rescaling factors that indicate a change in the given size of the original engine to a new size of a resized engine;

determine, based on the one or more rescaling factors, a plurality of ratios between the original engine of the given size and the resized engine of the new size;

generate rescaled controller parameters by modifying the original controller parameters based on the plurality of ratios;

generate rescaled engine parameters by modifying the original engine parameters based on the plurality of ratios;

create reshaped controller lookup tables by modifying the original controller lookup tables based on the plurality of ratios;

create reshaped engine lookup tables by modifying the original engine lookup tables based on the plurality of ratios; and at least one of execute the engine controller model and the engine model utilizing the rescaled controller parameters, the rescaled engine parameters, the reshaped controller lookup tables, and the reshaped engine lookup tables, to simulate operation of the resized engine of the new size, or generate code for the engine controller model including the rescaled controller parameters and the reshaped controller lookup tables.

Aspect 19. The apparatus of aspect 18 wherein the plurality of ratios include at least one of:

a first ratio of engine speeds between the original engine of the given size and the resized engine of the new size;

a second ratio of engine torques between the original engine of the given size and the resized engine of the new size;

a third ratio of engine displacements between the original engine of the given size and the resized engine of the new size, or a fourth ratio of engine powers between the original engine of the given size and the resized engine of the new size.

Aspect 20. A method comprising:

accessing an engine controller model and an engine model, the engine controller model and the engine model being executable, the engine model during execution simulating operation of an original engine of a given size, the engine controller model including a model of the original engine and implementing a feedforward controller that matches the engine model;

receiving one or more rescaling factors that indicate a change in the given size of the original engine to a new size of a resized engine;

rescaling, based on the one or more rescaling factors, the engine model to simulate the resized engine of the new size;

rescaling, based on the one or more rescaling factors, the engine controller model to match the engine model as rescaled to simulate the resized engine of the new size; and executing the engine controller model and the engine model following the rescaling of the engine controller model and the rescaling of the engine model to simulate operation of the resized engine of the new size.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, generated code may be utilized advantageously with other embedded hardware, such as embedded hardware that includes floating point cores.

Therefore, it is the object of the appended claims to cover all such variations and modifications as come within the true spirit and scope of the disclosure.

What is claimed is:

1. A method comprising:

accessing, from a memory, an engine controller simulation model and an engine simulation model, the engine controller simulation model and the engine simulation model being executable by a simulation engine of a modeling environment, the engine controller simulation model including original controller parameters and original controller lookup tables, the engine simulation model including original engine parameters and original engine lookup tables, the engine simulation model during execution simulating operation of an original engine of a given size;

receiving one or more rescaling factors that indicate a change in the given size of the original engine to a new size of a resized engine;

determining, by a processor coupled to the memory, based on the one or more rescaling factors, a plurality of ratios between the original engine of the given size and the resized engine of the new size;

generating, by the processor, rescaled controller parameters by modifying the original controller parameters based on one or more of the plurality of ratios;

generating, by the processor, rescaled engine parameters by modifying the original engine parameters based on one or more of the plurality of ratios;

creating, by the processor, reshaped controller lookup tables by modifying the original controller lookup tables based on one or more of the plurality of ratios; and creating, by the processor, reshaped engine lookup tables by modifying the original engine lookup tables based on one or more of the plurality of ratios, wherein the original engine and the resized engine are an internal combustion engine, a compression engine, an electric motor, or a hybrid automobile powertrain.

2. A method comprising:

accessing, from a memory, an engine controller simulation model and an engine simulation model, the engine controller simulation model and the engine simulation model being executable by a simulation engine of a modeling environment, the engine simulation model during execution simulating operation of an original engine of a given size, the engine controller simulation model including a model of the original engine and implementing a feedforward controller that matches the engine simulation model;

receiving one or more rescaling factors that indicate a change in the given size of the original engine to a new size of a resized engine;

rescaling, by a processor coupled to the memory, based on the one or more rescaling factors, the engine simulation model to simulate the resized engine of the new size;

rescaling, by the processor, based on the one or more rescaling factors, the engine controller simulation model to match the engine simulation model as rescaled to simulate the resized engine of the new size; and at least one of:

executing, by the processor, the engine controller simulation model and the engine simulation model following the rescaling of the engine controller simulation model and the rescaling of the engine simulation model to simulate operation of the resized engine of the new size; or generating code for the engine controller simulation model as rescaled to match the engine simulation model as rescaled to simulate the resized engine of the new size, wherein the original engine and the resized engine are an internal combustion engine, a compression engine, an electric motor, or a hybrid automobile powertrain.

3. A method comprising:

accessing, from a memory, an electric motor controller simulation model and an electric motor simulation model, the electric motor controller simulation model and the electric motor simulation model being executable by a simulation engine of a modeling environment, the electric motor simulation model, during execution, simulating operation of an original electric motor of a given size, the electric motor controller simulation model matching the electric motor simulation model;

receiving one or more rescaling factors that indicate a change in the given size of the original electric motor to a new size of a resized electric motor;

rescaling, by a processor coupled to the memory, based on the one or more rescaling factors, the electric motor simulation model to simulate the resized electric motor of the new size;

rescaling, by the processor, based on the one or more rescaling factors, the electric motor controller simulation model to match the electric motor simulation model as rescaled to simulate the resized electric motor of the new size; and executing, by the processor, the electric motor controller simulation model and the electric motor simulation model following the rescaling of the electric motor controller simulation model and the rescaling of the electric motor simulation model to simulate operation of the resized electric motor of the new size.

4. The method of claim 3 wherein the original electric motor has a cylindrical physical form with an axial dimension and a radial dimension, the original electric motor has a stator with windings, and the one or more rescaling factors is an axial rescaling factor, a radial rescaling factor or a rewinding factor.

5. The method of claim 4 wherein the electric motor controller simulation model includes a Proportional (P) parameter, and the rescaling the electric motor controller simulation model includes rescaling the P parameter as a function of the axial rescaling factor and the rewinding factor.

6. The method of claim 4 wherein the electric motor controller simulation model includes an Integral (I) parameter, and the rescaling the electric motor controller simulation model includes rescaling the I parameter as a function of the axial rescaling factor, the radial rescaling factor and the rewinding factor.

7. The method of claim 3 wherein the original electric motor has a cylindrical physical form with an axial dimension and a radial dimension, the original electric motor has a stator with windings, and the one or more rescaling factors that is received is an axial rescaling factor, the method further comprising:

deriving a radial rescaling factor based on the axial rescaling factor; and deriving a rewinding factor based on the axial rescaling factor and the radial rescaling factor.

8. The method of claim 7 wherein the radial rescaling factor is further based on a power ratio between the given size of the original electric motor and the new size of the resized electric motor.

9. The method of claim 7 wherein the rewinding factor is further based on a direct current (DC) link voltage ratio between the given size of the original electric motor and the new size of the resized electric motor.

10. The method of claim 3 wherein the electric motor controller simulation model includes at least one of a Proportional (P) parameter, an Integral (I) parameter or a Derivative (D) parameter, and the rescaling the electric motor controller simulation model includes rescaling the at least one of the P, I or D parameters based on the one or more rescaling factors.

11. The method of claim 3 wherein the electronic motor simulation model includes original motor lookup tables containing motor data, and the rescaling the electric motor simulation model includes modifying the original motor lookup tables based on the one or more rescaling factors.

12. The method of claim 11 wherein the original motor lookup tables contain nonlinear data obtained from dynamometer testing of the original electric motor or Finite Element Analysis (FEA) of a design of the original electric motor.

13. The method of claim 3 wherein the electric motor controller simulation model includes original controller lookup tables containing motor data, and the rescaling the electric motor controller simulation model includes modifying the original controller lookup tables based on the one or more rescaling factors.

14. The method of claim 13 wherein the original controller lookup tables include torque data and the modifying the original controller lookup tables includes rescaling the torque data as a function of the axial rescaling factor and the radial rescaling factor, the electric motor controller simulation model includes original controller lookup tables containing motor data, and the rescaling the electric motor controller simulation model includes modifying the original controller lookup tables based on the one or more rescaling factors.

15. The method of claim 3 further comprising:

generating code for the electric motor controller simulation model following the rescaling the electric motor controller simulation model, the code configured for deployment as embedded software on an electronic control unit (ECU).

16. One or more non-transitory computer-readable media, having stored thereon instructions that when executed by a computing device, cause the computing device to perform operations comprising:

access, from a memory, an electric motor controller simulation model and an electric motor simulation model, the electric motor controller simulation model and the electric motor simulation model being executable by a simulation engine of a modeling environment, the electric motor simulation model, during execution, simulating operation of an original electric motor of a given size, the electric motor controller simulation model matching the electric motor simulation model;

receive one or more rescaling factors that indicate a change in the given size of the original electric motor to a new size of a resized electric motor;

rescale, based on the one or more rescaling factors, the electric motor simulation model to simulate the resized electric motor of the new size;

rescale, based on the one or more rescaling factors, the electric motor controller simulation model to match the electric motor simulation model as rescaled to simulate the resized electric motor of the new size; and execute the electric motor controller simulation model and the electric motor simulation model following the rescaling of the electric motor controller simulation model and the rescaling of the electric motor simulation model to simulate operation of the resized electric motor of the new size.

17. The one or more non-transitory computer-readable media of claim 16 wherein
the original electric motor has a cylindrical physical form with an axial dimension and a radial dimension,
the original electric motor has a stator with windings, and
the one or more rescaling factors is an axial rescaling factor, a radial rescaling factor or a rewinding factor.

18. The one or more non-transitory computer-readable media of claim 16 wherein
the original electric motor has a cylindrical physical form with an axial dimension and a radial dimension,
the original electric motor has a stator with windings, and
the one or more rescaling factors that is received is an axial rescaling factor,
further wherein the one or more non-transitory computer-readable media store further instructions, that when executed by the computing device, cause the computing device to perform further operations comprising
the instructions further causing the computing device to perform further operations comprising:
derive a radial rescaling factor based on the axial rescaling factor; and
derive a rewinding factor based on the axial rescaling factor and the radial rescaling factor.

19. The one or more non-transitory computer-readable media of claim 18 wherein the radial rescaling factor is further based on a power ratio between the given size of the original electric motor and the new size of the resized electric motor.

20. The one or more non-transitory computer-readable media of claim 18 wherein the rewinding factor is further based on a direct current (DC) link voltage ratio between the given size of the original electric motor and the new size of the resized electric motor.

21. The one or more non-transitory computer-readable media of claim 16 wherein
the electric motor controller simulation model includes at least one of a Proportional (P) parameter, an Integral (I) parameter or a Derivative (D) parameter, and
the rescaling the electric motor controller simulation model includes rescaling the at least one of the P, I or D parameters based on the one or more rescaling factors.

22. The one or more non-transitory computer-readable media of claim 16 wherein
the electronic motor simulation model includes original motor lookup tables containing motor data, and
the rescaling the electric motor simulation model includes modifying the original motor lookup tables based on the one or more rescaling factors.

23. The one or more non-transitory computer-readable media of claim 16 wherein
the electric motor controller simulation model includes original controller lookup tables containing motor data, and
the rescaling the electric motor controller simulation model includes modifying the original controller lookup tables based on the one or more rescaling factors.

24. The one or more non-transitory computer-readable media of claim 16 storing further instructions, that when executed by the computing device, cause the computing device to perform further operations comprising:
generate code for the electric motor controller simulation model following the rescaling the electric motor controller simulation model, the code configured for deployment as embedded software on an electronic control unit (ECU).

25. An apparatus comprising:
a memory storing an electric motor controller simulation model and an electric motor simulation model, the electric motor controller simulation model and the electric motor simulation model being executable by a simulation engine of a modeling environment, the electric motor simulation model, during execution, simulating operation of an original electric motor of a given size, the electric motor controller simulation model matching the electric motor simulation model; and
one or more processors coupled to the memory, the one or more processors configured to;
receive one or more rescaling factors that indicate a change in the given size of the original electric motor to a new size of a resized electric motor;
rescale, based on the one or more rescaling factors, the electric motor simulation model to simulate the resized electric motor of the new size;
rescale, based on the one or more rescaling factors, the electric motor controller simulation model to match the electric motor simulation model as rescaled to simulate the resized electric motor of the new size; and
execute the electric motor controller simulation model and the electric motor simulation model following the rescaling of the electric motor controller simulation model and the rescaling of the electric motor simulation model to simulate operation of the resized electric motor of the new size.

26. The apparatus of claim 25 wherein
the original electric motor has a cylindrical physical form with an axial dimension and a radial dimension,
the original electric motor has a stator with windings, and
the one or more rescaling factors that is received is an axial rescaling factor, the one or more processors further configured to:
derive a radial rescaling factor based on the axial rescaling factor; and
derive a rewinding factor based on the axial rescaling factor and the radial rescaling factor.

27. The apparatus of claim 25 wherein
the electric motor controller simulation model includes at least one of a Proportional (P) parameter, an Integral (I) parameter or a Derivative (D) parameter, and
the rescaling the electric motor controller simulation model includes rescaling the at least one of the P, I or D parameters based on the one or more rescaling factors.

28. The apparatus of claim 25 wherein
the electronic motor simulation model includes original motor lookup tables containing motor data, the rescaling the electric motor simulation model includes modifying the original motor lookup tables based on the one or more rescaling factors, the electric motor controller simulation model includes original controller lookup tables containing motor data, and the rescaling the electric motor controller simulation model includes modifying the original controller lookup tables based on the one or more rescaling factors.

29. The apparatus of claim 25 wherein the one or more processors are further configured to:

generate code for the electric motor controller simulation model following the rescaling the electric motor controller simulation model, the code configured for deployment as embedded software on an electronic control unit (ECU).

* * * * *

UNITED STATES PATENT AND TRADEMARK OFFICE
CERTIFICATE OF CORRECTION

| | |
|---|---|
| PATENT NO. | : 12,056,425 B2 |
| APPLICATION NO. | : 17/670997 |
| DATED | : August 6, 2024 |
| INVENTOR(S) | : Peter J. Maloney et al. |

It is certified that error appears in the above-identified patent and that said Letters Patent is hereby corrected as shown below:

In the Specification

Column 6, Line 12 reads:
"User Interfaces (Uls), such as Graphical User Interfaces"
Should read:
--User Interfaces (UIs), such as Graphical User Interfaces--

Column 11, Line 19 reads:
"and an injector slope parameter (InjS1p) in mg/ms. The"
Should read:
--and an injector slope parameter (InjSlp) in mg/ms. The--

Column 36, Line 18 reads:
"interfaces (Uls), such as a dialog. For example, in response"
Should read:
--interfaces (UIs), such as a dialog. For example, in response--

Column 36, Line 21 reads:
"or more dialogs or other user interfaces (Uls), through which"
Should read:
--or more dialogs or other user interfaces (UIs), through which--

Column 36, Line 59 reads:
"Other Uls may be presented for receiving information for"
Should read:
--Other UIs may be presented for receiving information for--

Signed and Sealed this
Twentieth Day of May, 2025

Coke Morgan Stewart
*Acting Director of the United States Patent and Trademark Office*

Column 40, Line 51 reads:
"is where,"
Should read:
--where,--

Column 44, Line 40 reads:
"baseline motor, while the torque produced by the resealed"
Should read:
--baseline motor, while the torque produced by the rescaled--

Column 44, Line 43 reads:
"produced by the resealed motor does not match the torque"
Should read:
--produced by the rescaled motor does not match the torque--

Column 44, Line 50 reads:
"As described, the original motor model and the resealed"
Should read:
--As described, the original motor model and the rescaled--

Column 44, Lines 61-63 read:
"resealed motor model. For example, the modeling environment 200 may delete the resealed motor model from the dynamometer system model and connect the resealed con-"
Should read:
--rescaled motor model. For example, the modeling environment 200 may delete the rescaled motor model from the dynamometer system model and connect the rescaled con- --

Column 45, Lines 3-5 read:
"resealed motor model and may use less memory space than the resealed motor model.
It should be understood that the resealed motor controller"
Should read:
--rescaled motor model and may use less memory space than the rescaled motor model.
It should be understood that the rescaled motor controller--

Column 48, Line 21 reads:
"processor coupled to the memory, the processor config-"
Should read:
--a processor coupled to the memory, the processor config- --

CERTIFICATE OF CORRECTION (continued)
U.S. Pat. No. 12,056,425 B2

In the Claims

Column 50, Line 20 Claim 1 reads:
"generating, by the processor, resealed controller param-"
Should read:
--generating, by the processor, rescaled controller param- --

Column 50, Line 23 Claim 1 reads:
"generating, by the processor, resealed engine parameters"
Should read:
--generating, by the processor, rescaled engine parameters--